United States Patent
Nakagawa et al.

(10) Patent No.: US 8,411,367 B2
(45) Date of Patent: *Apr. 2, 2013

(54) IMAGE FORMING OPTICAL SYSTEM AND ELECTRONIC IMAGE PICKUP APPARATUS USING THE SAME

(75) Inventors: Akitaka Nakagawa, Kokubunji (JP); Hisashi Goto, Tokyo (JP)

(73) Assignee: Olympus Corporation, Tokyo (JP)

( * ) Notice: Subject to any disclaimer, the term of this patent is extended or adjusted under 35 U.S.C. 154(b) by 90 days.

This patent is subject to a terminal disclaimer.

(21) Appl. No.: 13/065,048

(22) Filed: Mar. 10, 2011

(65) Prior Publication Data

US 2011/0286104 A1 Nov. 24, 2011

(30) Foreign Application Priority Data

May 12, 2009 (JP) ................................ 2009-115392
Apr. 2, 2010 (JP) ................................ 2010-085715

(51) Int. Cl.
*G02B 15/14* (2006.01)
(52) U.S. Cl. ...................................................... 359/676
(58) Field of Classification Search ................. 359/676, 359/683, 686–690
See application file for complete search history.

(56) References Cited

U.S. PATENT DOCUMENTS

| | | | | |
|---|---|---|---|---|
| 7,580,202 | B2 * | 8/2009 | Wada | 359/689 |
| 7,643,228 | B2 * | 1/2010 | Ishibashi | 359/793 |
| 7,869,136 | B2 * | 1/2011 | Nakagawa et al. | 359/686 |
| 8,228,614 | B2 * | 7/2012 | Tashiro | 359/683 |

FOREIGN PATENT DOCUMENTS

| | | |
|---|---|---|
| JP | 2006-349947 | 12/2006 |
| JP | 2007-163964 | 6/2007 |
| JP | 2007-298555 | 11/2007 |

* cited by examiner

*Primary Examiner* — Darryl J Collins
(74) *Attorney, Agent, or Firm* — Kenyon & Kenyon LLP

(57) ABSTRACT

A zoom lens including, in order from the object side to the image side, a first lens group including a positive refractive power, a second lens group having a negative refractive power, an image side lens group having a positive refractive power, wherein the distance between the first lens group and the second lens group changes during zooming, and a refractive optical element A, which has a positive refractive power when its object side surface and image side surface are exposed to air, is provided in the first lens group and located closest to the object side in the first lens group, and the refractive optical element A is cemented together with an optical element B. The Abbe constant vd and the relative partial dispersion θgF of the refractive optical element A satisfies certain conditions.

19 Claims, 37 Drawing Sheets

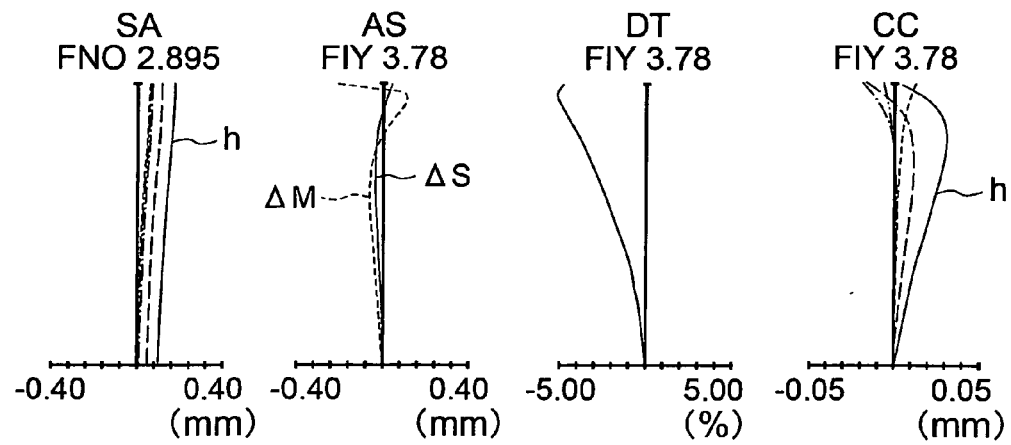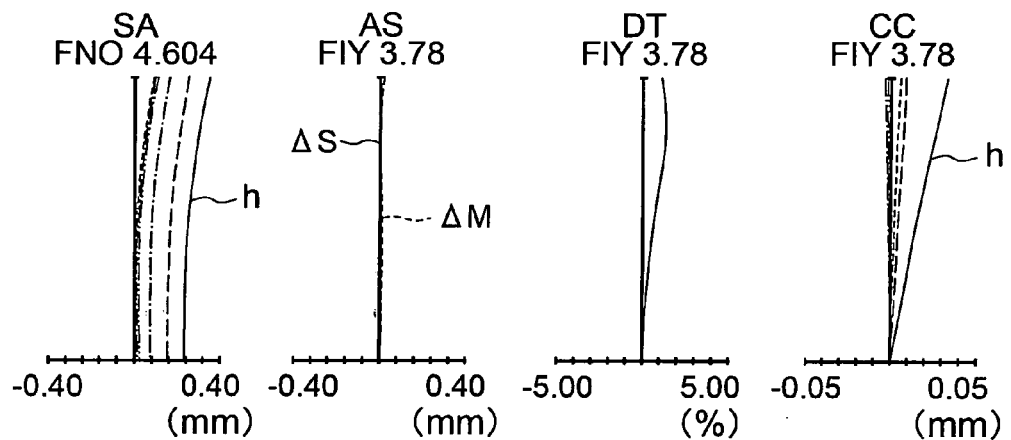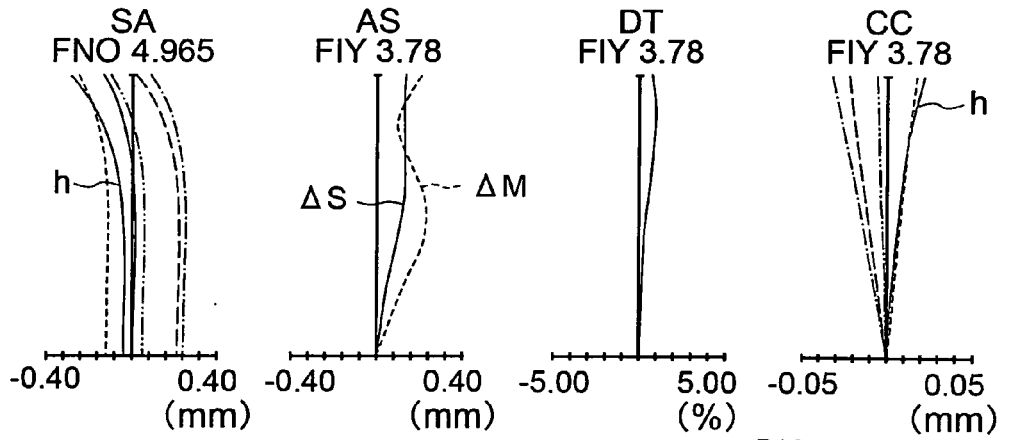

FIG.37A
FIG.37B
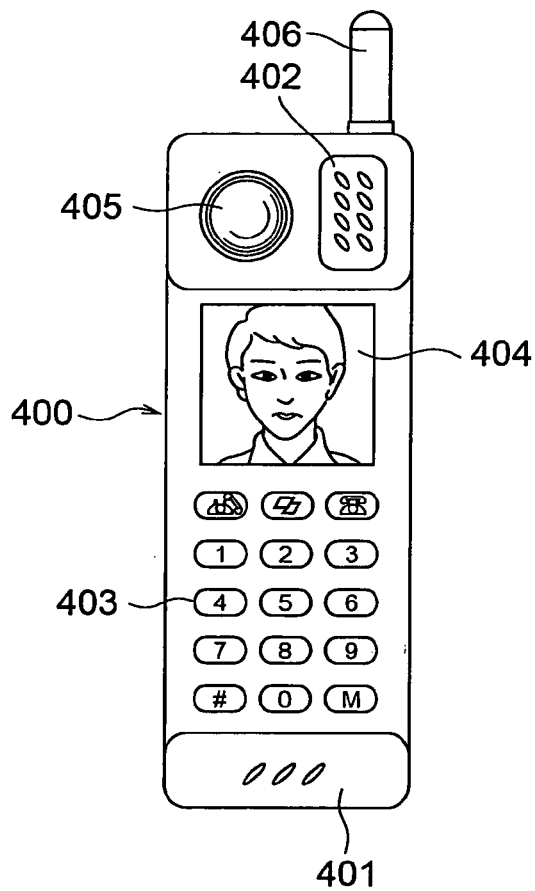
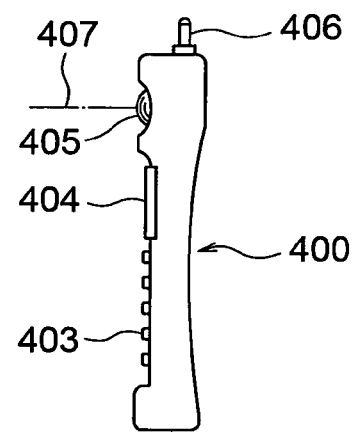
FIG.37C
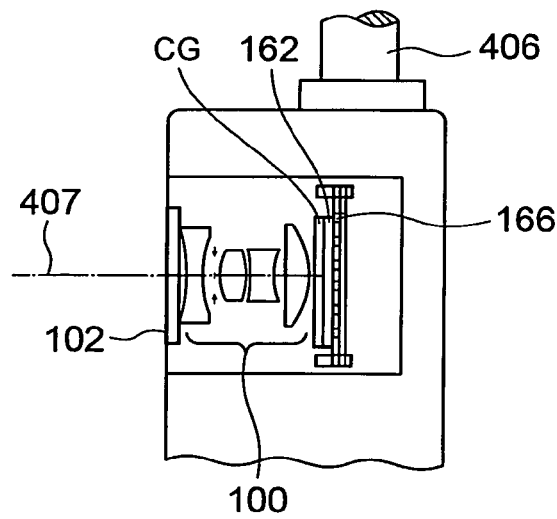

IMAGE FORMING OPTICAL SYSTEM AND ELECTRONIC IMAGE PICKUP APPARATUS USING THE SAME

CROSS-REFERENCE TO RELATED APPLICATION

The present application is based upon and claims the benefit of priority under 35 USC 119 from the prior Japanese Patent Application No. 2010-085715 filed on Apr. 2, 2010, which in turn is based upon and claims the benefit of priority from the prior Japanese Patent Application No. 2009-115392 filed on May 12, 2009; the entire contents of both prior Japanese applications are incorporated herein by reference.

BACKGROUND OF THE INVENTION

1. Field of the Invention

The present invention relates to an image forming optical system and an electronic image pickup apparatus equipped with the same.

2. Description of the Related Art

In recent years, image pickup apparatuses such as digital cameras have been replacing silver salt films and becoming widely used. Digital cameras are adapted to pickup an image of an object using a solid state image pickup element such as a CCD or CMOS. Taking lenses used in such image pickup apparatuses are desired to be zoom lenses (image forming lenses) having a high zoom ratio.

It is desired that such image taking lenses be satisfactorily corrected in terms of aberrations relevant to the monochromatic imaging performance (such as spherical aberration and coma). In addition, it is desired that correction of chromatic aberrations that are relevant to the resolution of images and color blur be achieved adequately.

On the other hand, the overall length of the lens (i.e. the entire optical length) is desired to be made shorter. However, the shorter the overall lens length is made in order to reduce the size of the entire optical system, the more aberrations, in particular chromatic aberrations, tend to be generated, and the lower the imaging performance tends to become. In particular, in the case of zoom lenses having a high zoom ratio and a long focal length at the telephoto end, a reduction of secondary spectrum is required in addition to first order achromatism when correcting chromatic aberrations.

As a method of reducing such chromatic aberrations, use of optical materials having extraordinary partial dispersion have been known (Japanese Patent Application Laid-Open No. 2007-163964, Japanese Patent Application Laid-Open No. 2006-349947, and Japanese Patent Application Laid-Open No. 2007-298555).

Furthermore, zoom lenses used in image pickup apparatuses are desired to have a certain zoom ratio, a wide angle of view at the wide angle end, high speed, and high performance. To improve the performance of a zoom lens, it is necessary to correct chromatic aberrations satisfactorily throughout the entire zoom range.

SUMMARY OF THE INVENTION

An image forming optical system according to a first aspect of the present invention includes, in order from the object side to the image side, a first lens group having a positive refractive power, a second lens group having a negative refractive power, and an image side lens group having a positive refractive power, wherein the distance between the first lens group and the second lens group changes during zooming, and the image forming optical system is characterized in that:

a cemented optical element C is provided in the first lens group, the cemented optical element C includes a refractive optical element A having a positive refractive power and an optical element B, the refractive optical element A is located closest to the object side in the first lens group, and the image forming optical system satisfies the following conditional expressions (4-1), (4-2), and (4-3):

$$vd_A < 30 \quad (4\text{-}1),$$

$$0.54 < \theta gF_A < 0.92 \quad (4\text{-}2), \text{ and}$$

$$|f_B/f_A| > 0.08 \quad (4\text{-}3),$$

where $nd_A$, $nC_A$, $nF_A$, and $ng_A$ are the refractive indices of the refractive optical element A for the d-line, the C-line, the F-line, and the g-line respectively, $vd_A$ is the Abbe constant $(nd_A-1)/(nF_A-nC_A)$ of the refractive optical element A, $\theta gF_A$ is the relative partial dispersion $(ng_A-nF_A)/(nF_A-nC_A)$ of the refractive optical element A, $f_A$ is the focal length of the refractive optical element A, and $f_B$ is the focal length of the optical element B.

An image forming optical system according to a second aspect of the present invention includes, in order from the object side to the image side, a first lens group having a positive refractive power, a second lens group having a negative refractive power, and an image side lens group having a positive refractive power, wherein the distance between the first lens group and the second lens group changes during zooming, and the image forming optical system is characterized in that:

a refractive optical element A having a positive refractive power is provided in the first lens group, and the image forming optical system satisfies the following conditional expressions (4-1), (4-2), and (2):

$$vd_A < 30 \quad (4\text{-}1),$$

$$0.54 < \theta gF_A < 0.92 \quad (4\text{-}2), \text{ and}$$

$$|fG1/fG2| > 6.4 \quad (2),$$

where $nd_A$, $nC_A$, $nF_A$, and $ng_A$ are the refractive indices of the refractive optical element A for the d-line, the C-line, the F-line, and the g-line respectively, $vd_A$ is the Abbe constant $(nd_A-1)/(nF_A-nC_A)$ of the refractive optical element A, $\theta gF_A$ is the relative partial dispersion $(ng_A-nF_A)/(nF_A-nC_A)$ of the refractive optical element A, fG1 is the focal length of the first lens group, and fG2 is the focal length of the second lens group.

An image forming optical system according to a third aspect of the present invention includes, in order from the object side to the image side, a first lens group having a positive refractive power, a second lens group having a negative refractive power, and an image side lens group having a positive refractive power, wherein the distance between the first lens group and the second lens group changes during zooming, and the image forming optical system is characterized in that:

a refractive optical element A having a positive refractive power is provided in the first lens group, the refractive optical element A is located closest to the object side in the first lens group, and the image forming optical system satisfies the following conditional expressions (4-1), (4-2), and (7):

$$\nu d_A < 30 \quad (4\text{-}1),$$

$$0.54 < \theta g F_A < 0.92 \quad (4\text{-}2), \text{ and}$$

$$0.8 < f_A/fG1 < 13.0 \quad (7),$$

where $nd_A$, $nC_A$, $nF_A$, and $ng_A$ are the refractive indices of the refractive optical element A for the d-line, the C-line, the F-line, and the g-line respectively, $vd_A$ is the Abbe constant $(nd_A-1)/(nF_A-nC_A)$ of the refractive optical element A, $\theta gF_A$ is the relative partial dispersion $(ng_A-nF_A)/(nF_A-nC_A)$ of the refractive optical element A, $f_A$ is the focal length of the refractive optical element A, and fG1 is the focal length of the first lens group.

An electronic image pickup apparatus according to a first aspect of the present invention includes an image forming optical system and an image pickup element, and the apparatus is characterized in that the image forming optical system includes, in order from the object side to the image side, a first lens group having a positive refractive power, a second lens group having a negative refractive power, and an image side lens group having a positive refractive power, the distance between the first lens group and the second lens group changes during zooming, a refractive optical element A having a positive refractive power is provided in the first lens group, and the refractive optical element A satisfies the following conditional expression (3-2):

$$0 < (Zb(3.3a) - Za(3.3a))/(Zb(2.5a) - Za(2.5a)) < 0.990 \quad (3\text{-}2),$$

where fw is the focal length of the image forming optical system at the wide angle end, ft is the focal length of the image forming optical system at the telephoto end, IH is the largest image height on the image pickup element, Za(h) is the distance along the optical axis between the object side surface vertex of the refractive optical element A on the optical axis and a point on the object side surface of the refractive optical element A at height h, Zb(h) is the distance along the optical axis between the object side surface vertex of the refractive optical element A on the optical axis and a point on the image plane side surface of the refractive optical element A at height h, and a is a value defined by the following equation (3-1):

$$a = \{(IH)^2 \times \log_{10}(ft/fw)\}/fw \quad (3\text{-}1).$$

BRIEF DESCRIPTION OF THE DRAWINGS

FIG. 2A is for the wide angle end, FIG. 2B is for the intermediate focal length, and FIG. 2C is for the telephoto end;

FIG. 4A is for the wide angle end, FIG. 4B is for the intermediate focal length, and FIG. 4C is for the telephoto end;

FIG. 6A is for the wide angle end, FIG. 6B is for the intermediate focal length, and FIG. 6C is for the telephoto end;

FIG. 8A is for the wide angle end, FIG. 8B is for the intermediate focal length, and FIG. 8C is for the telephoto end;

FIG. 10A is for the wide angle end, FIG. 10B is for the intermediate focal length, and FIG. 10C is for the telephoto end;

FIG. 12A is for the wide angle end, FIG. 12B is for the intermediate focal length, and FIG. 12C is for the telephoto end;

FIG. 14A is for the wide angle end, FIG. 14B is for the intermediate focal length, and FIG. 14C is for the telephoto end;

FIG. 16A is for the wide angle end, FIG. 16B is for the intermediate focal length, and FIG. 16C is for the telephoto end;

FIG. 18A is for the wide angle end, FIG. 18B is for the intermediate focal length, and FIG. 18C is for the telephoto end;

FIGS. 20A, 20B, and 20C are diagrams showing spherical aberration, astigmatism, distortion, and chromatic aberration of magnification of the zoom lens according to embodiment 10 in the state in which the zoom lens is focused on an object point at infinity, where FIG. 20A is for the wide angle end, FIG. 20B is for the intermediate focal length, and FIG. 20C is for the telephoto end;

FIG. 22A is for the wide angle end, FIG. 22B is for the intermediate focal length, and FIG. 22C is for the telephoto end;

FIG. 24A is for the wide angle end, FIG. 24B is for the intermediate focal length, and FIG. 24C is for the telephoto end;

FIG. 26A is for the wide angle end, FIG. 26B is for the intermediate focal length, and FIG. 26C is for the telephoto end;

FIG. 28A is for the wide angle end, FIG. 28B is for the intermediate focal length, and FIG. 28C is for the telephoto end;

FIG. 30A is for the wide angle end, FIG. 30B is for the intermediate focal length, and FIG. 30C is for the telephoto end;

FIGS. 37A, 37B, and 37C show a cellular phone 400 as an example of an information processing apparatus in which a zoom optical system according to the present invention is provided as a taking optical system, where FIG. 37A is a front view of the cellular phone 400, FIG. 37B is a side view of the cellular phone 400, and FIG. 37C is a cross sectional view of the taking optical system 405.

DETAILED DESCRIPTION OF THE INVENTION

Figure 1A:
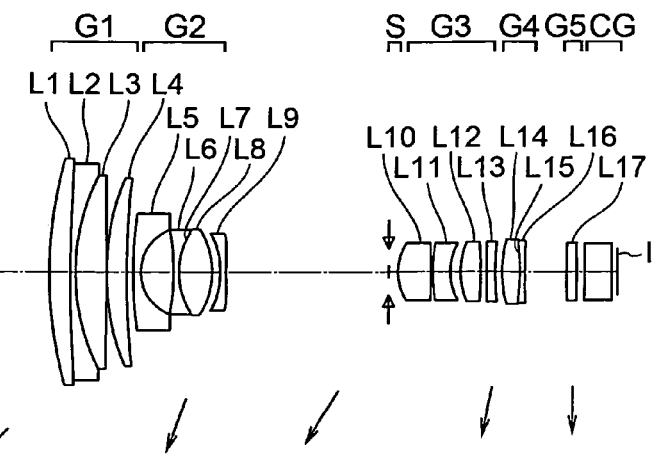
FIGS. 1A, 1B, and 1C are cross sectional views taken along the optical axis showing the optical configuration of a zoom lens according to embodiment 1 of the present invention in the state in which the zoom lens is focused on an object point at infinity, respectively at the wide angle end, at an intermediate focal length, and at the telephoto end.

In the following, embodiments of the image forming optical system according to the present invention applied to a zoom optical system will be described in detail with reference to the drawings. The present invention is not limited by the embodiments. Prior to the description of the embodiments, the operation and effect of the image forming optical system according to a mode will be described.

Prior to the description of embodiments, the operation and effect of the image forming optical system according to this mode will be described.

<Explanation of Effective Relative Partial Dispersion>

First, the Abbe constant and the relative partial dispersion of an optical element are defined as follows:

$$\nu d = (nd-1)/(nF-nC),$$

$$\theta gF = (ng-nF)/(nF-nC)$$

$$\theta hg = (nh-ng)/(nF-nC)$$

where, nd, nC, nF, ng, and nh are the refractive indices of each optical element with respect to a wavelength of 587.6 nm (d-line), with respect to a wavelength of 656.3 nm (C-line), with respect to a wavelength of 486.1 nm (F-line), with respect to a wavelength of 435.8 (g-line), and with respect to a wavelength of 404.7 nm (h-line), νd is the Abbe constant of the optical element, θgF is the relative partial dispersion of the optical element with respect to the g-line and the F-line, and θhg is the relative partial dispersion of the optical element with respect to the h-line and the g-line.

Secondly, a description will be made of a cemented optical element in which two optical elements are cemented together. When the cemented optical element (in which two elements are cemented) is regarded as a single optical element, its effective relative partial dispersion $\theta gF_{21}$ can be obtained by the following equation:

$$\theta gF_{21} = f_{21} \times \nu_{21} \times (\theta gF_1 \times \phi_1/\nu d_1 + \theta gF_2 \times \phi_2/\nu d_2) \qquad (A),$$

where $f_{21}$ is the composite focal length of the two optical elements, $\nu_{21}$ is the Abbe constant of the two optical elements regarded as a single optical element, $\theta gF_1$ is the relative partial dispersion of one optical element, $\phi_1$ is the refractive power of the one optical element, $\nu d_1$ is the Abbe constant of the one optical element, $\theta gF_2$ is the relative partial dispersion of the other optical element, $\phi_2$ is the refractive power of the other optical element, and $\nu d_2$ is the Abbe constant of the other optical element. In addition, $f_{21}$, $\nu_{21}$, $\phi_1$, and $\phi_2$ are represented by the following equations respectively:

$$1/f_{21} = 1/f_1 + 1/f_2,$$

$$\nu_{21} = 1/(f_{21} \times (\phi_1/\nu d_1 + \phi_2/\nu d_2)),$$

$$\phi_1 = 1/f_1, \text{ and}$$

$$\phi_2 = 1/f_2,$$

where $f_1$ is the focal length of the one optical element, and $f_2$ is the focal length of the other optical element.

In the following description, the relative partial dispersion will refer to the relative partial dispersion with respect to the g-line and the F-line, unless otherwise specified.

The image forming optical system according to a first mode includes, in order from the object side to the image side, a first lens group having a positive refractive power, a second lens group having a negative refractive power, and an image side lens group having a positive refractive power, wherein the distance between the first lens group and the second lens group changes during zooming, a cemented optical element C is provided in the first lens group, the cemented optical element C includes a refractive optical element A having a positive refractive power and an optical element B, the refractive optical element A is located closest to the object side in the first lens group, and the following conditional expressions (4-1), (4-2), and (4-3) are satisfied:

$$\nu d_A < 30 \qquad (4\text{-}1),$$

$$0.54 < \theta gF_A < 0.92 \qquad (4\text{-}2), \text{ and}$$

$$|f_B/f_A| > 0.08 \qquad (4\text{-}3),$$

where $nd_A$, $nC_A$, $nF_A$, and $ng_A$ are refractive indices of the refractive optical element A for the d-line, C-line, F-line, and g-line respectively, $\nu d_A$ is the Abbe constant $(nd_A-1)/(nF_A-nC_A)$ of the refractive optical element A, $\theta gF_A$ is the relative partial dispersion $(ng_A-nF_A)/(nF_A-nC_A)$ of the refractive optical element A, $f_A$ is the focal length of the refractive optical element A, and $f_B$ is the focal length of the optical element B.

In the image forming optical system with the first lens group having a positive refractive power, aberrations generated in the first lens group are enlarged in the second and subsequent lens groups. In particular, large chromatic aberration is generated at the telephoto end. In consequence, the optical performance of the entire optical system is deteriorated. In other words, in order to maintain high optical performance or improve the optical performance, it is important to achieve correction of chromatic aberration in the first lens group. In the image forming optical system according to this mode, the refractive optical element A having a positive refractive power is provided in the first lens group, and the conditional expressions (4-1) and (4-2) are satisfied. This reduces chromatic aberration, in particular, secondary spectrum, generated in the first lens group.

The cemented optical element C includes the refractive optical element A and the optical element B that are cemented together. Still further, conditional expression (4-3) is satisfied. With these features, excellent correction of secondary spectrum using the cemented optical element C is achieved. In consequence, chromatic aberration is improved, and an improvement of the optical performance is achieved accordingly.

If the upper limit of conditional expression (4-1) is exceeded, it will be difficult to achieve first order achromatism in the first lens group. In consequence, the resolution at the wide angle end and the telephoto end will become lower. This is not desirable because the performance is deteriorated. If the upper limit of conditional expression (4-2) is exceeded, secondary spectrum will be overcorrected in the first lens group. This will lead to large axial chromatic aberration and chromatic aberration of magnification at the telephoto end. This is not desirable because color blur occurs due to secondary spectrum and the performance is deteriorated.

On the other hand, if the lower limits of conditional expression (4-1) and conditional expression (4-2) are exceeded, the refractive optical element A will have a high refractive power, leading to large spherical aberration at the telephoto end and large chromatic aberration of magnification at the wide angle end. This is not desirable because this leads to a deterioration in the performance, specifically a decrease in resolution and the occurrence of color blur.

If the refractive optical element A satisfies conditional expressions (4-1) and (4-2), it is preferred that the refractive optical element A be located closest to the object side in the first lens group. The height of axial marginal rays and the height of off-axis principal rays are high at the location closest to the object side in the first lens group. Therefore, if the refractive optical element A is located closest to the object side, chromatic aberration of magnification and axial chromatic aberration at the telephoto end can be corrected most effectively.

If the lower limit of conditional expression (4-3) is exceeded, the positive refractive power of the refractive optical element A will become small. Consequently, the amount of decrease in the effective relative partial dispersion of the cemented optical element C will be small. Therefore, the difference between the relative partial dispersion of the optical element B and the effective relative partial dispersion of the cemented optical element C will become small, and the secondary spectrum correction effect will become small. This is not desirable.

The image forming optical system according to a second mode includes, in order from the object side to the image side, a first lens group having a positive refractive power, a second lens group having a negative refractive power, and an image side lens group having a positive refractive power, wherein the distance between the first lens group and the second lens group changes during zooming, a refractive optical element A having a positive refractive power is provided in the first lens group, and the following conditional expressions (4-1), (4-2), and (2) are satisfied:

$$\nu d_A < 30 \tag{4-1},$$

$$0.54 < \theta g F_A < 0.92 \tag{4-2}, and$$

$$|fG1/fG2| > 6.4 \tag{2},$$

where $nd_A$, $nC_A$, $nF_A$, and $ng_A$ are refractive indices of the refractive optical element A for the d-line, C-line, F-line, and g-line respectively, $\nu d_A$ is the Abbe constant $(nd_A-1)/(nF_A-nC_A)$ of the refractive optical element A, $\theta g F_A$ is the relative partial dispersion $(ng_A-nF_A)/(nF_A-nC_A)$ of the refractive optical element A, fG1 is the focal length of the first lens group, and fG2 is the focal length of the second lens group.

To achieve high magnification in the image forming optical system with a first lens group having a positive refractive power, it is necessary that the second lens group have a high negative refractive power. On the other hand, if the second lens group has a high negative refractive power, aberrations generated in the first lens group will be enlarged in the second and subsequent lens groups. Therefore, the optical performance of the entire optical system will be deteriorated. In particular, chromatic aberration will be deteriorated at the telephoto end. In other words, to increase a zoom ratio while maintaining high optical performance or improving the optical performance, it is important to achieve correction of chromatic aberration in the first lens group.

In view of the above, in the image forming optical system according to this mode, the refractive optical element A having a positive refractive power is provided in the first lens group, and conditional expression (4-1) and conditional expression (4-2) are satisfied. With this configuration, chromatic aberration generated in the first lens group can be reduced. In addition, if conditional expression (2) is satisfied, a high performance image forming optical system having a high zoom ratio with good correction of chromatic aberration can be achieved.

Conditional expressions (4-1) and (4-2) have already been discussed in the description of the image forming optical system according to the first mode.

If the lower limit of conditional expression (2) is exceeded, the ratio of the refractive power of the first lens group and the refractive power of the second lens group will become small. Then, the zoom ratio will become small, because the first lens group and the second lens group are lens groups having the magnification changing function. Therefore, it will be difficult to realize an image forming optical system having a high zoom ratio. Furthermore, if the ratio of the refractive power of the first lens group and the refractive power of the second lens group becomes small, the contribution of the second lens group to the entire image forming optical system in terms of the negative refractive power will become small. Then, the entire zoom optical system will have a positive Petzval sum. Therefore, curvature of field will be generated, and the performance will be deteriorated. This is not desirable.

The image forming optical system according to a third mode includes, in order from the object side to the image side, a first lens group having a positive refractive power, a second lens group having a negative refractive power, and an image side lens group having a positive refractive power, wherein the distance between the first lens group and the second lens group changes during zooming, a refractive optical element A having a positive refractive power is provided in the first lens group, the refractive optical element A is located closest to the object side in the first lens group, and the following conditional expression (4-1), conditional expression (4-2), and conditional expression (7) are satisfied:

$$\nu d_A < 30 \tag{4-1},$$

$$0.54 < \theta g F_A < 0.92 \tag{4-2}, and$$

$$0.8 < f_A/fG1 < 13.0 \tag{7},$$

where $nd_A$, $nC_A$, $nF_A$, and $ng_A$ are refractive indices of the refractive optical element A for the d-line, C-line, F-line, and g-line respectively, $\nu d_A$ is the Abbe constant $(nd_A-1)/(nF_A-nC_A)$ of the refractive optical element A, $\theta g F_A$ is the relative partial dispersion $(ng_A-nF_A)/(nF_A-nC_A)$ of the refractive optical element A, $f_A$ is the focal length of the refractive optical element A, and fG1 is the focal length of the first lens group.

In the image forming optical system with the first lens group having a positive refractive power, aberrations generated in the first lens group are enlarged in the second and subsequent lens groups. In particular, large chromatic aberration is generated at the telephoto end. In consequence, the optical performance of the entire optical system tends to be deteriorated. Therefore, in order to maintain high optical performance or to improve the optical performance, it is important to achieve correction of chromatic aberration in the first lens group. In the image forming optical system according to this mode, the refractive optical element A having a positive refractive power is provided in the first lens group, and the conditional expressions (4-1) and (4-2) are satisfied. This reduces chromatic aberration, in particular, secondary spectrum, generated in the first lens group.

Conditional expressions (4-1) and (4-2) have already been discussed in the description of the image forming optical system according to the first mode.

If conditional expression (7) is satisfied, secondary spectrum can be effectively corrected in the first lens group. If a cemented optical element C including the refractive optical element A having a positive refractive power and an optical element B is provided in the first lens group, the effective relative partial dispersion of the cemented optical element C can be made lower than the relative partial dispersion of the optical element B. In other words, better correction of secondary spectrum can be achieved by the use of the cemented optical element C as compared to cases in which the optical element B is solely used. Therefore, an improvement in the performance can be achieved by the improvement in chromatic aberration characteristics.

If the upper limit of conditional expression (7) is exceeded, the refractive power provided by the refractive optical element A will be low. This is not desirable because the secondary spectrum correction effect provided by the refractive optical element A in the first lens group will become low, and color blur will be caused due to insufficient correction. If the cemented optical element C including the refractive optical element A having a positive refractive power and the optical element B is provided in the first lens group, it will be difficult to make the effective relative partial dispersion of the cemented optical element C low. This is not desirable because color blur is caused due to insufficient correction of secondary spectrum.

If the lower limit of conditional expression (7) is exceeded, the refractive power provided by the refractive optical element A will become high. This is not desirable because secondary spectrum correction effect of the refractive optical element A in the first lens group will become too high, and color blur is caused due to overcorrection. If the cemented optical element C including the refractive optical element A having a positive refractive power and the optical element B is provided in the first lens group, the effective relative partial dispersion of the cemented optical element C can be made low, however, secondary spectrum will be overcorrected. This means that the refractive optical element A will generate secondary spectrum. Then, an increase in color blur will result undesirably.

In the above described image forming optical system according to the first mode, it is preferred that the following conditional expression (2) be satisfied:

$$|fG1/fG2|>6.4 \quad (2),$$

where fG1 is the focal length of the first lens group, and fG2 is the focal length of the second lens group.

Conditional expression (2) has already been discussed in the description of the image forming optical system according to the second mode.

In the image forming optical systems according to the first and second modes, it is preferred that the refractive optical element A be located closest to the object side in the first lens group and the following conditional expression (7) be satisfied:

$$0.8<f_A/fG1<13.0 \quad (7),$$

where $f_A$ is the focal length of the refractive optical element A, and fG1 is the focal length of the first lens group.

Conditional expression (7) has already been discussed in the description of the image forming optical system according to the third mode.

In the image forming optical systems according to the above-described modes, it is preferred that the following conditional expression (5) be satisfied:

$$0.4<\theta hg_A<1.2 \quad (5),$$

where $\theta hg_A$ is the relative partial dispersion $(nh_A-ng_A)/(nF_A-nC_A)$ with respect to the h-line of the refractive optical element A, and $nh_A$ is the refractive index of the refractive optical element A for the h-line.

To improve the imaging performance, it is necessary to correct chromatic aberration. The Abbe constant affects the first order achromatism, and the relative partial dispersion affects the secondary spectrum. In particular, the relative partial dispersion has bearing on the generation of color blur, among the factors of imaging performance. The color blur is a phenomenon in which a color(s) that is not contained in the object appears at the boundary of a bright portion and a dark portion having a large brightness difference.

There would be an optical material having an optimum Abbe constant and an optimum relative partial dispersion in terms of first order achromatism and improvement in color blur. It is possible to improve the imaging performance by using such an optical material in the refractive optical element. However, satisfactory correction of color blur cannot be achieved by selecting the refractive optical element taking only the relative partial dispersion into consideration. Color blur cannot be corrected satisfactorily unless a refractive optical element is selected taking into consideration correction with respect to the h-line (404 nm) in addition to the Abbe constant and the relative partial dispersion.

Therefore, in the image forming optical system according to this mode, it is preferred that conditional expression (5) be satisfied.

If the upper limit of conditional expression (5) is exceeded, correction with respect to the h-line will become excessive. If this is the case, color blur will become rather conspicuous. This is not desirable. On the other hand, if the lower limit of conditional expression (5) is exceeded, correction with respect to the h-line will become insufficient. If this is the case, color blur will become conspicuous. This is not desirable.

It is preferred that the image forming optical system according to the above-described modes include, in order from the object side to the image side, a first lens group having a positive refractive power, a second lens group having a negative refractive power, a stop, a third lens group having a positive refractive power, a fourth lens group having a positive refractive power, and a fifth lens group having a positive refractive power, and that zooming be performed by changing the distances between adjacent lens groups in such a way that the distance between the first lens group and the second lens group is larger, the distance between the second lens group and the third lens group is smaller, and the distance between the third lens group and the fourth lens group is larger, at the telephoto end than at the wide angle end.

It is preferred that the distance between the fourth lens group and the fifth lens group of the image forming optical systems according to the above-described modes satisfy the following conditional expression (20):

$$0<TG_{45}/WG_{45}<5 \quad (20),$$

where $WG_{45}$ is the distance between the fourth lens group and the fifth lens group at the wide angle end, and $TG_{45}$ is the distance between the fourth lens group and the fifth lens group at the telephoto end.

If the upper limit of conditional expression (20) is exceeded, it will be difficult to correct image plane variation caused with zooming. This is not desirable because this leads to a deterioration in the imaging performance. On the other hand, the lower limit of conditional expression (20) will not be exceeded because the value of the denominator and the value of the numerator of the term in conditional expression (20) are both positive.

As described above, in the image forming optical system according to this mode, the optical system includes five lens groups, and the lens groups are moved during zooming. With this configuration, variations in the brightness among zoom positions can be made small. Furthermore, as chromatic aberration is corrected mainly by the first lens group and a high zoom ratio is achieved by the second lens group, the third and subsequent lens groups can serve mainly for correction of monochromatic aberration.

It is preferred that the image forming optical system according to the above-described modes have an optical element B and satisfy the following conditional expression (6):

$$0 < \theta gF_B - \theta gF_{BA} < 0.25 \quad (6),$$

where $nd_B$, $nC_B$, $nF_B$, and $ng_B$ are refractive indices of the optical element B for the d-line, C-line, F-line, and g-line respectively, $vd_3$ is the Abbe constant $(nd_B-1)/(nF_B-nC_B)$ of the optical element B, $\theta gF_B$ is the relative partial dispersion $(ng_B-nF_B)/(nF_B-nC_B)$ of the optical element B, $\theta gF_{BA}$ is the effective relative partial dispersion of the refractive optical element A and the optical element B regarded as a single optical element and expressed by the following equation:

$$\theta gF_{BA} = f_{BA} \times v_{BA} \times (\theta gF_A \times \phi_A / vd_A + \theta gF_B \times \phi_B / vd_B),$$

where $f_{BA}$ is the composite focal length of the optical element B and the refractive optical element A and expressed by the following equation:

$$1/f_{BA} = 1/f_A + 1/f_B,$$

$v_{BA}$ is the Abbe constant of the refractive optical element A and the optical element B regarded as a single optical element and expressed by the following equation:

$$v_{BA} = 1/(f_{BA} \times (\phi_A/vd_A + \phi_B/vd_B)),$$

$\phi_A$ is the refractive power ($\phi_A = 1/f_A$) of the refractive optical element A, $\phi_B$ is the refractive power ($\phi_B = 1/f_B$) of the optical element B, and $\phi_{BA}$ is the composite refractive power ($\phi_{BA} = 1/f_{BA}$) of the optical element B and the refractive optical element A.

If the image forming optical system includes the optical element B, it is more preferable that the optical element B be used in the two-piece cemented optical element C than that the optical element B is used alone. This provides further correction of secondary spectrum. Consequently, an improvement in the performance is achieved by an improvement with respect to color blur.

If the upper limit of conditional expression (6) is exceeded, color blur will be caused due to overcorrection of secondary spectrum. This is not desirable. If the lower limit of conditional expression (6) is exceeded, the effective relative partial dispersion ($\theta gF_{BA}$) of the two-piece cemented optical element C will become larger than the relative partial dispersion ($\theta gF_B$) of the optical element B alone. This means that the refractive optical element A generates secondary spectrum. In consequence, color blur becomes larger than that before the cementing. This is not desirable.

In the image forming optical system according to the above-described modes, it is preferred that the following conditional expression (8) be satisfied:

$$-15 < (Ra+Rb)/(Ra-Rb) < -0.5 \quad (8),$$

where

Ra is the radius of curvature of the object side surface of the refractive optical element A, and Rb is the radius of curvature of the image side surface of the refractive optical element A.

Here, if the upper limit of conditional expression (8) is exceeded, spherical aberration will become larger in the negative direction at the telephoto end. If the lower limit of conditional expression (8) is exceeded, spherical aberration will become larger in the positive direction, deteriorating the imaging performance. In both cases, the imaging performance is deteriorated. This is not desirable.

An electronic image pickup apparatus according to a first mode includes an image forming optical system and an image pickup element, wherein the image forming optical system includes, in order from the object side to the image side, a first lens group having a positive refractive power, a second lens group having a negative refractive power, and an image side lens group having a positive refractive power, the distance between the first lens group and the second lens group changes during zooming, a refractive optical element A having a positive refractive power is provided in the first lens group, and it is preferred that the refractive optical element A satisfy the following conditional expression (3-2):

$$0 < (Zb(3.3a) - Za(3.3a))/(Zb(2.5a) - Za(2.5a)) < 0.990 \quad (3-2),$$

where fw is the focal length of the image forming optical system at the wide angle end, ft is the focal length of the image forming optical system at the telephoto end, IH is the largest image height on the image pickup element, Za(h) is the distance along the optical axis between the object side surface vertex of the refractive optical element A on the optical axis and a point on the object side surface of the refractive optical element A at height h, Zb(h) is the distance along the optical axis between the object side surface vertex of the refractive optical element A on the optical axis and a point on the image plane side surface of the refractive optical element A at height h, and a is a value defined by the following equation (3-1):

$$a = \{(IH)^2 \times \log_{10}(ft/fw)\}/fw \quad (3-1).$$

In the image forming optical system according to this mode, the refractive optical element A having a positive refractive power is provided in the first lens group. The distance over which a ray transmitted through the refractive optical element A travels inside the refractive optical element A and the position at which the ray passes through the refractive optical element A vary depending on the angle of view and the zoom position. In consequence, even if the shape of the refractive optical element A is the same, the aberration correction effect of the refractive optical element A varies depending on the angle of view and the zoom position. In order to achieve good aberration state throughout the entire zoom range, it is necessary to design the shape of the refractive optical element A having a positive refractive power taking into consideration the zoom ratio and the image height.

Let a be the ray height of a principal ray that is incident on a largest image height point, at distance L from the stop. Then, a is represented as follows:

$$a = L \times IH/fw.$$

Here, the following relationships hold:

$$\tan(\text{angle of view}) = IH/fw, \quad \text{and}$$

$$L \propto IH \times \log_{10}(ft/fw).$$

Thus, by introducing a proportionality factor m, a is expressed by equation (3-1).

The ray height, the angle of view, the zoom ratio, and the image height have the relationship represented by expression (3-1). It is desirable that the image forming optical system according to this mode satisfy conditional expression (3-2).

Here, the first lens group having a positive refractive power is required to achieve a good aberration condition with respect to chromatic aberration of magnification at the wide angle end and axial chromatic aberration and spherical aberration at the telephoto end. This achieves good imaging performance of the image forming optical system.

If the upper limit of conditional expression (3-2) is exceeded, a change in the ratio of the thickness (or thickness ratio) of the refractive optical element A on the optical axis and that in the peripheral portion will be small. Therefore, chromatic aberration of magnification at the wide angle end will be overcorrected. In addition, correction of axial chromatic aberration and spherical aberration at the telephoto end will be insufficient. Consequently, it will be difficult to achieve good imaging performance. This is not desirable. On the other hand, if the lower limit of conditional expression (3-2) is exceeded, the numerator in conditional expression (3-2) turns into negative. This means that the physical shape of the refractive optical element A cannot be realized as an optical element.

An electronic image pickup apparatus according to a second mode includes an image forming optical system and an image pickup element. If the image forming optical system is the optical system according to the above-described mode, it is preferred that the following conditional expression (3-2) be satisfied:

$$0<(Zb(3.3a)-Za(3.3a))/(Zb(2.5a)-Za(2.5a))<0.990 \quad (3-2),$$

where fw is the focal length of the image forming optical system at the wide angle end, ft is the focal length of the image forming optical system at the telephoto end, IH is the largest image height on the image pickup element, Za(h) is the distance along the optical axis between the object-side surface vertex of the refractive optical element A on the optical axis and a point on the object-side surface of the refractive optical element A at height h, Zb(h) is the distance along the optical axis between the object-side surface vertex of the refractive optical element A on the optical axis and a point on the image plane side surface of the refractive optical element A at height h, and a is a value defined by the following equation (3-1):

$$a=\{(IH)^2 \times \log_{10}(ft/fw)\}/fw \quad (3-1).$$

Conditional expression (3-2) has already been discussed in the foregoing.

In the electronic image pickup apparatuses according to the above-described modes, it is preferred that any one of the following conditional expressions (9-1a), (9-1b), (9-1c), (9-2a), and (9-2b) be satisfied:

$$1.0<Tnglt(0)/Tbas(0)<12 \quad (9\text{-}1a),$$

$$0.4<Tnglw(0.7)/Tbasw(0.7)<3 \quad (9\text{-}1b),$$

$$0.2<Tnglw(0.9)/Tbasw(0.9)<1.5 \quad (9\text{-}1c),$$

$$0<(Tnglw(0.7)/Tbasw(0.7))/(Tngl(0)/Tbas(0))<0.7 \quad (9\text{-}2a), \text{ and}$$

$$0<(Tnglw(0.9)/Tbasw(0.9))/(Tngl(0)/Tbas(0))<0.5 \quad (9\text{-}2b),$$

where Tngl(0) is the thickness of the refractive optical element A on the optical axis, Tnglw(0.7) is the distance over which a ray having a ray height of 70% of the largest image height on the image pickup element at the wide angle end travels inside the refractive optical element A, Tnglw(0.9) is the distance over which a ray having a ray height of 90% of the largest image height on the image pickup element at the wide angle end travels inside the refractive optical element A, Tbas(0) is the thickness of the optical element B on the optical axis, Tbasw(0.7) is the distance over which a ray having a ray height of 70% of the largest image height on the image pickup element at the wide angle end travels inside the optical element B, and Tbasw(0.9) is the distance over which a ray having a ray height of 90% of the largest image height on the image pickup element at the wide angle end travels inside the optical element B.

If any one of conditional expressions (9-1a), (9-1b), (9-1c), (9-2a), and (9-2b) is satisfied, axial chromatic aberration and chromatic aberration of magnification can be favorably corrected at the wide angle end. Furthermore, well-balanced correction of axial chromatic aberration and chromatic aberration of magnification can be achieved.

If the upper limits of conditional expressions (9-1a), (9-1b), and (9-1c) are exceeded, axial chromatic aberration will be overcorrected in the axial region, and chromatic aberration of magnification will be overcorrected in the off-axis region, at the wide angle end. Consequently, the imaging performance of the entire optical system will be deteriorated. This is not desirable.

On the other hand, if the lower limits of conditional expressions (9-1a), (9-1b), and (9-1c) are exceeded, undercorrection of axial chromatic aberration will occur in the axial region, and undercorrection of chromatic aberration of magnification will occur in the off-axis region, at the wide angle end. Furthermore, the smallness of the edge thickness at the outermost portion will make the manufacturing difficult. This is not desirable.

If the upper limits of conditional expressions (9-2a) and (9-2b) are exceeded, the amount of correction of chromatic aberration of magnification will become larger than the amount of correction of axial chromatic aberration. If this is the case, when the amount of correction of chromatic aberration of magnification is appropriate, the amount of correction of axial chromatic aberration will be insufficient. Consequently, the performance in the axial region will be deteriorated. This is not desirable. The lower limits of conditional expressions (9-2a) and (9-2b) will not be exceeded because the value of the denominator and the value of the numerator of the terms in conditional expressions (9-2a) and (9-2b) are both positive.

In the electronic image pickup apparatus according to the above-described modes, it is preferred that any one of the following conditional expressions (10-1a), (10-1b), (10-1c), (10-2a), and (10-2b) be satisfied:

$$1.0<Tngl(0)/Tbas(0)<12 \quad (10\text{-}1a),$$

$$0.6<Tnglt(0.7)/Tbast(0.7)<4 \quad (10\text{-}1b),$$

$$0.45<Tnglt(0.9)/Tbast(0.9)<3.0 \quad (10\text{-}1c),$$

$$0<(Tnglt(0.7)/Tbast(0.7))/(Tngl(0)/Tbas(0))<0.9 \quad (10\text{-}2a), \text{ and}$$

$$0<(Tnglt(0.9)/Tbast(0.9))/(Tngl(0)/Tbas(0))<0.8 \quad (10\text{-}2b),$$

where Tngl(0) is the thickness of the refractive optical element A on the optical axis, Tnglt(0.7) is the distance over which a ray having a ray height of 70% of the largest image height on the image pickup element at the telephoto end travels inside the refractive optical element A, Tnglt(0.9) is the distance over which a ray having a ray height of 90% of the largest image height on the image pickup element at the telephoto end travels inside the refractive optical element A, Tbas(0) is the thickness of the optical element B on the optical axis, Tbast(0.7) is the distance over which a ray having a ray height of 70% of the largest image height on the image pickup element at the telephoto end travels inside the optical element B, and Tbast(0.9) is the distance over which a ray having a ray height of 90% of the largest image height on the image pickup element at the telephoto end travels inside the optical element B.

If any one of conditional expressions (10-1a), (10-1b), (10-1c), (10-2a), and (10-2b) is satisfied, axial chromatic aberration and chromatic aberration of magnification can be favorably corrected at the telephoto end. Furthermore, well-balanced correction of axial chromatic aberration and chromatic aberration of magnification can be achieved.

If the upper limits of conditional expressions (10-1a), (10-1b), and (10-1c) are exceeded, axial chromatic aberration will be overcorrected in the axial region, and chromatic aberration of magnification will be overcorrected in the off-axis region, at the telephoto end. Consequently, the imaging performance of the entire optical system will be deteriorated. This is not desirable.

If the lower limits of conditional expressions (10-1a), (10-1b), and (10-1c) are exceeded, undercorrection of axial chromatic aberration will occur in the axial region, and undercorrection of chromatic aberration of magnification will occur in the off-axis region, at the telephoto end. Furthermore, the smallness of the edge thickness at the outermost portion will make the manufacturing difficult. This is not desirable.

If the upper limits of conditional expressions (10-2a) and (10-2b) are exceeded, the amount of correction of chromatic aberration of magnification will become larger than the amount of correction of axial chromatic aberration. If this is the case, when the amount of correction of chromatic aberration of magnification is appropriate, the amount of correction of axial chromatic aberration will be insufficient. Consequently, the performance in the axial region will be deteriorated. This is not desirable. The lower limits of conditional expressions (10-2a) and (10-2b) will not be exceeded because the value of the denominator and the value of the numerator of the terms in conditional expressions (10-2a) and (10-2b) are both positive.

In the electronic image pickup apparatus according to the above-described modes, it is preferred that the following conditional expression (11a) or conditional expression (11b) be satisfied:

$$0.5 < (Tnglt(0.7)/Tngl(0)) < 0.98 \quad (11a), \text{ or}$$

$$0.5 < (Tnglt(0.9)/Tngl(0)) < 0.97 \quad (11b),$$

where $Tngl(0)$ is the thickness of the refractive optical element A on the optical axis, $Tnglt(0.7)$ is the distance over which a ray having a ray height of 70% of the largest image height on the image pickup element at the telephoto end travels inside the refractive optical element A, and $Tnglt(0.9)$ is the distance over which a ray having a ray height of 90% of the largest image height on the image pickup element at the telephoto end travels inside the refractive optical element A.

If conditional expression (11a) or (11b) is satisfied, axial chromatic aberration and chromatic aberration of magnification can be favorably corrected at the telephoto end. Furthermore, well-balanced correction of axial chromatic aberration and chromatic aberration of magnification can be achieved.

If the upper limits of conditional expressions (11a) and (11b) are exceeded, the difference in the thickness of the refractive optical element A between the on-axis portion and the off-axis portion will become little. If this is the case, the amount of correction of chromatic aberration of magnification will become insufficient as compared to the amount of correction of axial chromatic aberration. This is not desirable. On the other hand, if the lower limits of conditional expressions (11a) and (11b) are exceeded, the amount of correction of chromatic aberration of magnification will become excessively large as compared to the amount of correction of axial chromatic aberration. Consequently, the imaging performance of the entire optical system will be deteriorated. This is not desirable.

In the electronic image pickup apparatus according to the above-described modes, it is preferred that the following conditional expression (12a) or conditional expression (12b) be satisfied:

$$0.5 < (Tnglw(0.7)/Tngl(0)) < 0.98 \quad (12a), \text{ or}$$

$$0.3 < (Tnglw(0.9)/Tngl(0)) < 0.95 \quad (12b),$$

where $Tngl(0)$ is the thickness of the refractive optical element A on the optical axis, $Tnglw(0.7)$ is the distance over which a ray having a ray height of 70% of the largest image height on the image pickup element at the wide angle end travels inside the refractive optical element A, and $Tnglw(0.9)$ is the distance over which a ray having a ray height of 90% of the largest image height on the image pickup element at the wide angle end travels inside the refractive optical element A.

If conditional expression (12a) or (12b) is satisfied, axial chromatic aberration and chromatic aberration of magnification can be favorably corrected at the wide angle end. Furthermore, well-balanced correction of axial chromatic aberration and chromatic aberration of magnification can be achieved.

If the upper limits of conditional expressions (12a) and (12b) are exceeded, the difference in the thickness between the on-axis portion and the off-axis portion will become little. If this is the case, the amount of correction of chromatic aberration of magnification will become excessively large as compared to the amount of correction of axial chromatic aberration. Consequently, the imaging performance of the entire optical system will be deteriorated. This is not desirable. On the other hand, if the lower limits of conditional expressions (12a) and (12b) are exceeded, the amount of correction of chromatic aberration of magnification will become insufficient as compared to the amount of correction of axial chromatic aberration. If this is the case, the imaging performance of the entire optical system will be deteriorated. This is not desirable.

EMBODIMENTS

In the following, embodiments of the image forming optical system and the electronic image pickup apparatus according to the present invention will be described in detail with reference to the drawings. The embodiments are not intended to limit the present invention.

The image forming optical system according to each embodiment is an image forming optical system (zoom lens) for use in an electronic image pickup apparatus such as a video camera and a digital camera, and a film camera. In the following embodiments, the "wide angle end" and the "telephoto end" refer to the zoom positions at the time when the magnification changing lens group is located at the respective ends of the range over which it can move mechanically along the optical axis.

All the embodiments are image forming optical systems each including, in order from its object side to its image side, a first lens group having a positive refractive power, a second lens group having a negative refractive power, and an image side lens group. In the present invention, the number of lens groups that constitute the image side lens group is arbitrary, and the image side lens group may include at least one lens group. In other words, the image forming optical systems according to the embodiments may include three or more lens groups.

In each of the embodiment described below, the image forming optical system includes, in order from its object side, a first lens group G1 having a positive refractive power, a second lens group G2 having a negative refractive power, a stop, a third lens group having a positive refractive power, a fourth lens group G4 having a positive refractive power, and a fifth lens group G5 having a positive refractive power. The first lens group G1 includes the above-described refractive optical element A having a positive refractive power, a negative lens (optical element B), and two positive lenses. The configuration of the refractive optical element A and the first lens group G1 provides effective correction of chromatic aberration at the telephoto end.

The second lens group G2 includes a negative lens, a negative lens, a positive lens, and a negative lens. With this configuration of the second lens group G2, a high zoom ratio is achieved.

In the image forming optical systems, the zooming is performed by changing the distances between adjacent lens groups in such a way that the distance between the first lens group G1 and the second lens group G2 is larger, the distance between the second lens group G2 and the third lens group G3 is smaller, and the distance between the third lens group G3 and the fourth lens group G4 is larger, at the telephoto end than at the wide angle end.

The fourth lens group G4 moves along a locus that is convex toward the object side to correct displacement of the image plane during zooming, wherein the distance between the fourth lens group G4 and the fifth lens group G5 satisfies conditional expression (20).

In the following, the embodiments will be described in detail.

Figure 1B:
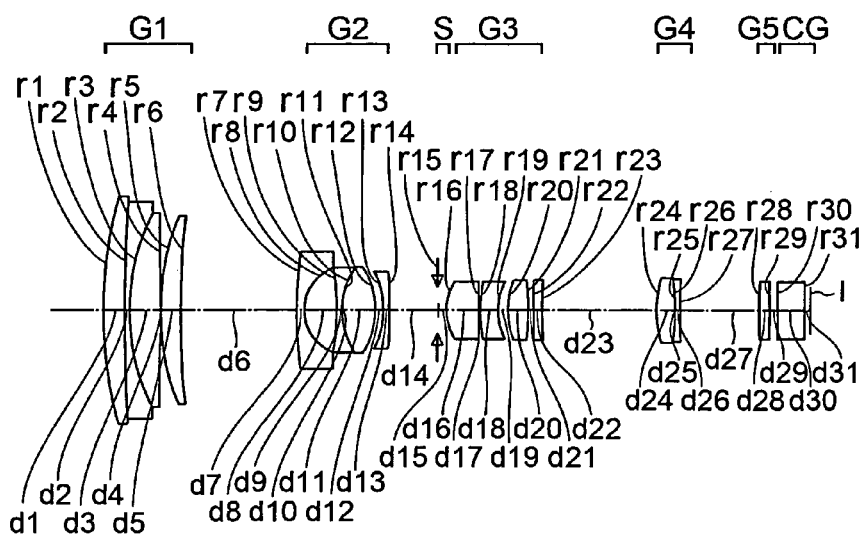
Figure 1C:
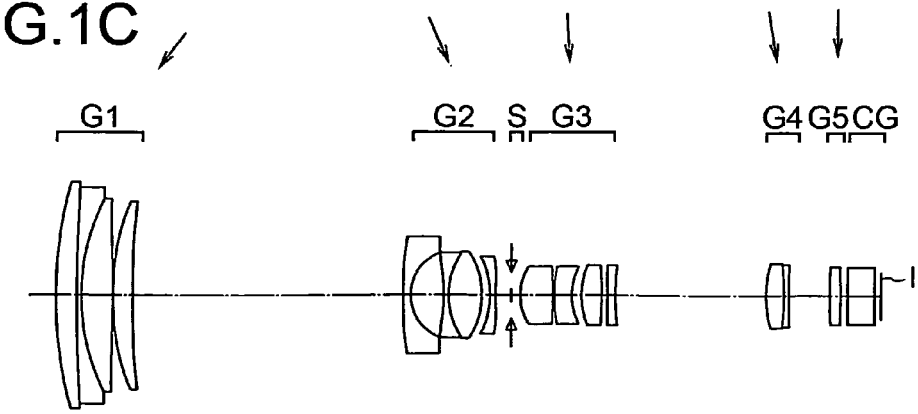

Now, a zoom lens according to embodiment 1 of the present invention will be described. FIGS. 1A, 1B, and 1C are cross sectional views taken along the optical axis showing the optical configuration of the zoom lens according to embodiment 1 of the present invention in the state in which the zoom lens is focused on an object point at infinity, where FIG. 1A is a cross sectional view of the zoom lens at the wide angle end, FIG. 1B is a cross sectional view of the zoom lens in an intermediate focal length state, and FIG. 1C is a cross sectional view of the zoom lens at the telephoto end.

Figure 2A:
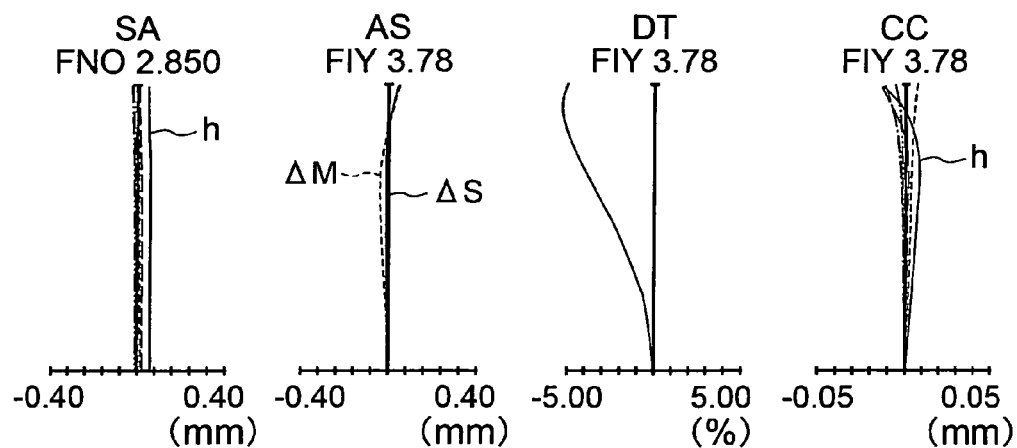
FIGS. 2A, 2B, and 2C are diagrams showing spherical aberration, astigmatism, distortion, and chromatic aberration of magnification of the zoom lens according to embodiment 1 in the state in which the zoom lens is focused on an object point at infinity, where
Figure 2B:
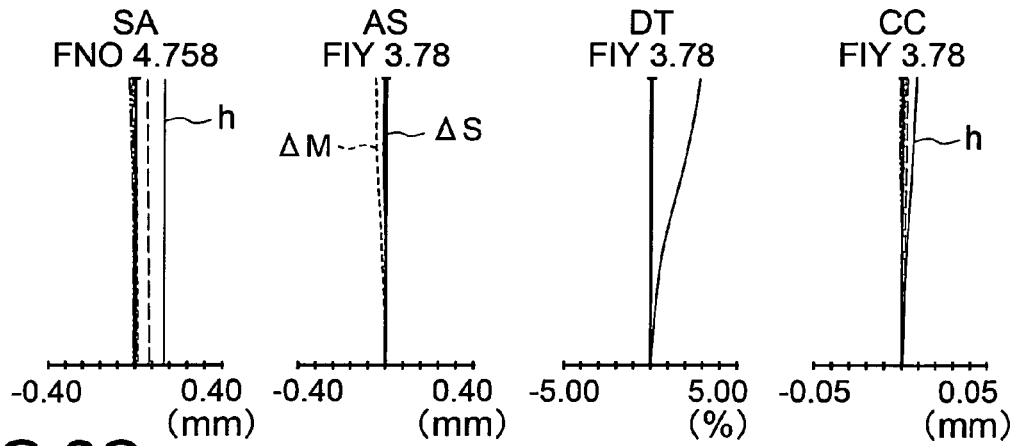
Figure 2C:
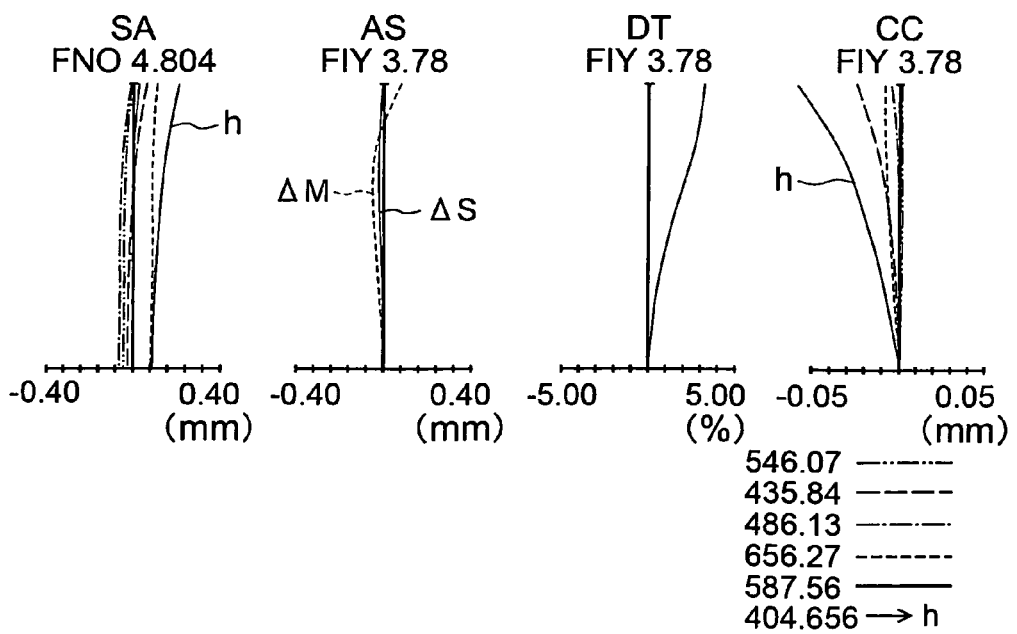

FIGS. 2A, 2B, and 2C are diagrams showing spherical aberration (SA), astigmatism (AS), distortion (DT), and chromatic aberration of magnification (CC) of the zoom lens according to embodiment 1 in the state in which the zoom lens is focused on an object point at infinity, where FIG. 2A is for the wide angle end, FIG. 2B is for the intermediate focal length state, and FIG. 2C is for the telephoto end. Sign "FIY" represents the image height. The signs in the aberration diagrams are commonly used also in the embodiments described in the following. In FIGS. 2A, 2B, and 2C, aberrations with respect to the d-line and the h-line are both represented by solid lines, and the solid lines representing the aberrations with respect to the h-line are indicated by the symbol "h" with lead lines.

As shown in FIGS. 1A, 1B, and 1C, the zoom lens according to embodiment 1 includes, in order from its object side, a first lens group G1 having a positive refractive power, a second lens group G2 having a negative refractive power, an aperture stop S, a third lens group G3 having a positive refractive power, a fourth lens group G4 having a positive refractive power, and a fifth lens group G5 having a positive refractive power. In the cross sectional views of the lenses according to this and all the embodiments described in the following, CG denotes a cover glass and I denotes the image pickup surface of an electronic image pickup element.

The first lens group G1 includes, in order from the object side, a cemented lens including a positive meniscus lens L1 (a refractive optical element A) having a convex surface directed toward the object side, a negative meniscus lens L2 (an optical element B) having a convex surface directed toward the object side and a positive meniscus lens L3 having a convex surface directed toward the object side, and a positive meniscus lens L4 having a convex surface directed toward the object side. The first lens group G1 has a positive refractive power as a whole. The relative partial dispersion θgF of the refractive optical element A of the cemented lens in the first lens group G1 is 0.668.

The second lens group G2 includes, in order from the object side, a negative meniscus lens L5 having a convex surface directed toward the object side, a cemented lens including a biconcave negative lens L6, a cementing layer L7 and a biconvex positive lens L8, and a negative meniscus lens L9 having a convex surface directed toward the image side. The second lens group G2 has a negative refractive power as a whole. In this and all the embodiments described in the following, what is denoted by "L7" is not a lens but a cementing layer.

The third lens group G3 includes, in order from the object side, a biconvex positive lens L10, a negative meniscus lens L11 having a convex surface directed toward the object side, a biconvex positive lens L12, and a negative meniscus lens L13 having a convex surface directed toward the object side. The third lens group G3 has a positive refractive power as a whole.

The fourth lens group G4 includes a cemented lens including a biconvex positive lens L14, a cementing layer L15 and a biconcave negative lens L16 arranged in order from the object side. The fourth lens group G4 has a positive refractive power as a whole. In this and all the embodiments described in the following, L15 denotes not a lens but a cementing layer.

The fifth lens group G5 includes a biconvex positive lens L17. The fifth lens group G5 has a positive refractive power as a whole.

During zooming from the wide angle end to the telephoto end, the first lens group G1 moves toward the object side, the second lens group G2 moves first toward the object side and thereafter toward the image side, the third lens group G3 moves toward the object side and thereafter stays substantially stationary with a very small amount of movement, the fourth lens group G4 moves first toward the object side and thereafter toward the image side, and the fifth lens group G5 is fixed.

There are six aspheric surfaces in total, which include the image side surface of the image side negative meniscus lens L9 in the second lens group G2, the object side surface of the object side biconvex positive lens L10 in the third lens group G3, both surfaces of the image side negative meniscus lens L13 in the third lens group G3, and both surfaces of the biconvex positive lens L17 in the fifth lens group G5.

Figure 3A:
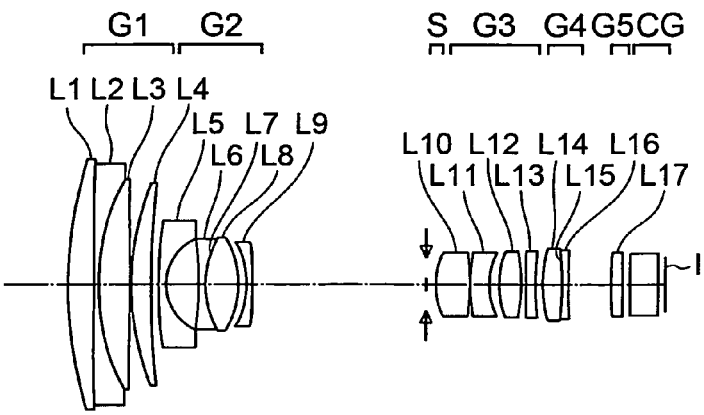
FIGS. 3A, 3B, and 3C are cross sectional views taken along the optical axis showing the optical configuration of a zoom lens according to embodiment 2 of the present invention in the state in which the zoom lens is focused on an object point at infinity, respectively at the wide angle end, at an intermediate focal length, and at the telephoto end.
Figure 3B:
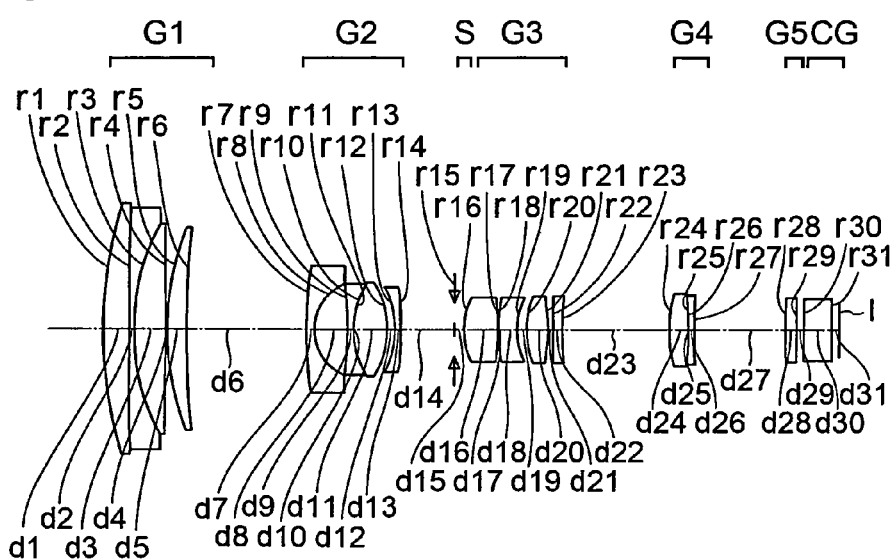
Figure 3C:
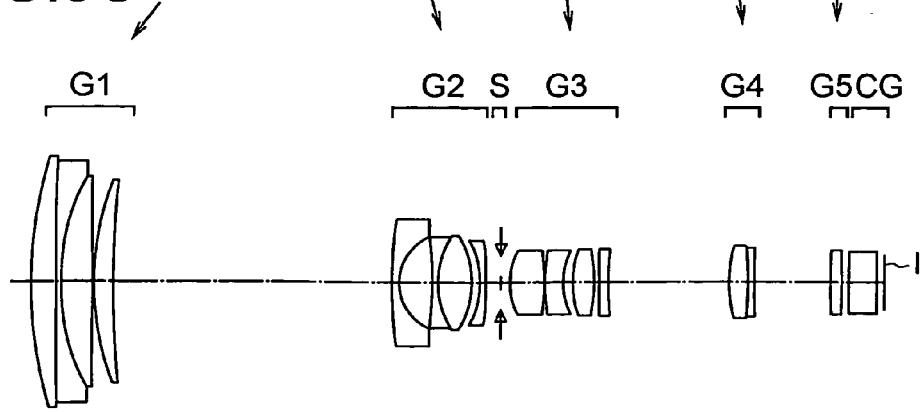

Next, a zoom lens according to embodiment 2 of the present invention will be described. FIGS. 3A, 3B, and 3C are cross sectional views taken along the optical axis showing the optical configuration of the zoom lens according to embodiment 2 of the present invention in the state in which the zoom lens is focused on an object point at infinity, where FIG. 3A is a cross sectional view of the zoom lens at the wide angle end, FIG. 3B is a cross sectional view of the zoom lens in an intermediate focal length state, and FIG. 3C is a cross sectional view of the zoom lens at the telephoto end.

Figure 4A:
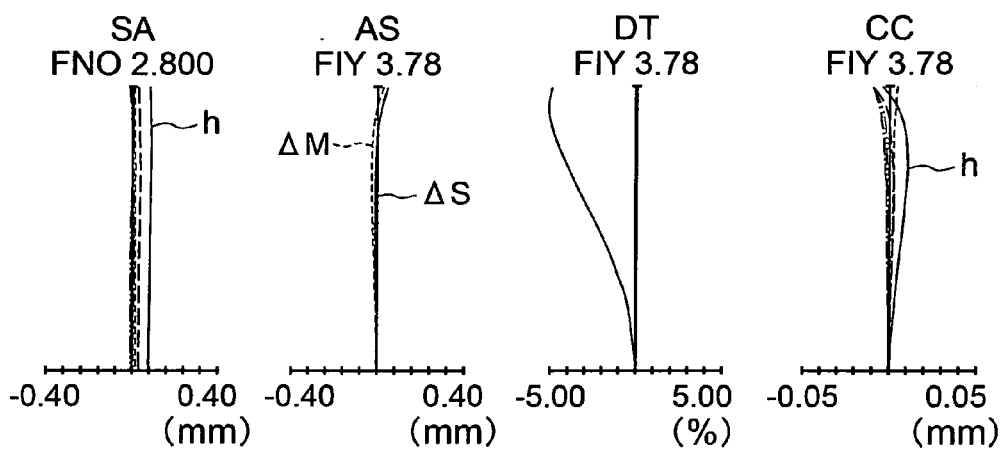
FIGS. 4A, 4B, and 4C are diagrams showing spherical aberration, astigmatism, distortion, and chromatic aberration of magnification of the zoom lens according to embodiment 2 in the state in which the zoom lens is focused on an object point at infinity, where
Figure 4B:
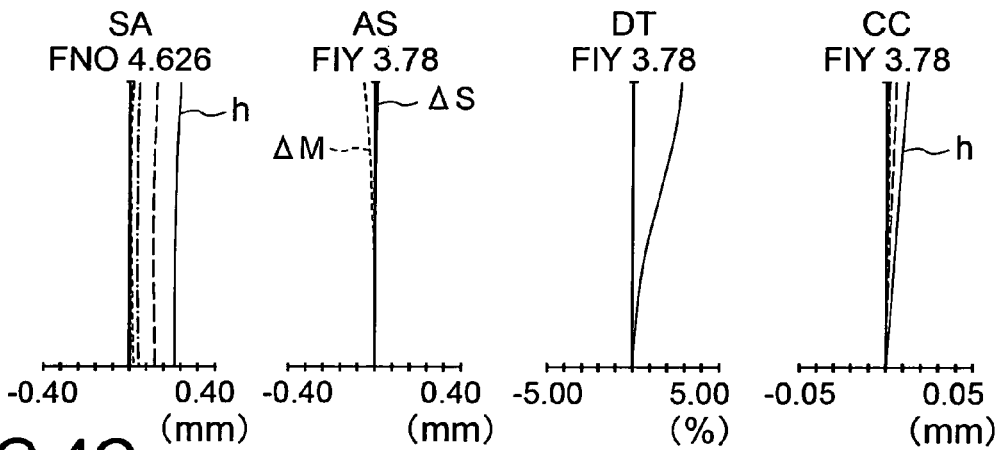
Figure 4C:
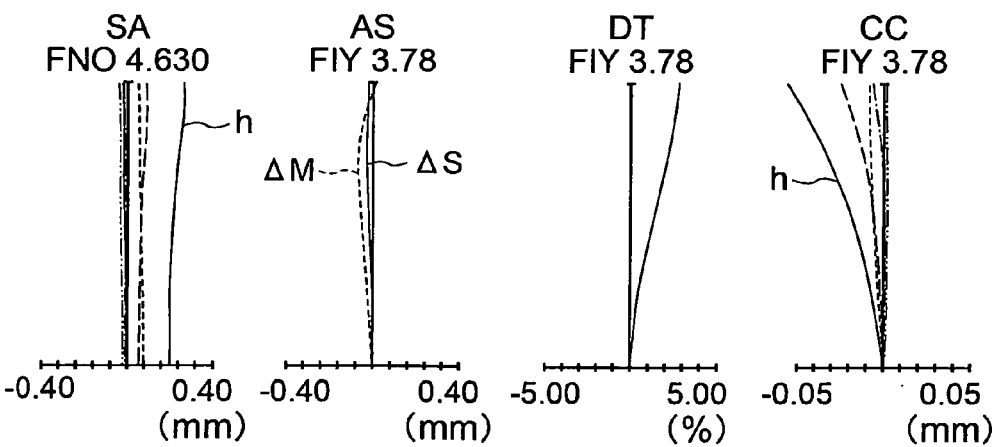

FIGS. 4A, 4B, and 4C are diagrams showing spherical aberration (SA), astigmatism (AS), distortion (DT), and chromatic aberration of magnification (CC) of the zoom lens according to embodiment 2 in the state in which the zoom lens is focused on an object point at infinity, where FIG. 4A is for the wide angle end, FIG. 4B is for the intermediate focal length state, and FIG. 4C is for the telephoto end. In FIGS. 4A, 4B, and 4C, aberrations with respect to the d-line and the h-line are both represented by solid lines, and the solid lines representing the aberrations with respect to the h-line are indicated by the symbol "h" with lead lines.

As shown in FIGS. 3A, 3B, and 3C, the zoom lens according to embodiment 2 includes, in order from its object side, a first lens group G1 having a positive refractive power, a second lens group G2 having a negative refractive power, an aperture stop S, a third lens group G3 having a positive refractive power, a fourth lens group G4 having a positive refractive power, and a fifth lens group G5 having a positive refractive power.

The first lens group G1 includes, in order from the object side, a cemented lens including a positive meniscus lens L1 (a refractive optical element A) having a convex surface directed toward the object side, a negative meniscus lens L2 (an optical element B) having a convex surface directed toward the object side and a positive meniscus lens L3 having a convex surface directed toward the object side, and a positive meniscus lens L4 having a convex surface directed toward the object side. The first lens group G1 has a positive refractive power as a whole. The relative partial dispersion θgF of the refractive optical element A of the cemented lens in the first lens group G1 is 0.668.

The second lens group G2 includes, in order from the object side, a negative meniscus lens L5 having a convex surface directed toward the object side, a cemented lens including a biconcave negative lens L6, a cementing layer L7 and a biconvex positive lens L8, and a negative meniscus lens L9 having a convex surface directed toward the image side. The second lens group G2 has a negative refractive power as a whole.

The third lens group G3 includes, in order from the object side, a biconvex positive lens L10, a negative meniscus lens L11 having a convex surface directed toward the object side, a biconvex positive lens L12, and a negative meniscus lens L13 having a convex surface directed toward the object side. The third lens group G3 has a positive refractive power as a whole.

The fourth lens group G4 includes a cemented lens including a biconvex positive lens L14, a cementing layer L15 and a biconcave negative lens L16 arranged in order from the object side. The fourth lens group has a positive refractive power as a whole.

The fifth lens group G5 includes a biconvex positive lens L17. The fifth lens group G5 has a positive refractive power as a whole.

During zooming from the wide angle end to the telephoto end, the first lens group G1 moves toward the object side, the second lens group G2 moves first toward the object side and thereafter toward the image side, the third lens group G3 moves toward the object side and thereafter stays substantially stationary with a very small amount of movement, the fourth lens group G4 moves first toward the object side and thereafter toward the image side, and the fifth lens group G5 is fixed.

There are six aspheric surfaces in total, which include the image side surface of the image side negative meniscus lens L9 in the second lens group G2, the object side surface of the object side biconvex positive lens L10 in the third lens group G3, both surfaces of the image side negative meniscus lens L13 in the third lens group G3, and both surfaces of the biconvex positive lens L17 in the fifth lens group G5.

Figure 5A:
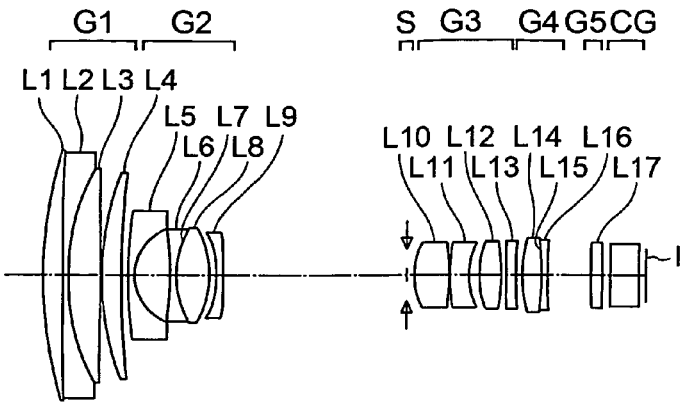
FIGS. 5A, 5B, and 5C are cross sectional views taken along the optical axis showing the optical configuration of a zoom lens according to embodiment 3 of the present invention in the state in which the zoom lens is focused on an object point at infinity, respectively at the wide angle end, at an intermediate focal length, and at the telephoto end.
Figure 5B:
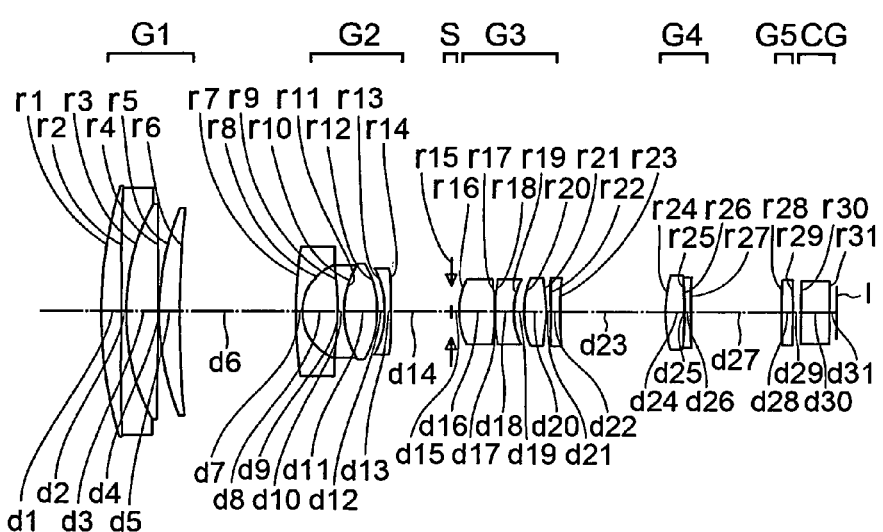
Figure 5C:
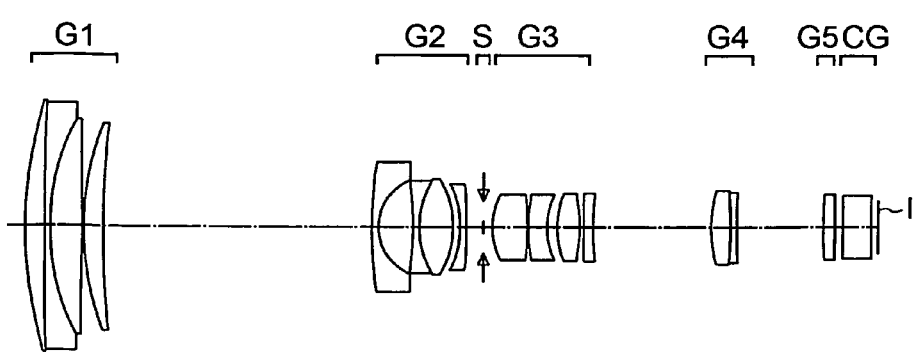

Next, a zoom lens according to embodiment 3 of the present invention will be described. FIGS. 5A, 5B, and 5C are cross sectional views taken along the optical axis showing the optical configuration of the zoom lens according to embodiment 3 of the present invention in the state in which the zoom lens is focused on an object point at infinity, where FIG. 5A is a cross sectional view of the zoom lens at the wide angle end, FIG. 5B is a cross sectional view of the zoom lens in an intermediate focal length state, and FIG. 5C is a cross sectional view of the zoom lens at the telephoto end.

Figure 6A:
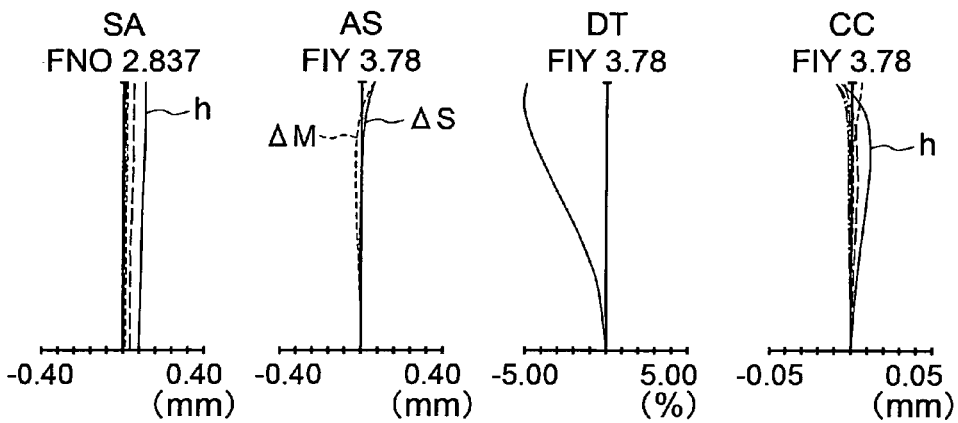
FIGS. 6A, 6B, and 6C are diagrams showing spherical aberration, astigmatism, distortion, and chromatic aberration of magnification of the zoom lens according to embodiment 3 in the state in which the zoom lens is focused on an object point at infinity, where
Figure 6B:
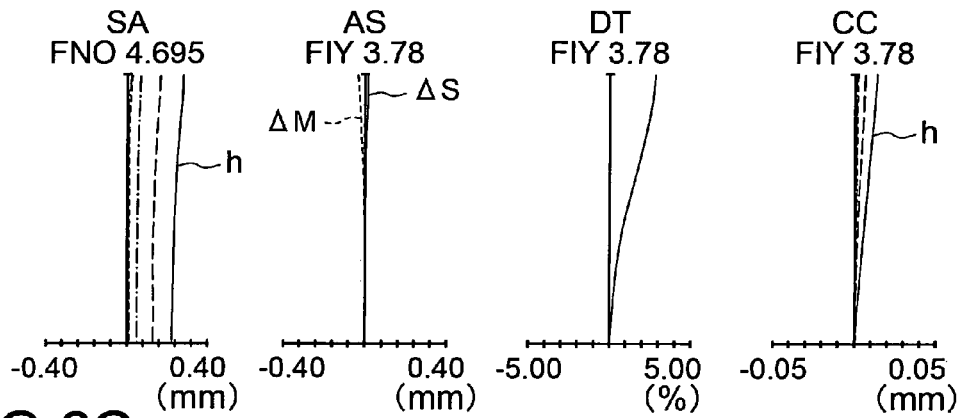
Figure 6C:
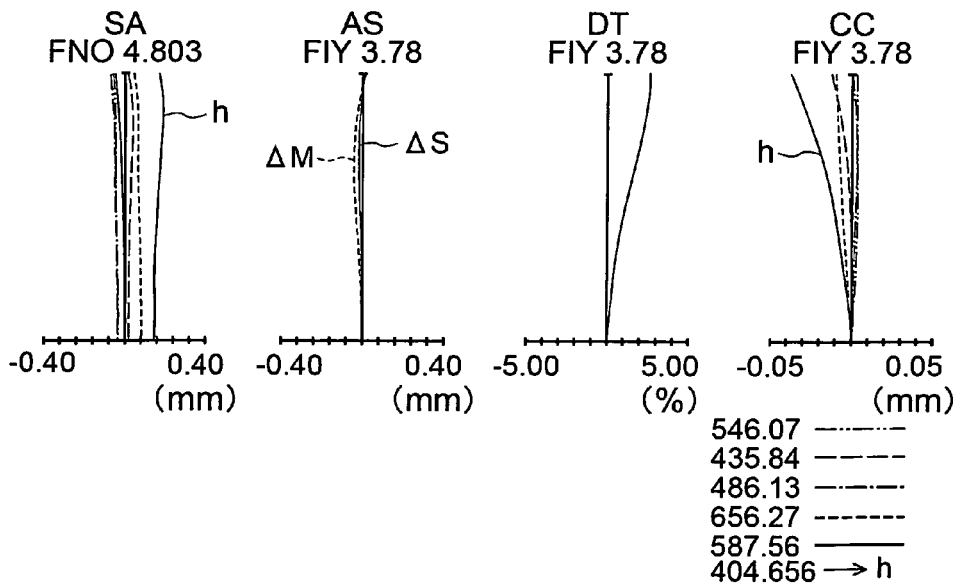

FIGS. 6A, 6B, and 6C are diagrams showing spherical aberration (SA), astigmatism (AS), distortion (DT), and chromatic aberration of magnification (CC) of the zoom lens according to embodiment 3 in the state in which the zoom lens is focused on an object point at infinity, where FIG. 6A is for the wide angle end, FIG. 6B is for the intermediate focal length state, and FIG. 6C is for the telephoto end. In FIGS. 6A, 6B, and 6C, aberrations with respect to the d-line and the h-line are both represented by solid lines, and the solid lines representing the aberrations with respect to the h-line are indicated by the symbol "h" with lead lines.

As shown in FIGS. 5A, 5B, and 5C, the zoom lens according to embodiment 3 includes, in order from its object side, a first lens group G1 having a positive refractive power, a second lens group G2 having a negative refractive power, an aperture stop S, a third lens group G3 having a positive refractive power, a fourth lens group G4 having a positive refractive power, and a fifth lens group G5 having a positive refractive power.

The first lens group G1 includes, in order from the object side, a cemented lens including a positive meniscus lens L1 (a refractive optical element A) having a convex surface directed toward the object side, a negative meniscus lens L2 (an optical element B) having a convex surface directed toward the object side and a positive meniscus lens L3 having a convex surface directed toward the object side, and a positive meniscus lens L4 having a convex surface directed toward the object side. The first lens group G1 has a positive refractive power as a whole. The relative partial dispersion θgF of the refractive optical element A of the cemented lens in the first lens group G1 is 0.668.

The second lens group G2 includes, in order from the object side, a negative meniscus lens L5 having a convex surface directed toward the object side, a cemented lens including a biconcave negative lens L6, a cementing layer L7 and a biconvex positive lens L8, and a negative meniscus lens L9 having a convex surface directed toward the image side. The second lens group G2 has a negative refractive power as a whole.

The third lens group G3 includes, in order from the object side, a biconvex positive lens L10, a negative meniscus lens L11 having a convex surface directed toward the object side, a biconvex positive lens L12, and a negative meniscus lens L13 having a convex surface directed toward the object side. The third lens group G3 has a positive refractive power as a whole.

The fourth lens group G4 includes a cemented lens including a biconvex positive lens L14, a cementing layer L15 and a biconcave negative lens L16 arranged in order from the object side. The fourth lens group G4 has a positive refractive power as a whole.

The fifth lens group G5 includes a biconvex positive lens L17. The fifth lens group G5 has a positive refractive power as a whole.

During zooming from the wide angle end to the telephoto end, the first lens group G1 moves toward the object side, the second lens group G2 moves first toward the object side and thereafter toward the image side, the third lens group G3 moves toward the object side, the fourth lens group G4 moves first toward the object side and thereafter toward the image side, and the fifth lens group G5 is fixed.

There are six aspheric surfaces in total, which include the image side surface of the image side negative meniscus lens L9 in the second lens group G2, the object side surface of the object side biconvex positive lens L10 in the third lens group G3, both surfaces of the image side negative meniscus lens L13 in the third lens group G3, and both surfaces of the biconvex positive lens L17 in the fifth lens group G5.

Figure 7A:
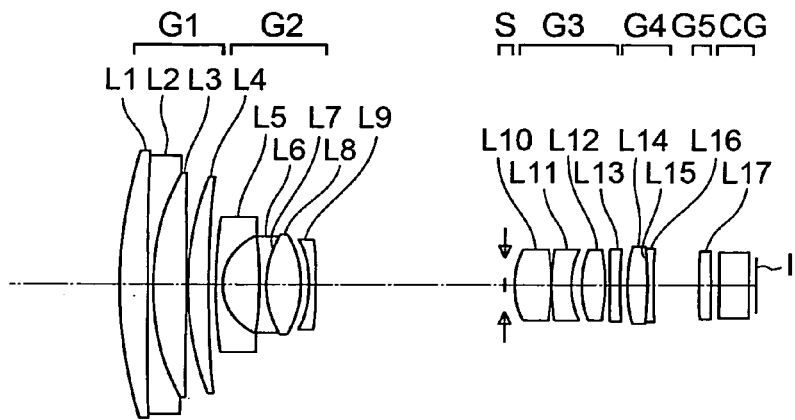
FIGS. 7A, 7B, and 7C are cross sectional views taken along the optical axis showing the optical configuration of a zoom lens according to embodiment 4 of the present invention in the state in which the zoom lens is focused on an object point at infinity, respectively at the wide angle end, at an intermediate focal length, and at the telephoto end.
Figure 7B:
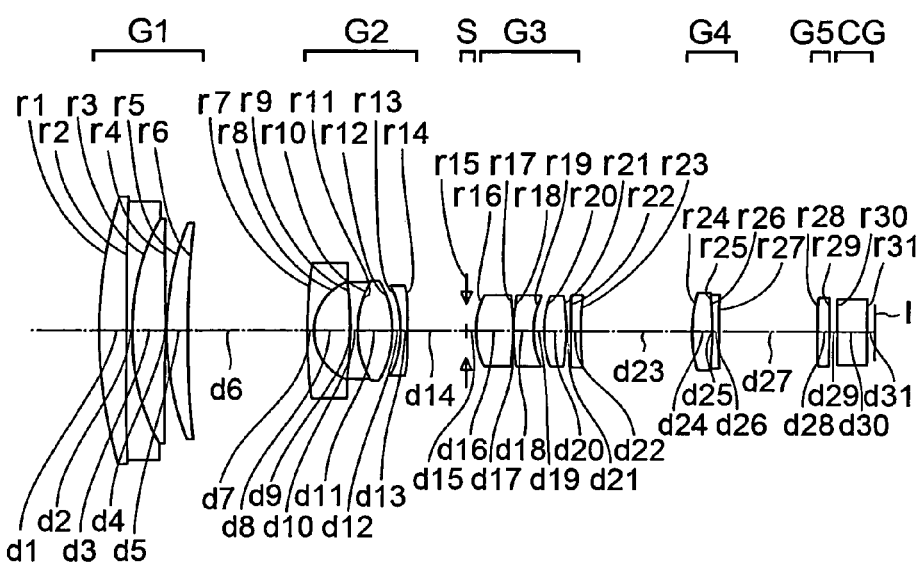
Figure 7C:
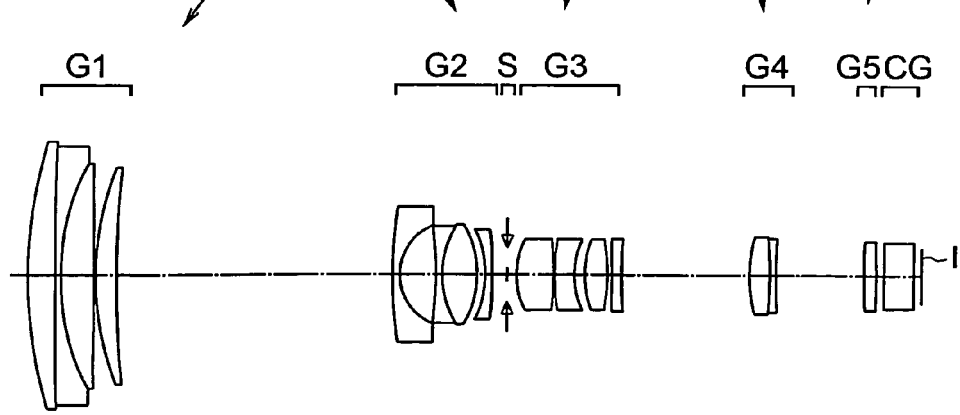

Next, a zoom lens according to embodiment 4 of the present invention will be described. FIGS. 7A, 7B, and 7C are cross sectional views taken along the optical axis showing the optical configuration of the zoom lens according to embodiment 4 of the present invention in the state in which the zoom lens is focused on an object point at infinity, where FIG. 7A is a cross sectional view of the zoom lens at the wide angle end, FIG. 7B is a cross sectional view of the zoom lens in an intermediate focal length state, and FIG. 7C is a cross sectional view of the zoom lens at the telephoto end.

Figure 8A:
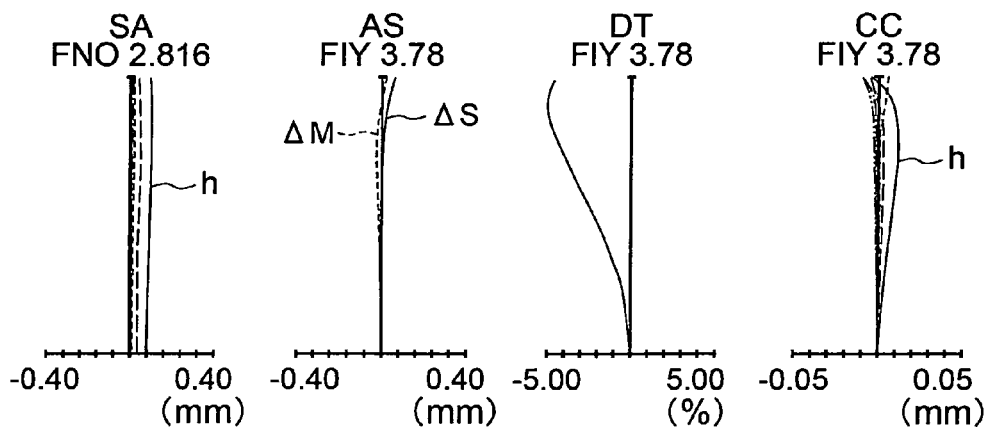
FIGS. 8A, 8B, and 8C are diagrams showing spherical aberration, astigmatism, distortion, and chromatic aberration of magnification of the zoom lens according to embodiment 4 in the state in which the zoom lens is focused on an object point at infinity, where
Figure 8B:
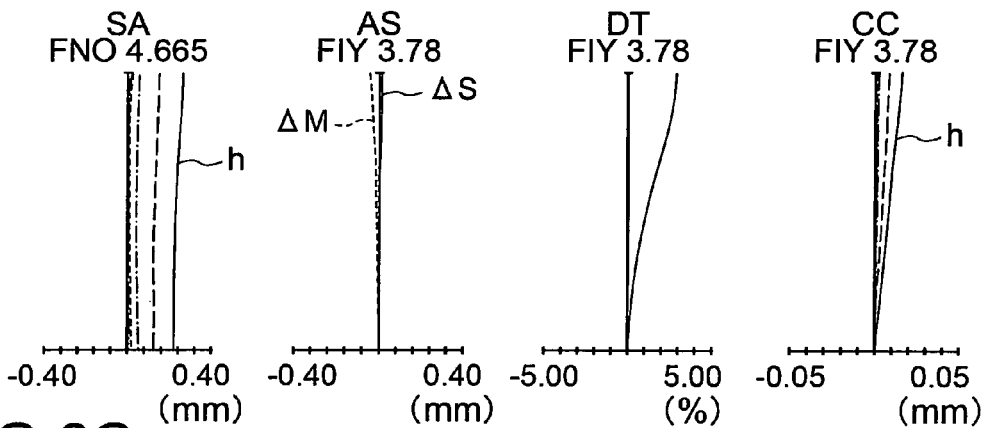
Figure 8C:
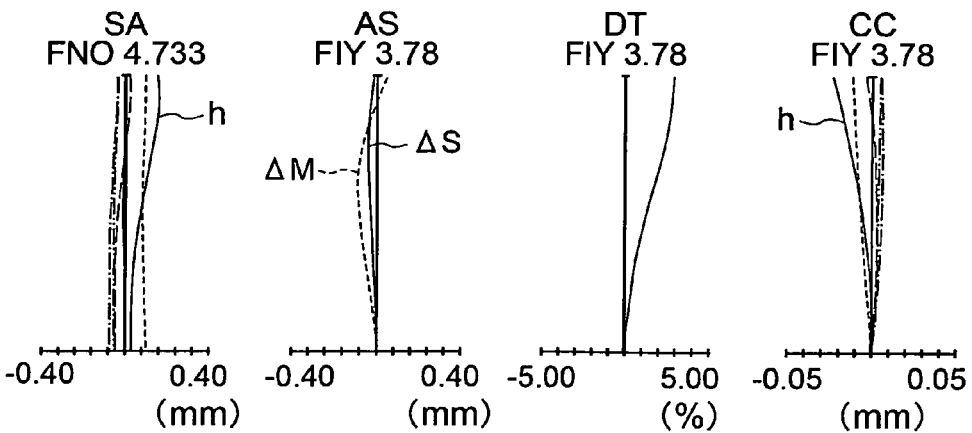

FIGS. 8A, 8B, and 8C are diagrams showing spherical aberration (SA), astigmatism (AS), distortion (DT), and chromatic aberration of magnification (CC) of the zoom lens according to embodiment 4 in the state in which the zoom lens is focused on an object point at infinity, where FIG. 8A is for the wide angle end, FIG. 8B is for the intermediate focal length state, and FIG. 8C is for the telephoto end. In FIGS. 8A, 8B, and 8C, aberrations with respect to the d-line and the h-line are both represented by solid lines, and the solid lines representing the aberrations with respect to the h-line are indicated by the symbol "h" with lead lines.

As shown in FIGS. 7A, 7B, and 7C, the zoom lens according to embodiment 4 includes, in order from its object side, a first lens group G1 having a positive refractive power, a second lens group G2 having a negative refractive power, an aperture stop S, a third lens group G3 having a positive refractive power, a fourth lens group G4 having a positive refractive power, and a fifth lens group G5 having a positive refractive power.

The first lens group G1 includes, in order from the object side, a cemented lens including a biconvex positive lens L1 (a refractive optical element A), a biconcave negative lens L2 (an optical element B) and a positive meniscus lens L3 having a convex surface directed toward the object side, and a positive meniscus lens L4 having a convex surface directed toward the object side. The first lens group G1 has a positive refractive power as a whole. The relative partial dispersion θgF of the refractive optical element A of the cemented lens in the first lens group G1 is 0.668.

The second lens group G2 includes, in order from the object side, a negative meniscus lens L5 having a convex surface directed toward the object side, a cemented lens including a biconcave negative lens L6, a cementing layer L7 and a biconvex positive lens L8, and a negative meniscus lens L9 having a convex surface directed toward the image side. The second lens group G2 has a negative refractive power as a whole.

The third lens group G3 includes, in order from the object side, a biconvex positive lens L10, a negative meniscus lens L11 having a convex surface directed toward the object side, a biconvex positive lens L12, and a negative meniscus lens L13 having a convex surface directed toward the object side. The third lens group G3 has a positive refractive power as a whole.

The fourth lens group G4 includes a cemented lens including a biconvex positive lens L14, a cementing layer L15 and a biconcave negative lens L16 arranged in order from the object side. The fourth lens group G4 has a positive refractive power as a whole.

The fifth lens group G5 includes a biconvex positive lens L17. The fifth lens group G5 has a positive refractive power as a whole.

During zooming from the wide angle end to the telephoto end, the first lens group G1 moves toward the object side, the second lens group G2 moves first toward the object side and thereafter toward the image side, the third lens group G3 moves toward the object side, the fourth lens group G4 moves first toward the object side and thereafter toward the image side, and the fifth lens group G5 is fixed.

There are seven aspheric surfaces in total, which include the image side surface of the biconvex positive lens L1 in the first lens group G1, the image side surface of the image side negative meniscus lens L9 in the second lens group G2, the object side surface of the object side biconvex positive lens L10 in the third lens group G3, both surfaces of the image side negative meniscus lens L13 in the third lens group G3, and both surfaces of the biconvex positive lens L17 in the fifth lens group G5.

Figure 9A:
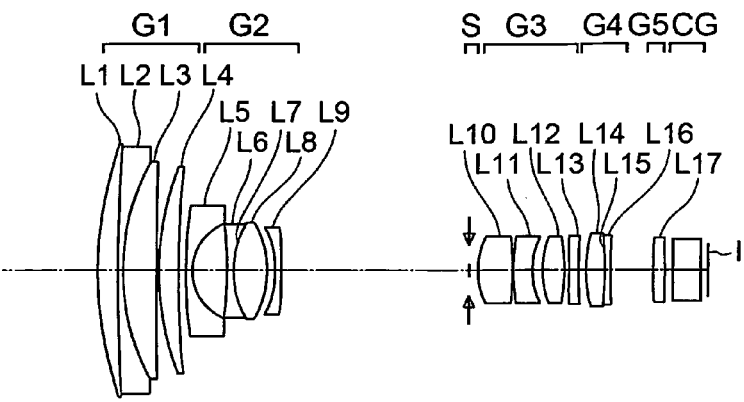
FIGS. 9A, 9B, and 9C are cross sectional views taken along the optical axis showing the optical configuration of a zoom lens according to embodiment 5 of the present invention in the state in which the zoom lens is focused on an object point at infinity, respectively at the wide angle end, at an intermediate focal length, and at the telephoto end.
Figure 9B:
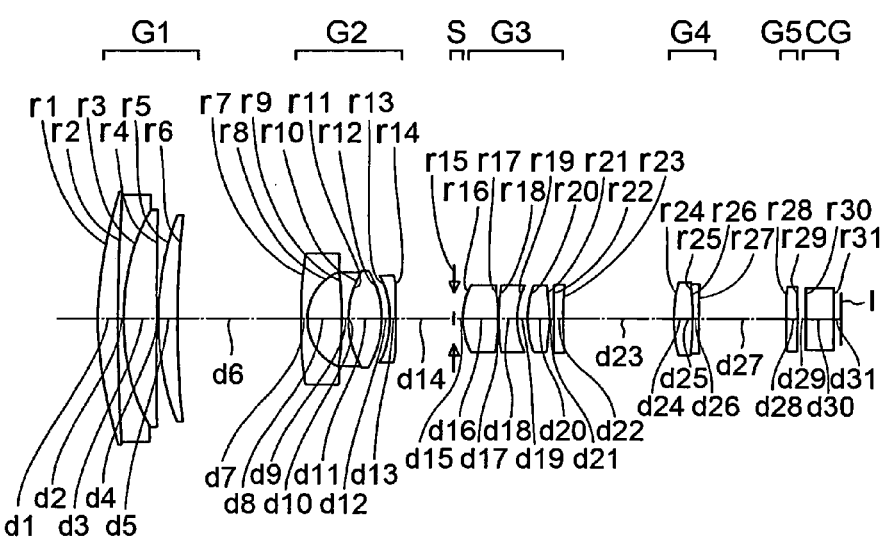
Figure 9C:
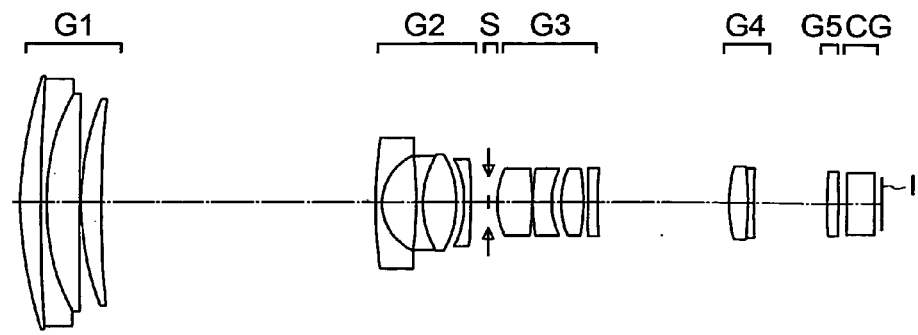

Next, a zoom lens according to embodiment 5 of the present invention will be described. FIGS. 9A, 9B, and 9C are cross sectional views taken along the optical axis showing the optical configuration of the zoom lens according to embodiment 5 of the present invention in the state in which the zoom lens is focused on an object point at infinity, where FIG. 9A is a cross sectional view of the zoom lens at the wide angle end, FIG. 9B is a cross sectional view of the zoom lens in an intermediate focal length state, and FIG. 9C is a cross sectional view of the zoom lens at the telephoto end.

Figure 10A:
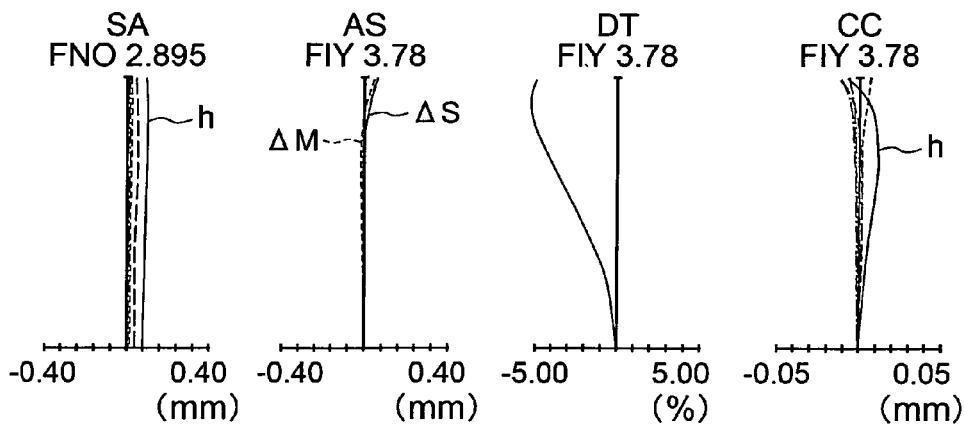
FIGS. 10A, 10B, and 10C are diagrams showing spherical aberration, astigmatism, distortion, and chromatic aberration of magnification of the zoom lens according to embodiment 5 in the state in which the zoom lens is focused on an object point at infinity, where
Figure 10B:
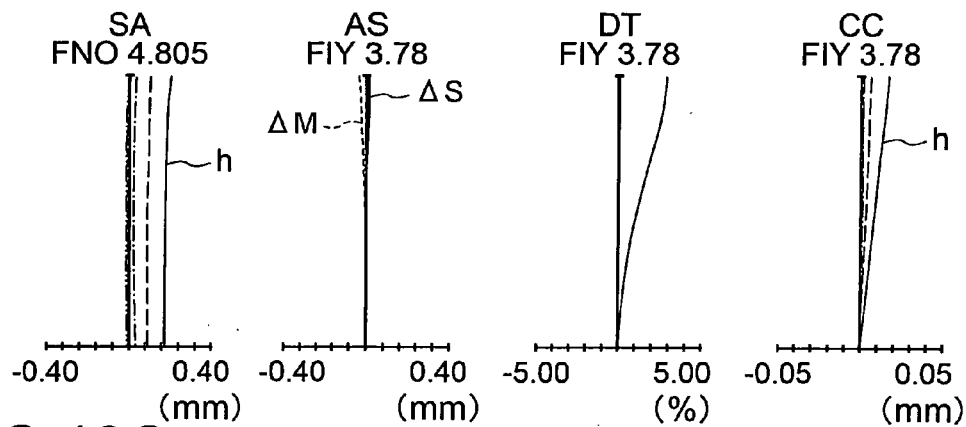
Figure 10C:
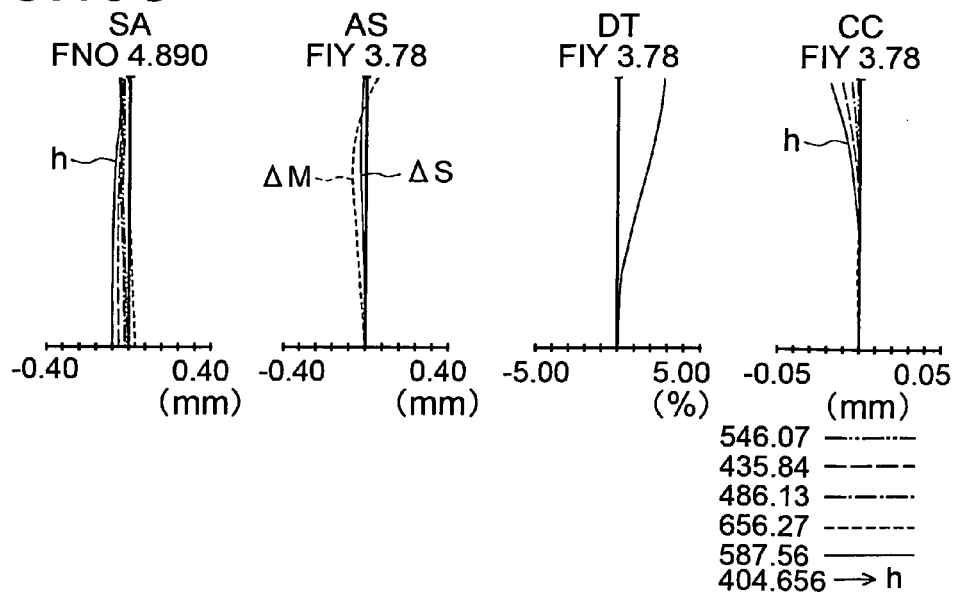

FIGS. 10A, 10B, and 10C are diagrams showing spherical aberration (SA), astigmatism (AS), distortion (DT), and chromatic aberration of magnification (CC) of the zoom lens according to embodiment 5 in the state in which the zoom lens is focused on an object point at infinity, where FIG. 10A is for the wide angle end, FIG. 10B is for the intermediate focal length state, and FIG. 10C is for the telephoto end. In FIGS. 10A, 10B, and 10C, aberrations with respect to the d-line and the h-line are both represented by solid lines, and the solid lines representing the aberrations with respect to the h-line are indicated by the symbol "h" with lead lines.

As shown in FIGS. 9A, 9B, and 9C, the zoom lens according to embodiment 5 includes, in order from its object side, a first lens group G1 having a positive refractive power, a second lens group G2 having a negative refractive power, an aperture stop S, a third lens group G3 having a positive refractive power, a fourth lens group G4 having a positive refractive power, and a fifth lens group G5 having a positive refractive power.

The first lens group G1 includes, in order from the object side, a cemented lens including a positive meniscus lens L1 (a refractive optical element A) having a convex surface directed toward the object side, a negative meniscus lens L2 (an optical element B) having a convex surface directed toward the object side and a biconvex positive lens L3, and a positive meniscus lens L4 having a convex surface directed toward the object side. The first lens group G1 has a positive refractive power as a whole. The relative partial dispersion θgF of the refractive optical element A of the cemented lens in the first lens group G1 is 0.668.

The second lens group G2 includes, in order from the object side, a negative meniscus lens L5 having a convex surface directed toward the object side, a cemented lens including a biconcave negative lens L6, a cementing layer L7 and a biconvex positive lens L8, and a negative meniscus lens L9 having a convex surface directed toward the image side. The second lens group G2 has a negative refractive power as a whole.

The third lens group G3 includes, in order from the object side, a biconvex positive lens L10, a negative meniscus lens L11 having a convex surface directed toward the object side, a biconvex positive lens L12, and a negative meniscus lens L13 having a convex surface directed toward the object side. The third lens group G3 has a positive refractive power as a whole.

The fourth lens group G4 includes a cemented lens including a biconvex positive lens L14, a cementing layer L15 and a biconcave negative lens L16 arranged in order from the object side. The fourth lens group G4 has a positive refractive power as a whole.

The fifth lens group G5 includes a biconvex positive lens L17. The fifth lens group G5 has a positive refractive power as a whole.

During zooming from the wide angle end to the telephoto end, the first lens group G1 moves toward the object side, the second lens group G2 moves first toward the object side and thereafter toward the image side, the third lens group G3 moves toward the object side, the fourth lens group G4 moves first toward the object side and thereafter toward the image side, and the fifth lens group G5 is fixed.

There are six aspheric surfaces in total, which include the image side surface of the image side negative meniscus lens L9 in the second lens group G2, the object side surface of the object side biconvex positive lens L10 in the third lens group G3, both surfaces of the image side negative meniscus lens L13 in the third lens group G3, and both surfaces of the biconvex positive lens L17 in the fifth lens group G5.

Figure 11A:
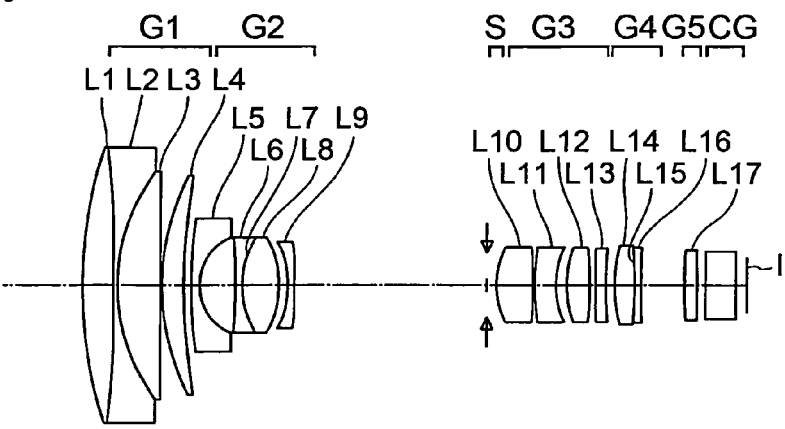
FIGS. 11A, 11B, and 11C are cross sectional views taken along the optical axis showing the optical configuration of a zoom lens according to embodiment 6 of the present invention in the state in which the zoom lens is focused on an object point at infinity, respectively at the wide angle end, at an intermediate focal length, and at the telephoto end.
Figure 11B:
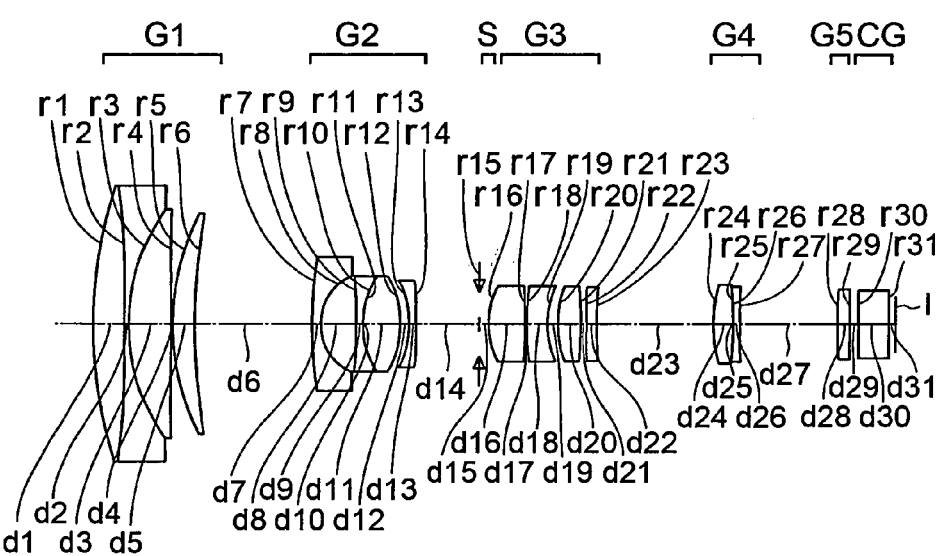
Figure 11C:
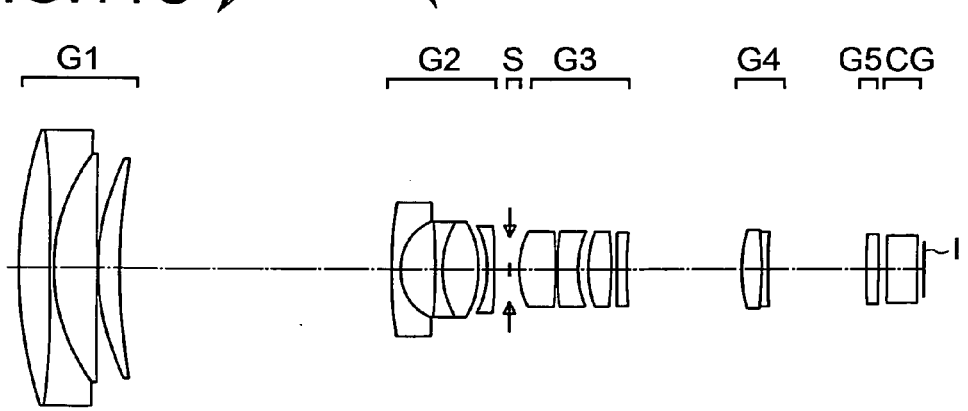

Next, a zoom lens according to embodiment 6 of the present invention will be described. FIGS. 11A, 11B, and 11C are cross sectional views taken along the optical axis showing the optical configuration of the zoom lens according to embodiment 6 of the present invention in the state in which the zoom lens is focused on an object point at infinity, where FIG. 11A is a cross sectional view of the zoom lens at the wide angle end, FIG. 11B is a cross sectional view of the zoom lens in an intermediate focal length state, and FIG. 11C is a cross sectional view of the zoom lens at the telephoto end.

Figure 12A:
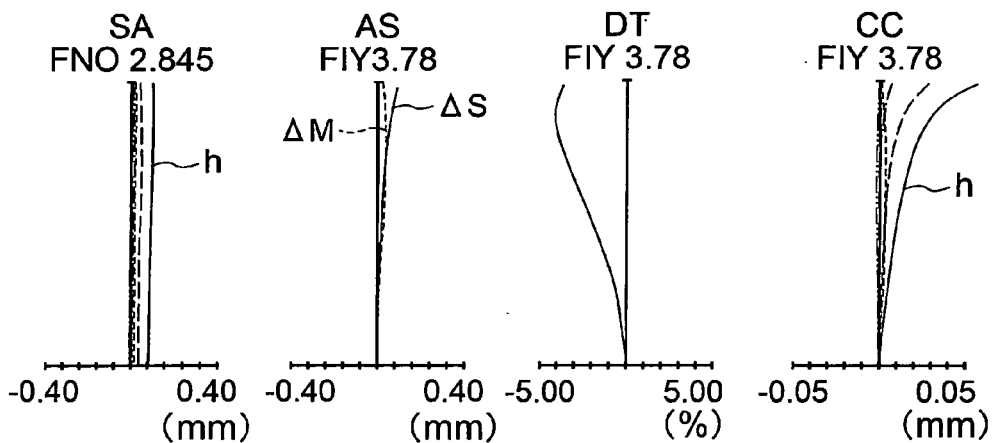
FIGS. 12A, 12B, and 12C are diagrams showing spherical aberration, astigmatism, distortion, and chromatic aberration of magnification of the zoom lens according to embodiment 6 in the state in which the zoom lens is focused on an object point at infinity, where
Figure 12B:
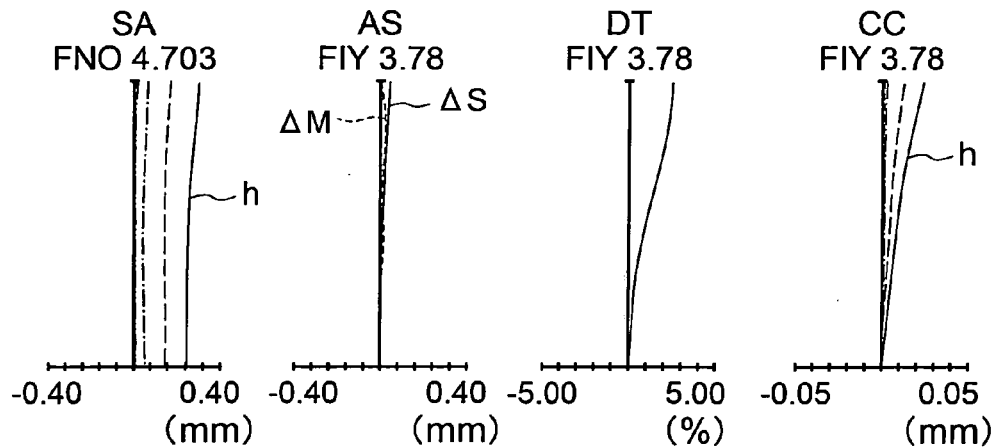
Figure 12C:
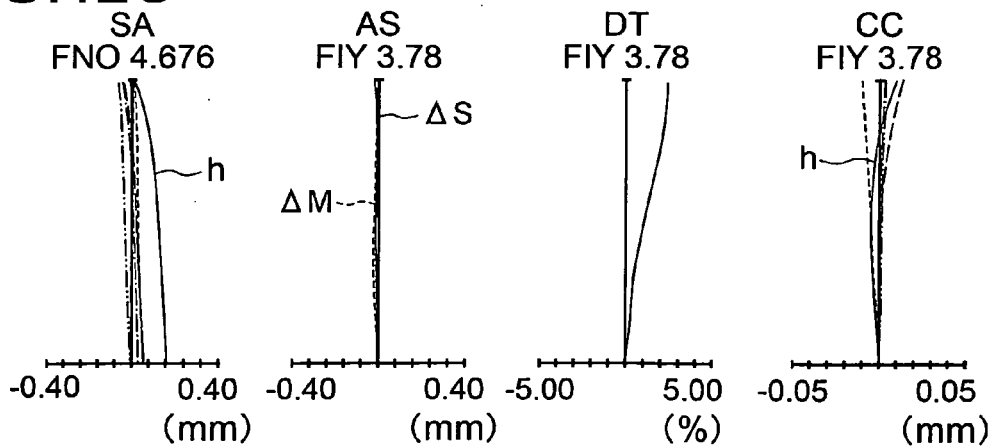

FIGS. 12A, 12B, and 12C are diagrams showing spherical aberration (SA), astigmatism (AS), distortion (DT), and chromatic aberration of magnification (CC) of the zoom lens according to embodiment 6 in the state in which the zoom lens is focused on an object point at infinity, where FIG. 12A is for the wide angle end, FIG. 12B is for the intermediate focal length state, and FIG. 12C is for the telephoto end. In FIGS. 12A, 12B, and 12C, aberrations with respect to the d-line and the h-line are both represented by solid lines, and the solid lines representing the aberrations with respect to the h-line are indicated by the symbol "h" with lead lines.

As shown in FIGS. 11A, 11B, and 11C, the zoom lens according to embodiment 6 includes, in order from its object side, a first lens group G1 having a positive refractive power, a second lens group G2 having a negative refractive power, an aperture stop S, a third lens group G3 having a positive refractive power, a fourth lens group G4 having a positive refractive power, and a fifth lens group G5 having a positive refractive power.

The first lens group G1 includes, in order from the object side, a cemented lens including a positive meniscus lens L1 (a refractive optical element A) having a convex surface directed toward the object side, a negative meniscus lens L2 (an optical element B) having a convex surface directed toward the object side and a positive meniscus lens L3 having a convex surface directed toward the object side, and a positive meniscus lens L4 having a convex surface directed toward the object side. The first lens group G1 has a positive refractive power as a whole. The relative partial dispersion θgF of the refractive optical element A of the cemented lens in the first lens group G1 is 0.690.

The second lens group G2 includes, in order from the object side, a negative meniscus lens L5 having a convex surface directed toward the object side, a cemented lens including a biconcave negative lens L6, a cementing layer L7 and a biconvex positive lens L8, and a negative meniscus lens L9 having a convex surface directed toward the image side. The second lens group G2 has a negative refractive power as a whole.

The third lens group G3 includes, in order from the object side, a biconvex positive lens L10, a negative meniscus lens L11 having a convex surface directed toward the object side, a biconvex positive lens L12, and a negative meniscus lens L13 having a convex surface directed toward the object side. The third lens group G3 has a positive refractive power as a whole.

The fourth lens group G4 includes a cemented lens including a biconvex positive lens L14, a cementing layer L15 and a biconcave negative lens L16 arranged in order from the object side. The fourth lens group G4 has a positive refractive power as a whole.

The fifth lens group G5 includes a biconvex positive lens L17. The fifth lens group G5 has a positive refractive power as a whole.

During zooming from the wide angle end to the telephoto end, the first lens group G1 moves toward the object side, the second lens group G2 moves first toward the object side and thereafter toward the image side, the third lens group G3 moves toward the object side and thereafter stays substantially stationary with a very small amount of movement, the fourth lens group G4 moves toward the object side, and the fifth lens group G5 does not move.

There are seven aspheric surfaces in total, which include the image side surface of the positive meniscus lens L1 closest to the object side in the first lens group G1, the image side surface of the image side negative meniscus lens L9 in the second lens group G2, the object side surface of the object side biconvex positive lens L10 in the third lens group G3, both surfaces of the image side negative meniscus lens L13 in the third lens group G3, and both surfaces of the biconvex positive lens L17 in the fifth lens group G5.

Figure 13A:
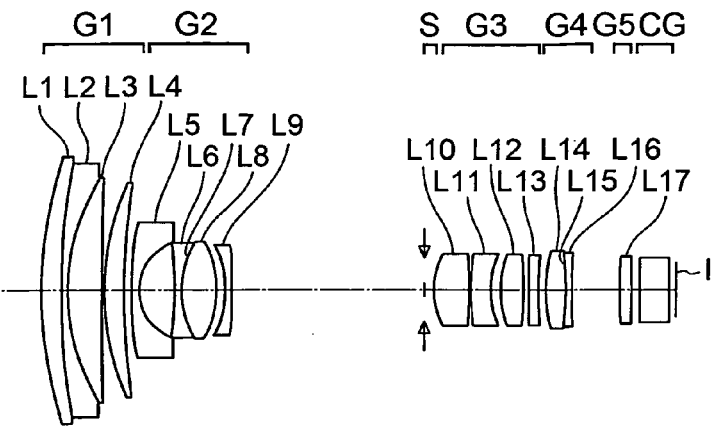
FIGS. 13A, 13B, and 13C are cross sectional views taken along the optical axis showing the optical configuration of a zoom lens according to embodiment 7 of the present invention in the state in which the zoom lens is focused on an object point at infinity, respectively at the wide angle end, at an intermediate focal length, and at the telephoto end.
Figure 13B:
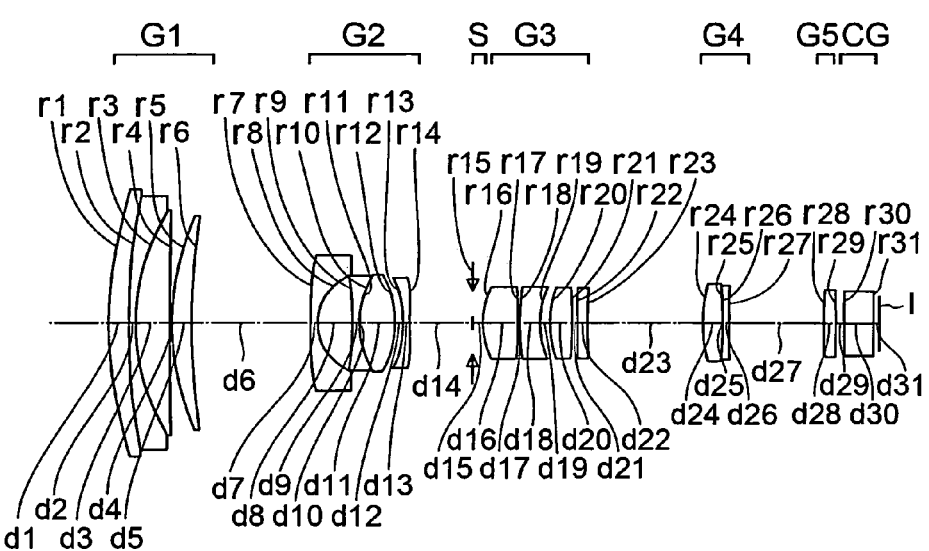
Figure 13C:
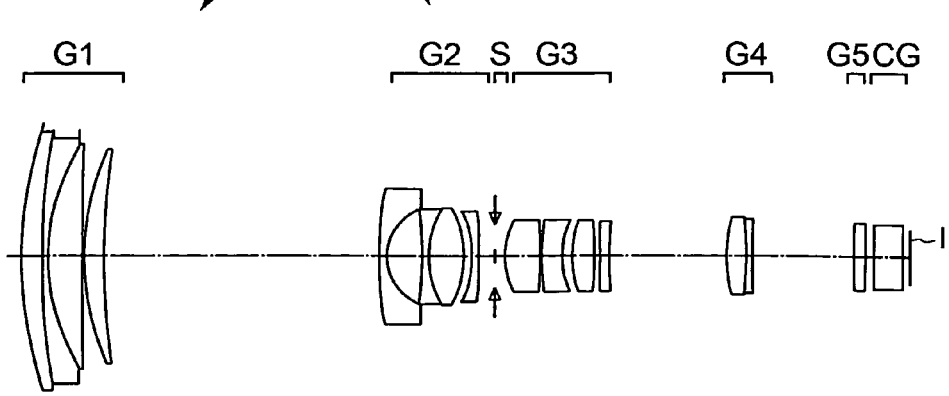

Next, a zoom lens according to embodiment 7 of the present invention will be described. FIGS. 13A, 13B, and 13C are cross sectional views taken along the optical axis showing the optical configuration of the zoom lens according to embodiment 7 of the present invention in the state in which the zoom lens is focused on an object point at infinity, where FIG. 13A is a cross sectional view of the zoom lens at the wide angle end, FIG. 13B is a cross sectional view of the zoom lens in an intermediate focal length state, and FIG. 13C is a cross sectional view of the zoom lens at the telephoto end.

Figure 14A:
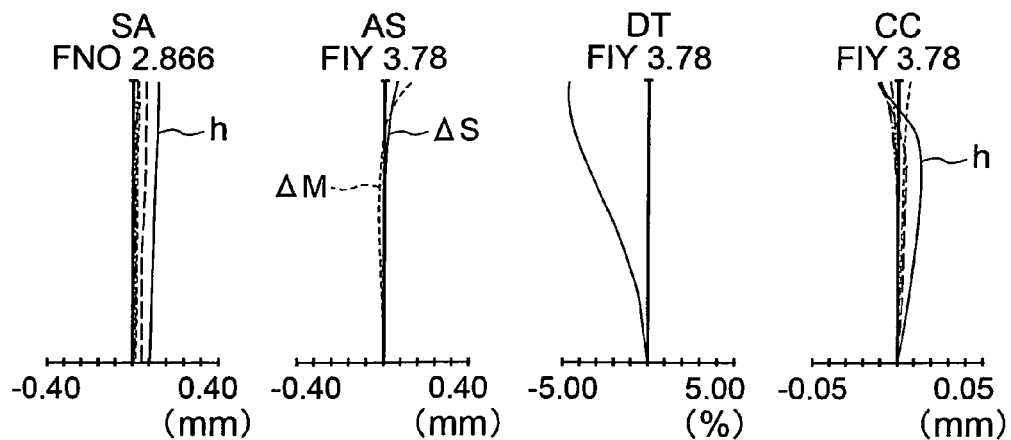
FIGS. 14A, 14B, and 14C are diagrams showing spherical aberration, astigmatism, distortion, and chromatic aberration of magnification of the zoom lens according to embodiment 7 in the state in which the zoom lens is focused on an object point at infinity, where
Figure 14B:
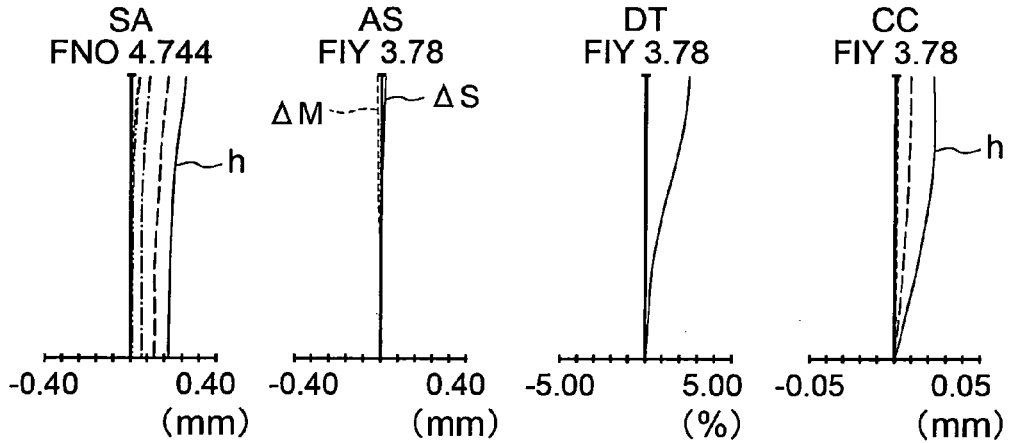
Figure 14C:
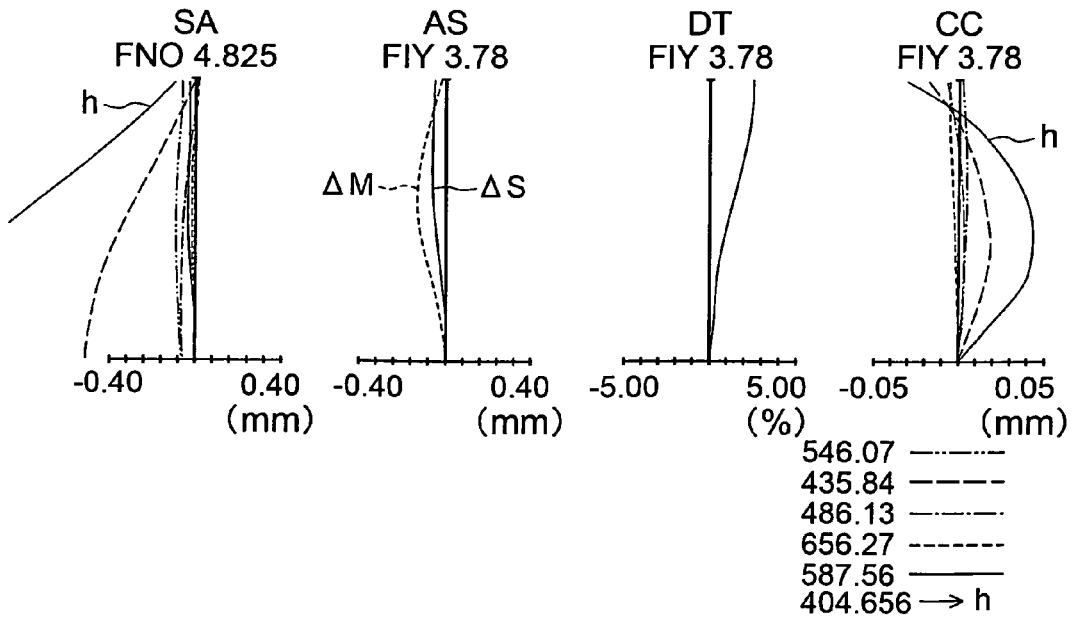

FIGS. 14A, 14B, and 14C are diagrams showing spherical aberration (SA), astigmatism (AS), distortion (DT), and chromatic aberration of magnification (CC) of the zoom lens according to embodiment 7 in the state in which the zoom lens is focused on an object point at infinity, where FIG. 14A is for the wide angle end, FIG. 14B is for the intermediate focal length state, and FIG. 14C is for the telephoto end. In FIGS. 14A, 14B, and 14C, aberrations with respect to the d-line and the h-line are both represented by solid lines, and the solid lines representing the aberrations with respect to the h-line are indicated by the symbol "h" with lead lines.

As shown in FIGS. 13A, 13B, and 13C, the zoom lens according to embodiment 7 includes, in order from its object side, a first lens group G1 having a positive refractive power, a second lens group G2 having a negative refractive power, an aperture stop S, a third lens group G3 having a positive refractive power, a fourth lens group G4 having a positive refractive power, and a fifth lens group G5 having a positive refractive power.

The first lens group G1 includes, in order from the object side, a cemented lens including a positive meniscus lens L1 (a refractive optical element A) having a convex surface directed toward the object side, a negative meniscus lens L2 (an optical element B) having a convex surface directed toward the object side and a positive meniscus lens L3 having a convex surface directed toward the object side, and a positive meniscus lens L4 having a convex surface directed toward the object side. The first lens group G1 has a positive refractive power as a whole. The relative partial dispersion θgF of the refractive optical element A of the cemented lens in the first lens group G1 is 0.817.

The second lens group G2 includes, in order from the object side, a negative meniscus lens L5 having a convex surface directed toward the object side, a cemented lens including a biconcave negative lens L6, a cementing layer L7 and a biconvex positive lens L8, and a negative meniscus lens L9 having a convex surface directed toward the image side. The second lens group G2 has a negative refractive power as a whole.

The third lens group G3 includes, in order from the object side, a biconvex positive lens L10, a negative meniscus lens L11 having a convex surface directed toward the object side, a biconvex positive lens L12, and a negative meniscus lens L13 having a convex surface directed toward the object side. The third lens group G3 has a positive refractive power as a whole.

The fourth lens group G4 includes a cemented lens including a biconvex positive lens L14, a cementing layer L15 and a biconcave negative lens L16 arranged in order from the object side. The fourth lens group G4 has a positive refractive power as a whole.

The fifth lens group G5 includes a biconvex positive lens L17. The fifth lens group G5 has a positive refractive power as a whole.

During zooming from the wide angle end to the telephoto end, the first lens group G1 moves toward the object side, the second lens group G2 moves first toward the object side and thereafter toward the image side, the third lens group G3 moves toward the object side, the fourth lens group G4 moves toward the object side, and the fifth lens group G5 is fixed.

There are seven aspheric surfaces in total, which include the image side surface of the positive meniscus lens L1 closest to the object side in the first lens group G1, the image side surface of the image side negative meniscus lens L9 in the second lens group G2, the object side surface of the object side biconvex positive lens L10 in the third lens group G3, both surfaces of the image side negative meniscus lens L13 in the third lens group G3, and both surfaces of the biconvex positive lens L17 in the fifth lens group G5.

Figure 15A:
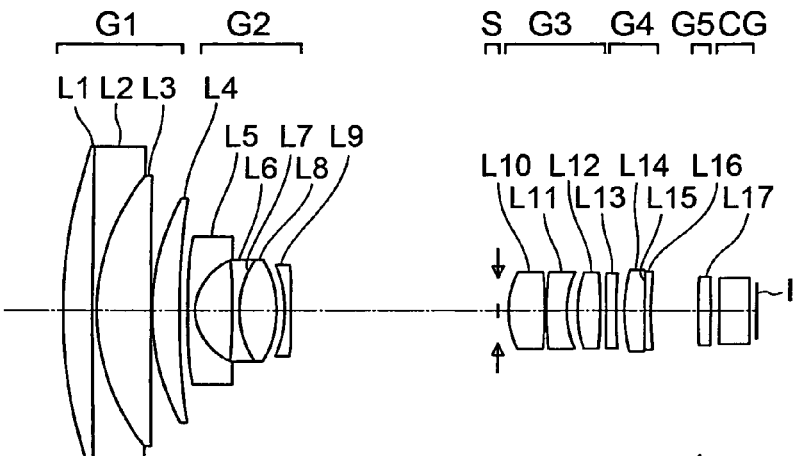
FIGS. 15A, 15B, and 15C are cross sectional views taken along the optical axis showing the optical configuration of a zoom lens according to embodiment 8 of the present invention in the state in which the zoom lens is focused on an object point at infinity, respectively at the wide angle end, at an intermediate focal length, and at the telephoto end.
Figure 15B:
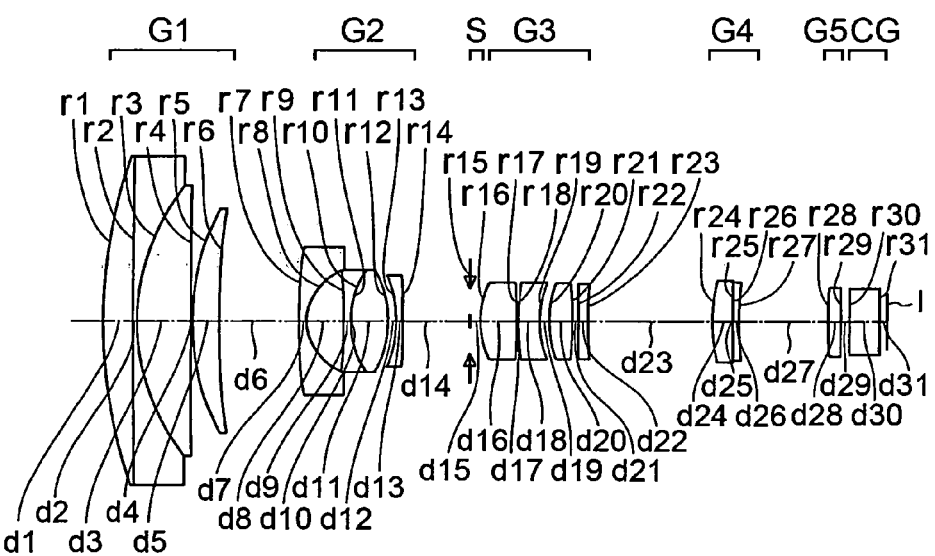
Figure 15C:
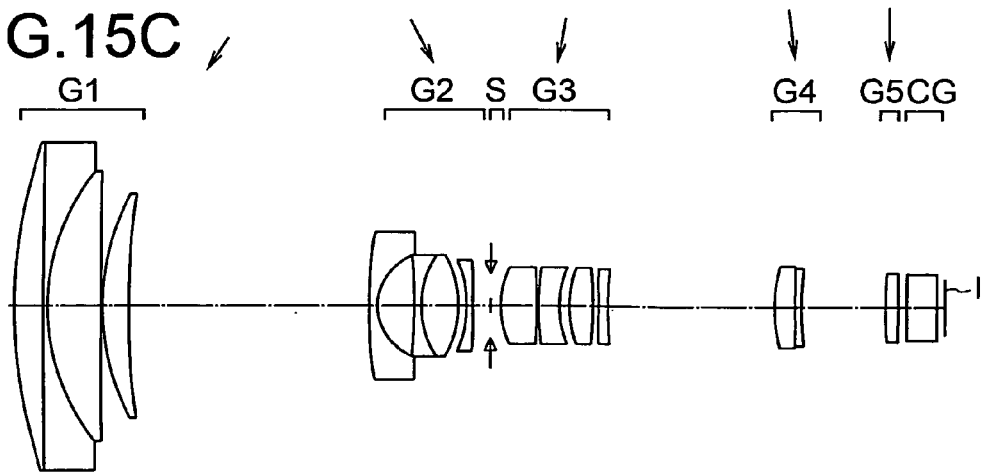

Next, a zoom lens according to embodiment 8 of the present invention will be described. FIGS. 15A, 15B, and 15C are cross sectional views taken along the optical axis showing the optical configuration of the zoom lens according to embodiment 8 of the present invention in the state in which the zoom lens is focused on an object point at infinity, where FIG. 15A is a cross sectional view of the zoom lens at the wide angle end, FIG. 15B is a cross sectional view of the zoom lens in an intermediate focal length state, and FIG. 15C is a cross sectional view of the zoom lens at the telephoto end.

Figure 16A:
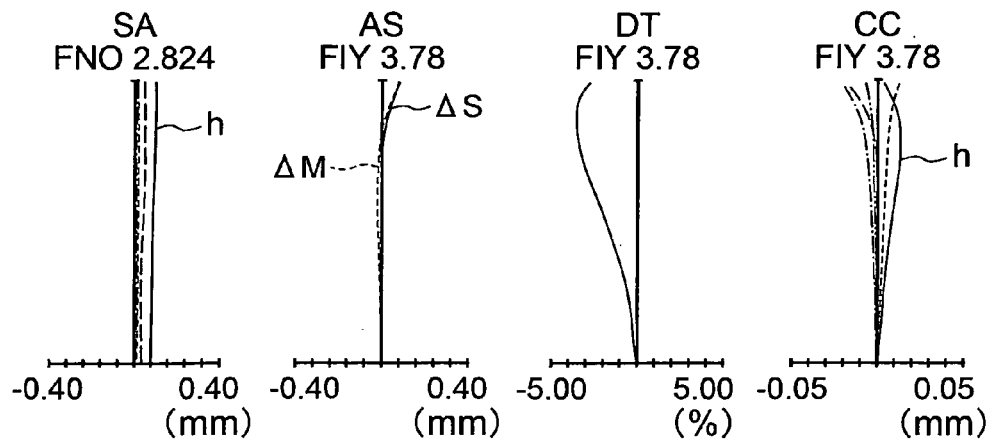
FIGS. 16A, 16B, and 16C are diagrams showing spherical aberration, astigmatism, distortion, and chromatic aberration of magnification of the zoom lens according to embodiment 8 in the state in which the zoom lens is focused on an object point at infinity, where
Figure 16B:
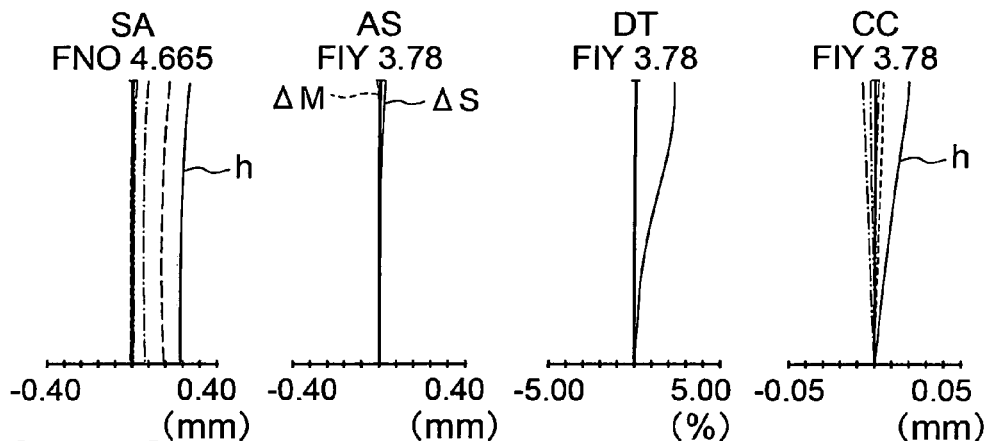
Figure 16C:
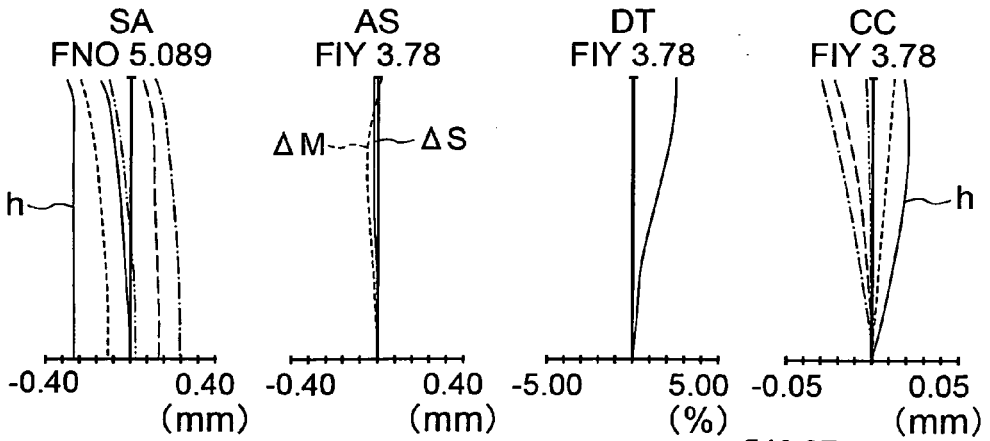

FIGS. 16A, 16B, and 16C are diagrams showing spherical aberration (SA), astigmatism (AS), distortion (DT), and chromatic aberration of magnification (CC) of the zoom lens according to embodiment 8 in the state in which the zoom lens is focused on an object point at infinity, where FIG. 16A is for the wide angle end, FIG. 16B is for the intermediate focal length state, and FIG. 16C is for the telephoto end. In FIGS. 16A, 16B, and 16C, aberrations with respect to the d-line and the h-line are both represented by solid lines, and the solid lines representing the aberrations with respect to the h-line are indicated by the symbol "h" with lead lines.

As shown in FIGS. 15A, 15B, and 15C, the zoom lens according to embodiment 8 includes, in order from its object side, a first lens group G1 having a positive refractive power, a second lens group G2 having a negative refractive power, an aperture stop S, a third lens group G3 having a positive refractive power, a fourth lens group G4 having a positive refractive power, and a fifth lens group G5 having a positive refractive power.

The first lens group G1 includes, in order from the object side, a cemented lens including a positive meniscus lens L1 (a refractive optical element A) having a convex surface directed toward the object side, a negative meniscus lens L2 (an optical element B) having a convex surface directed toward the object side and a positive meniscus lens L3 having a convex surface directed toward the object side, and a positive meniscus lens L4 having a convex surface directed toward the object side. The first lens group G1 has a positive refractive power as a whole. The relative partial dispersion θgF of the refractive optical element A of the cemented lens in the first lens group G1 is 0.817.

The second lens group G2 includes, in order from the object side, a negative meniscus lens L5 having a convex surface directed toward the object side, a cemented lens including a biconcave negative lens L6, a cementing layer L7 and a biconvex positive lens L8, and a negative meniscus lens L9 having a convex surface directed toward the image side. The second lens group G2 has a negative refractive power as a whole.

The third lens group G3 includes, in order from the object side, a biconvex positive lens L10, a negative meniscus lens L11 having a convex surface directed toward the object side, a biconvex positive lens L12, and a negative meniscus lens L13 having a convex surface directed toward the object side. The third lens group G3 has a positive refractive power as a whole.

The fourth lens group G4 includes a cemented lens including a biconvex positive lens L14, a cementing layer L15 and a biconcave negative lens L16 arranged in order from the object side. The fourth lens group G4 has a positive refractive power as a whole.

The fifth lens group G5 includes a biconvex positive lens L17. The fifth lens group G5 has a positive refractive power as a whole.

During zooming from the wide angle end to the telephoto end, the first lens group G1 moves toward the object side, the second lens group G2 moves first toward the object side and thereafter toward the image side, the third lens group G3 moves toward the object side, the fourth lens group G4 moves first toward the object side and thereafter toward the image side, and the fifth lens group G5 is fixed.

There are six aspheric surfaces in total, which include the image side surface of the image side negative meniscus lens L9 in the second lens group G2, the object side surface of the object side biconvex positive lens L10 in the third lens group G3, both surfaces of the image side negative meniscus lens L13 in the third lens group G3, and both surfaces of the biconvex positive lens L17 in the fifth lens group G5.

Figure 17A:
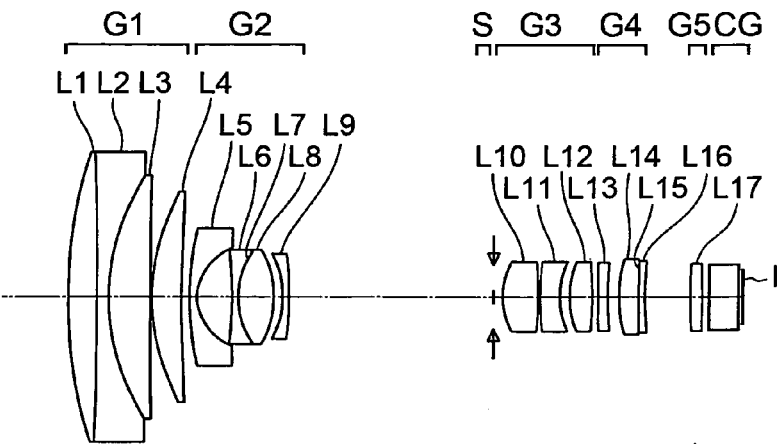
FIGS. 17A, 17B, and 17C are cross sectional views taken along the optical axis showing the optical configuration of a zoom lens according to embodiment 9 of the present invention in the state in which the zoom lens is focused on an object point at infinity, respectively at the wide angle end, at an intermediate focal length, and at the telephoto end.
Figure 17B:
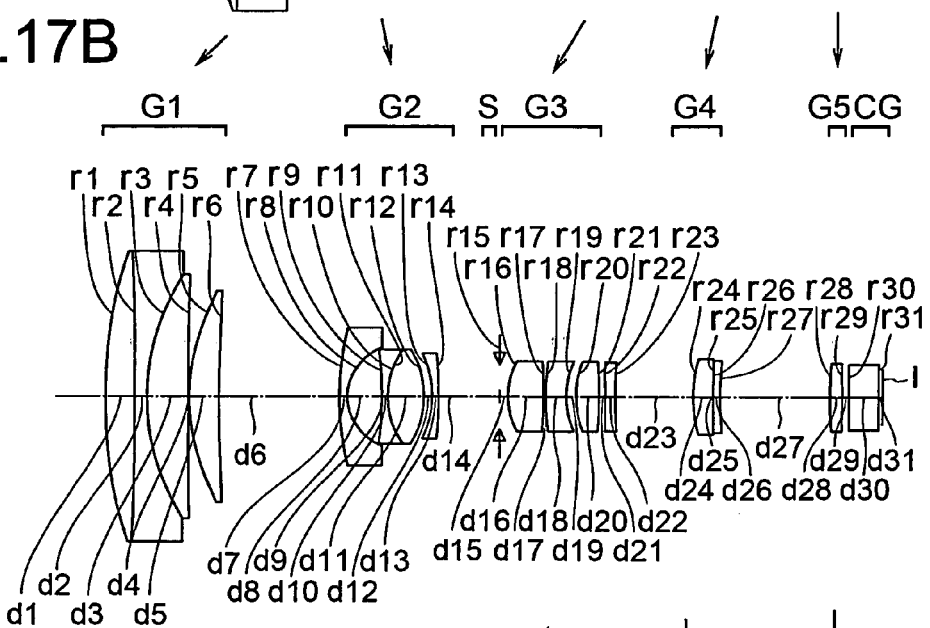
Figure 17C:
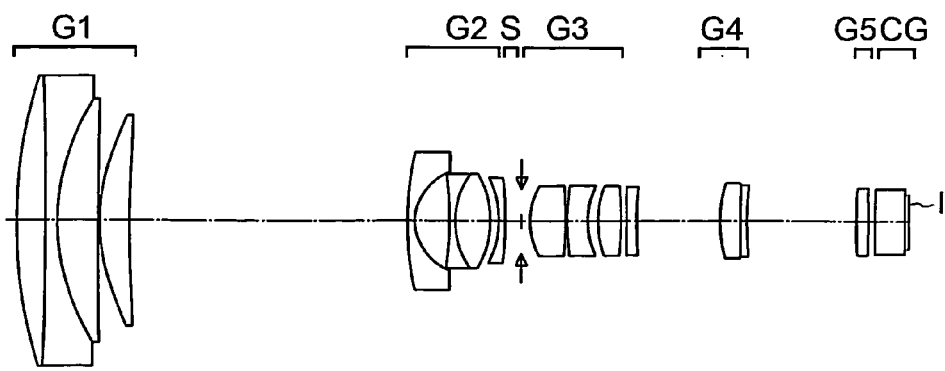

Next, a zoom lens according to embodiment 9 of the present invention will be described. FIGS. 17A, 17B, and 17C are cross sectional views taken along the optical axis showing the optical configuration of the zoom lens according to embodiment 9 of the present invention in the state in which the zoom lens is focused on an object point at infinity, where FIG. 17A is a cross sectional view of the zoom lens at the wide angle end, FIG. 17B is a cross sectional view of the zoom lens in an intermediate focal length state, and FIG. 17C is a cross sectional view of the zoom lens at the telephoto end.

Figure 18A:
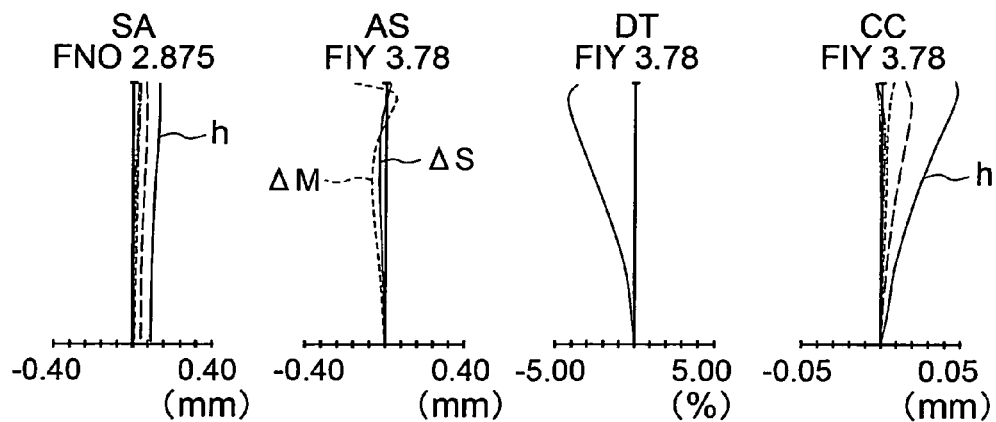
FIGS. 18A, 18B, and 18C are diagrams showing spherical aberration, astigmatism, distortion, and chromatic aberration of magnification of the zoom lens according to embodiment 9 in the state in which the zoom lens is focused on an object point at infinity, where
Figure 18B:
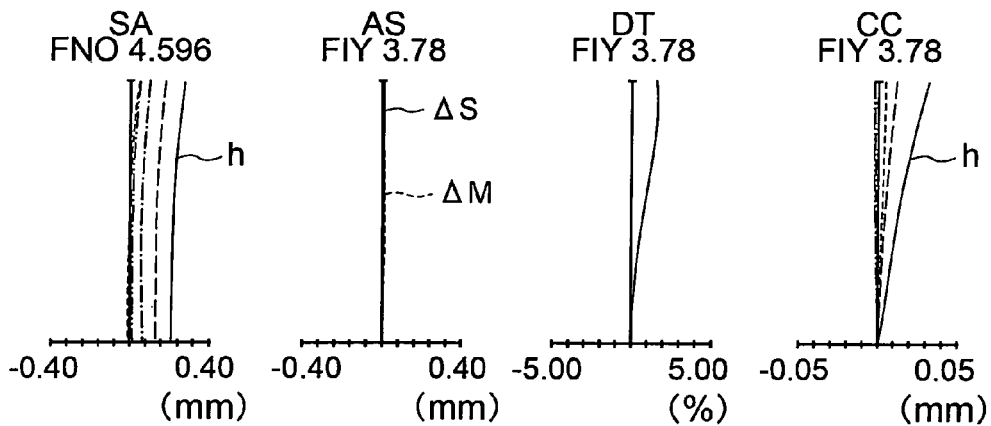
Figure 18C:
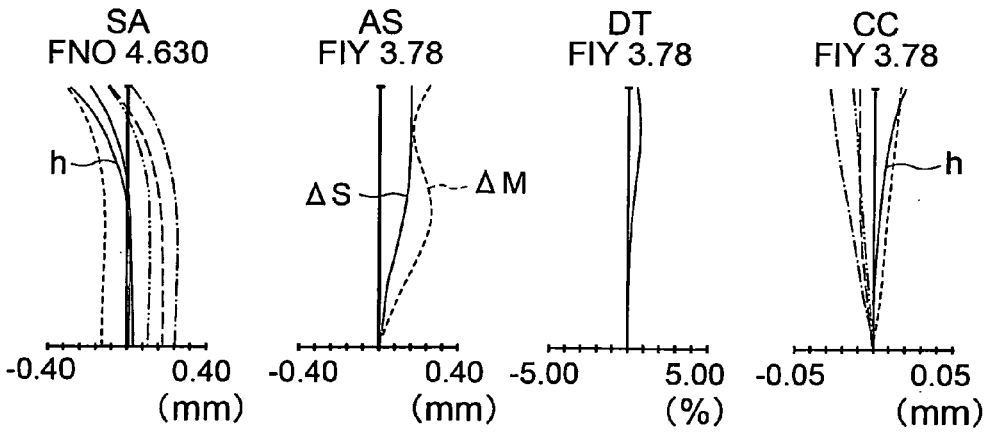

FIGS. 18A, 18B, and 18C are diagrams showing spherical aberration (SA), astigmatism (AS), distortion (DT), and chromatic aberration of magnification (CC) of the zoom lens according to embodiment 9 in the state in which the zoom lens is focused on an object point at infinity, where FIG. 18A is for the wide angle end, FIG. 18B is for the intermediate focal length state, and FIG. 18C is for the telephoto end. In FIGS. 18A, 18B, and 18C, aberrations with respect to the d-line and the h-line are both represented by solid lines, and the solid lines representing the aberrations with respect to the h-line are indicated by the symbol "h" with lead lines.

As shown in FIGS. 17A, 17B, and 17C, the zoom lens according to embodiment 9 includes, in order from its object side, a first lens group G1 having a positive refractive power, a second lens group G2 having a negative refractive power, an aperture stop S, a third lens group G3 having a positive refractive power, a fourth lens group G4 having a positive refractive power, and a fifth lens group G5 having a positive refractive power.

The first lens group G1 includes, in order from the object side, a cemented lens including a positive meniscus lens L1 (a refractive optical element A) having a convex surface directed toward the object side, a negative meniscus lens L2 (an optical element B) having a convex surface directed toward the object side and a positive meniscus lens L3 having a convex surface directed toward the object side, and a positive meniscus lens L4 having a convex surface directed toward the object side. The first lens group G1 has a positive refractive power as a whole. The relative partial dispersion θgF of the refractive optical element A of the cemented lens in the first lens group G1 is 0.738.

The second lens group G2 includes, in order from the object side, a negative meniscus lens L5 having a convex surface directed toward the object side, a cemented lens including a biconcave negative lens L6, a cementing layer L7 and a biconvex positive lens L8, and a negative meniscus lens L9 having a convex surface directed toward the image side. The second lens group G2 has a negative refractive power as a whole.

The third lens group G3 includes, in order from the object side, a biconvex positive lens L10, a negative meniscus lens L11 having a convex surface directed toward the object side, a biconvex positive lens L12, and a negative meniscus lens L13 having a convex surface directed toward the object side. The third lens group G3 has a positive refractive power as a whole.

The fourth lens group G4 includes a cemented lens including a biconvex positive lens L14, a cementing layer L15 and a biconcave negative lens L16 arranged in order from the object side. The fourth lens group G4 has a positive refractive power as a whole.

The fifth lens group G5 includes a biconvex positive lens L17. The fifth lens group G5 has a positive refractive power as a whole.

During zooming from the wide angle end to the telephoto end, the first lens group G1 moves toward the object side, the second lens group G2 moves toward the image side, the third lens group G3 moves toward the object side, the fourth lens group G4 moves first toward the object side and thereafter toward the image side, and the fifth lens group G5 is fixed.

There are seven aspheric surfaces in total, which include the image side surface of the positive meniscus lens L1 closest to the object side in the first lens group G1, the image side surface of the image side negative meniscus lens L9 in the second lens group G2, the object side surface of the object side biconvex positive lens L10 in the third lens group G3, both surfaces of the image side negative meniscus lens L13 in the third lens group G3, and both surfaces of the biconvex positive lens L17 in the fifth lens group G5.

Figure 19A:
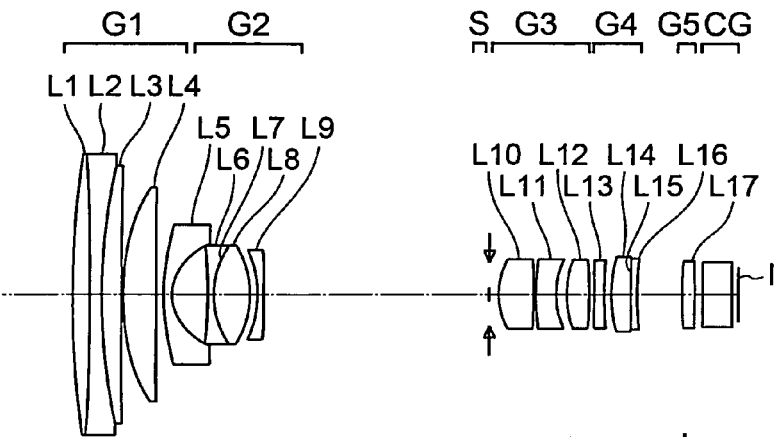
FIGS. 19A, 19B, and 19C are cross sectional views taken along the optical axis showing the optical configuration of a zoom lens according to embodiment 10 of the present invention in the state in which the zoom lens is focused on an object point at infinity, respectively at the wide angle end, at an intermediate focal length, and at the telephoto end.
Figure 19B:
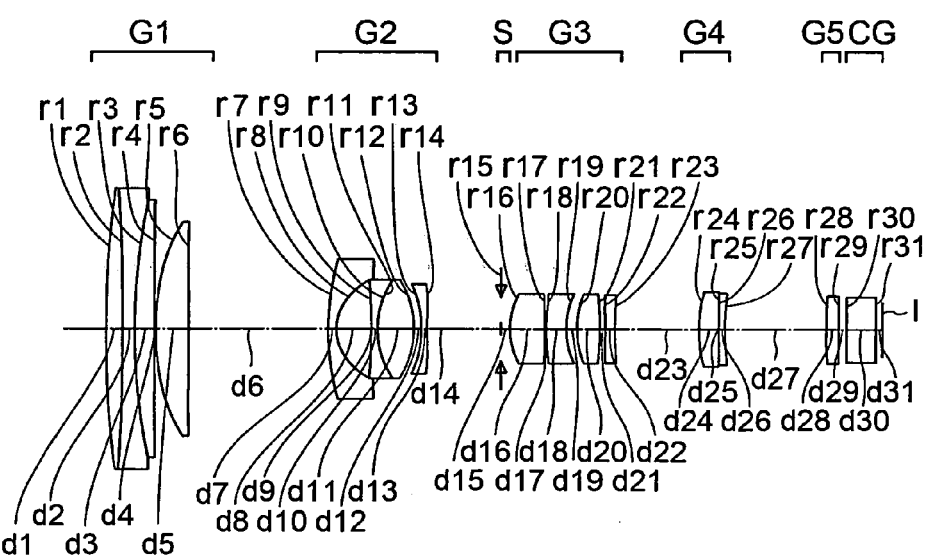
Figure 19C:
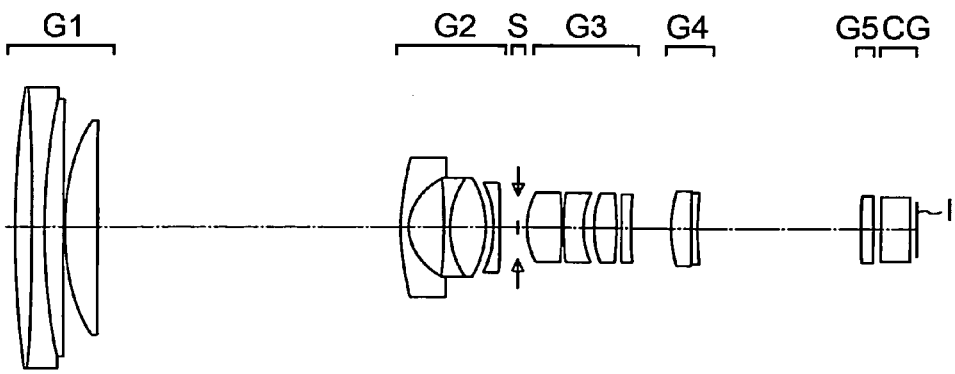

Next, a zoom lens according to embodiment 10 of the present invention will be described. FIGS. 19A, 19B, and 19C are cross sectional views taken along the optical axis showing the optical configuration of the zoom lens according to embodiment 10 of the present invention in the state in which the zoom lens is focused on an object point at infinity, where FIG. 19A is a cross sectional view of the zoom lens at the wide angle end, FIG. 19B is a cross sectional view of the zoom lens in an intermediate focal length state, and FIG. 19C is a cross sectional view of the zoom lens at the telephoto end.

FIGS. 20A, 20B, and 20C are diagrams showing spherical aberration (SA), astigmatism (AS), distortion (DT), and chromatic aberration of magnification (CC) of the zoom lens according to embodiment 10 in the state in which the zoom lens is focused on an object point at infinity, where FIG. 20A is for the wide angle end, FIG. 20B is for the intermediate focal length state, and FIG. 20C is for the telephoto end. In FIGS. 20A, 20B, and 20C, aberrations with respect to the d-line and the h-line are both represented by solid lines, and the solid lines representing the aberrations with respect to the h-line are indicated by the symbol "h" with lead lines.

As shown in FIGS. 19A, 19B, and 19C, the zoom lens according to embodiment 10 includes, in order from its object side, a first lens group G1 having a positive refractive power, a second lens group G2 having a negative refractive power, an aperture stop S, a third lens group G3 having a positive refractive power, a fourth lens group G4 having a positive refractive power, and a fifth lens group G5 having a positive refractive power.

The first lens group G1 includes, in order from the object side, a cemented lens including a positive meniscus lens L1 (a refractive optical element A) having a convex surface directed toward the object side, a negative meniscus lens L2 (an optical element B) having a convex surface directed toward the object side and a positive meniscus lens L3 having a convex surface directed toward the object side, and a positive meniscus lens L4 having a convex surface directed toward the object side. The first lens group G1 has a positive refractive power as a whole. The relative partial dispersion θgF of the refractive optical element A of the cemented lens in the first lens group G1 is 0.817.

The second lens group G2 includes, in order from the object side, a negative meniscus lens L5 having a convex surface directed toward the object side, a cemented lens including a biconcave negative lens L6, a cementing layer L7 and a biconvex positive lens L8, and a negative meniscus lens L9 having a convex surface directed toward the image side. The second lens group G2 has a negative refractive power as a whole.

The third lens group G3 includes, in order from the object side, a biconvex positive lens L10, a negative meniscus lens L11 having a convex surface directed toward the object side, a biconvex positive lens L12, and a negative meniscus lens L13 having a convex surface directed toward the object side. The third lens group G3 has a positive refractive power as a whole.

The fourth lens group G4 includes a cemented lens including a biconvex positive lens L14, a cementing layer L15 and a biconcave negative lens L16 arranged in order from the object side. The fourth lens group G4 has a positive refractive power as a whole.

The fifth lens group G5 includes a biconvex positive lens L17. The fifth lens group G5 has a positive refractive power as a whole.

During zooming from the wide angle end to the telephoto end, the first lens group G1 moves toward the object side, the second lens group G2 moves toward the image side, the third lens group G3 moves toward the object side, the fourth lens group G4 moves toward the object side, and the fifth lens group G5 is fixed.

There are seven aspheric surfaces in total, which include the image side surface of the positive meniscus lens L1 closest to the object side in the first lens group G1, the image side surface of the image side negative meniscus lens L9 in the second lens group G2, the object side surface of the object side biconvex positive lens L10 in the third lens group G3, both surfaces of the image side negative meniscus lens L13 in the third lens group G3, and both surfaces of the biconvex positive lens L17 in the fifth lens group G5.

Figure 21A:
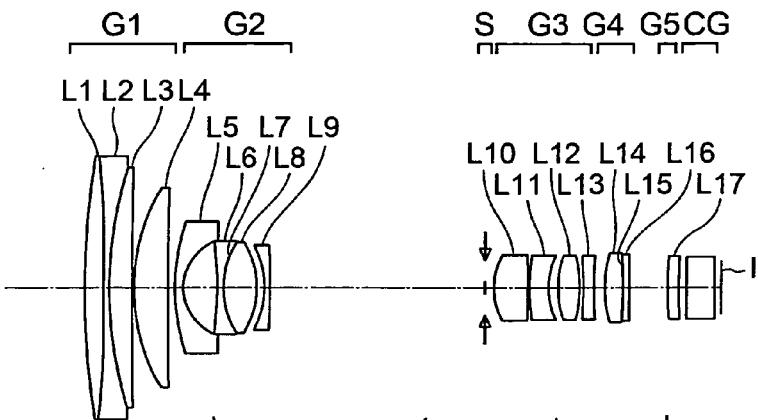
FIGS. 21A, 21B, and 21C are cross sectional views taken along the optical axis showing the optical configuration of a zoom lens according to embodiment 11 of the present invention in the state in which the zoom lens is focused on an object point at infinity, respectively at the wide angle end, at an intermediate focal length, and at the telephoto end.
Figure 21B:
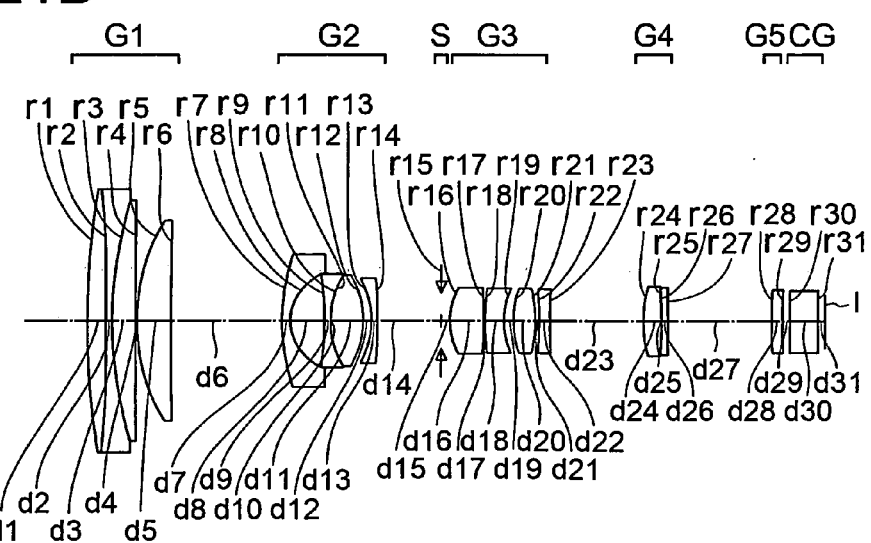
Figure 21C:
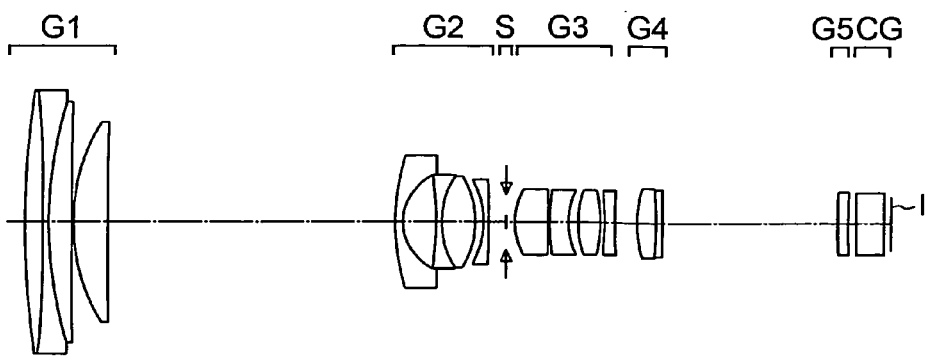

Next, a zoom lens according to embodiment 11 of the present invention will be described. FIGS. 21A, 21B, and 21C are cross sectional views taken along the optical axis showing the optical configuration of the zoom lens according to embodiment 11 of the present invention in the state in which the zoom lens is focused on an object point at infinity, where FIG. 21A is a cross sectional view of the zoom lens at the wide angle end, FIG. 21B is a cross sectional view of the zoom lens in an intermediate focal length state, and FIG. 21C is a cross sectional view of the zoom lens at the telephoto end.

Figure 22A:
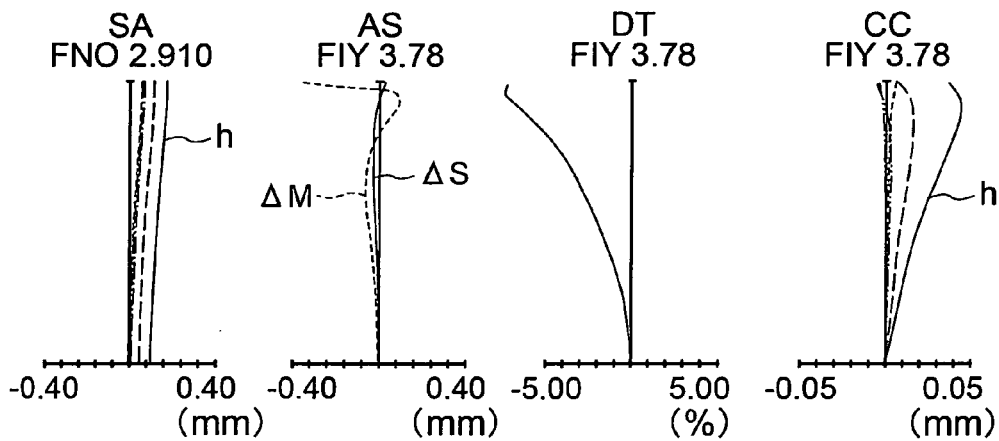
FIGS. 22A, 22B, and 22C are diagrams showing spherical aberration, astigmatism, distortion, and chromatic aberration of magnification of the zoom lens according to embodiment 11 in the state in which the zoom lens is focused on an object point at infinity, where
Figure 22B:
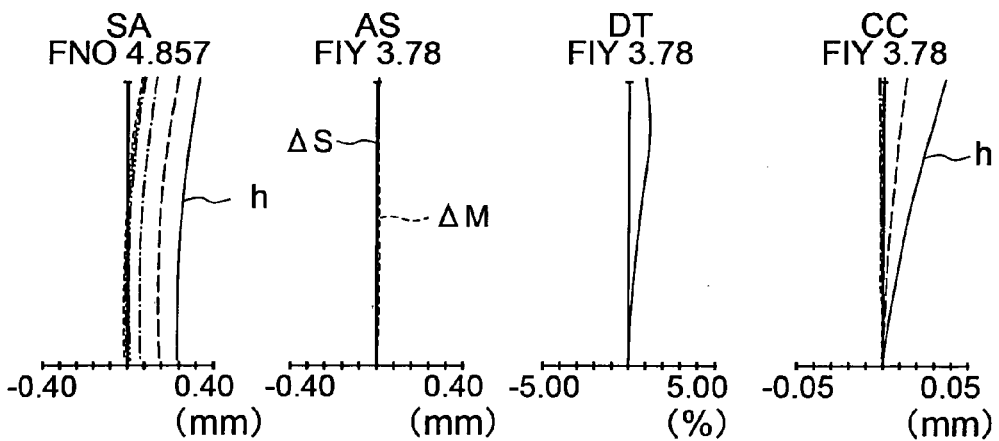
Figure 22C:
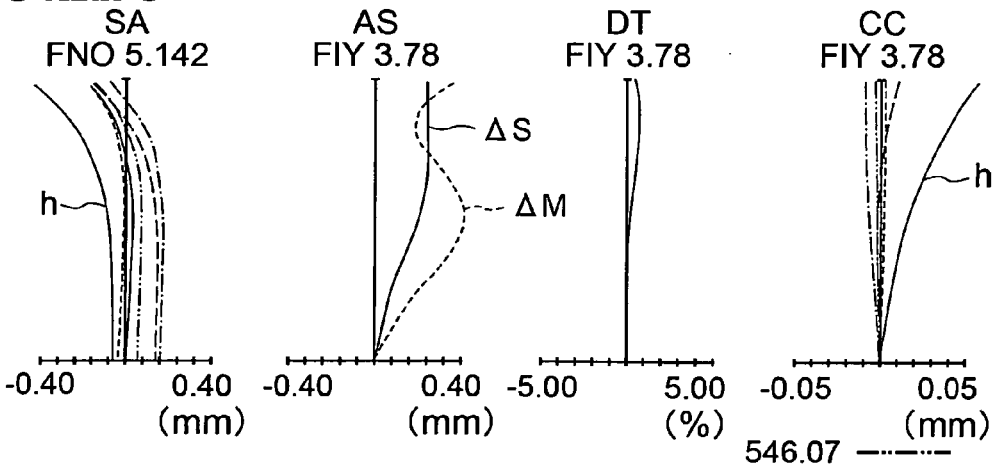

FIGS. 22A, 22B, and 22C are diagrams showing spherical aberration (SA), astigmatism (AS), distortion (DT), and chromatic aberration of magnification (CC) of the zoom lens according to embodiment 11 in the state in which the zoom lens is focused on an object point at infinity, where FIG. 22A is for the wide angle end, FIG. 22B is for the intermediate focal length state, and FIG. 22C is for the telephoto end. In FIGS. 22A, 22B, and 22C, aberrations with respect to the d-line and the h-line are both represented by solid lines, and the solid lines representing the aberrations with respect to the h-line are indicated by the symbol "h" with lead lines.

As shown in FIGS. 21A, 21B, and 21C, the zoom lens according to embodiment 11 includes, in order from its object side, a first lens group G1 having a positive refractive power, a second lens group G2 having a negative refractive power, an aperture stop S, a third lens group G3 having a positive refractive power, a fourth lens group G4 having a positive refractive power, and a fifth lens group G5 having a positive refractive power.

The first lens group G1 includes, in order from the object side, a cemented lens including a positive meniscus lens L1 (a refractive optical element A) having a convex surface directed toward the object side, a negative meniscus lens L2 (an optical element B) having a convex surface directed toward the object side and a positive meniscus lens L3 having a convex surface directed toward the object side, and a positive meniscus lens L4 having a convex surface directed toward the object side. The first lens group G1 has a positive refractive power as a whole. The relative partial dispersion θgF of the refractive optical element A of the cemented lens in the first lens group G1 is 0.761.

The second lens group G2 includes, in order from the object side, a negative meniscus lens L5 having a convex surface directed toward the object side, a cemented lens including a biconcave negative lens L6, a cementing layer L7 and a biconvex positive lens L8, and a negative meniscus lens L9 having a convex surface directed toward the image side. The second lens group G2 has a negative refractive power as a whole.

The third lens group G3 includes, in order from the object side, a biconvex positive lens L10, a negative meniscus lens L11 having a convex surface directed toward the object side, a biconvex positive lens L12, and a negative meniscus lens L13 having a convex surface directed toward the object side. The third lens group G3 has a positive refractive power as a whole.

The fourth lens group G4 includes a cemented lens including a biconvex positive lens L14, a cementing layer L15 and a biconcave negative lens L16 arranged in order from the object side. The fourth lens group G4 has a positive refractive power as a whole.

The fifth lens group G5 includes a biconvex positive lens L17. The fifth lens group G5 has a positive refractive power as a whole.

During zooming from the wide angle end to the telephoto end, the first lens group G1 moves toward the object side, the second lens group G2 moves toward the image side, the third lens group G3 moves toward the object side, the fourth lens group G4 moves toward the object side, and the fifth lens group G5 is fixed.

There are seven aspheric surfaces in total, which include the image side surface of the positive meniscus lens L1 closest to the object side in the first lens group G1, the image side surface of the image side negative meniscus lens L9 in the second lens group G2, the object side surface of the object side biconvex positive lens L10 in the third lens group G3, both surfaces of the image side negative meniscus lens L13 in the third lens group G3, and both surfaces of the biconvex positive lens L17 in the fifth lens group G5.

Figure 23A:
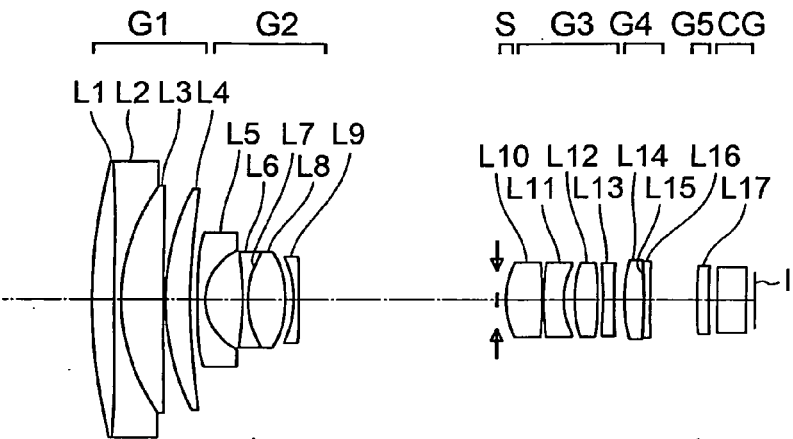
FIGS. 23A, 23B, and 23C are cross sectional views taken along the optical axis showing the optical configuration of a zoom lens according to embodiment 12 of the present invention in the state in which the zoom lens is focused on an object point at infinity, respectively at the wide angle end, at an intermediate focal length, and at the telephoto end.
Figure 23B:
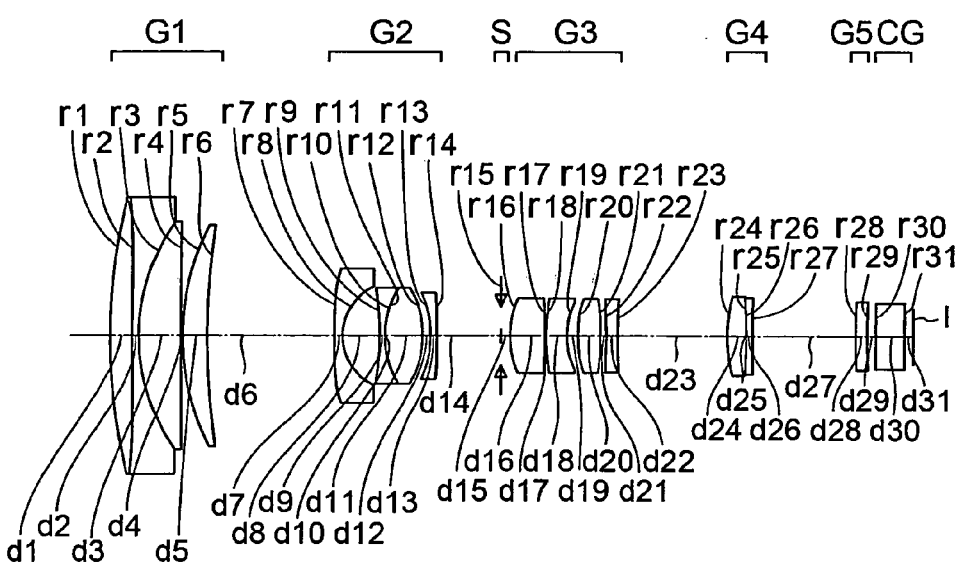
Figure 23C:
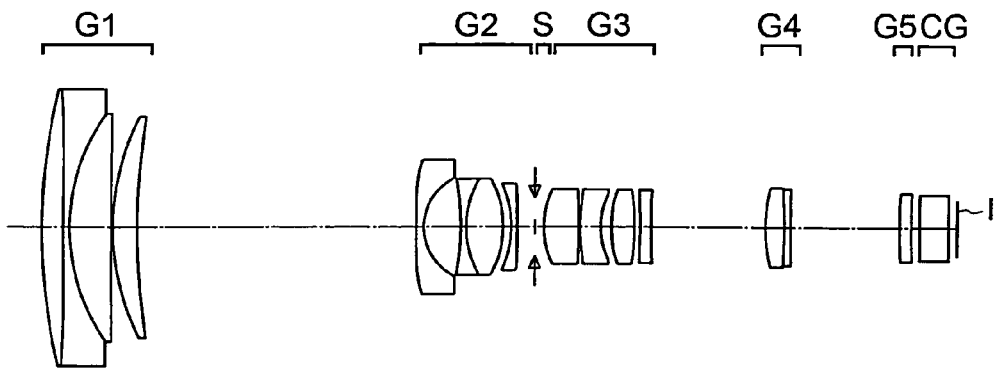

Next, a zoom lens according to embodiment 12 of the present invention will be described. FIGS. 23A, 23B, and 23C are cross sectional views taken along the optical axis showing the optical configuration of the zoom lens according to embodiment 12 of the present invention in the state in which the zoom lens is focused on an object point at infinity, where FIG. 23A is a cross sectional view of the zoom lens at the wide angle end, FIG. 23B is a cross sectional view of the zoom lens in an intermediate focal length state, and FIG. 23C is a cross sectional view of the zoom lens at the telephoto end.

Figure 24A:
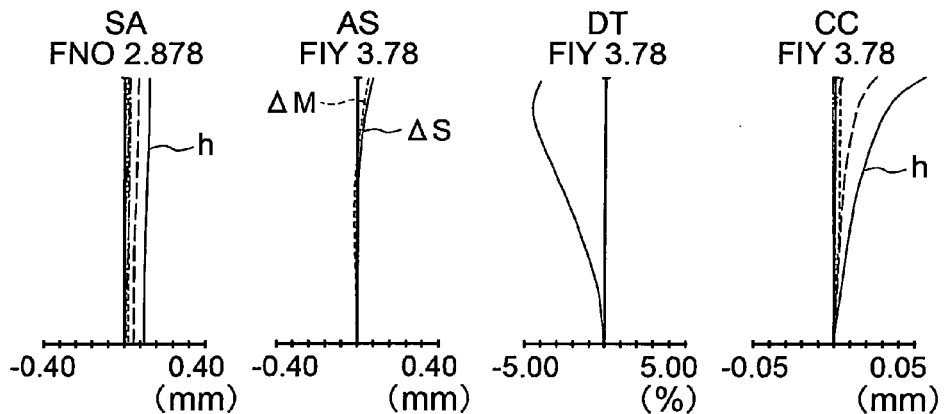
FIGS. 24A, 24B, and 24C are diagrams showing spherical aberration, astigmatism, distortion, and chromatic aberration of magnification of the zoom lens according to embodiment 12 in the state in which the zoom lens is focused on an object point at infinity, where
Figure 24B:
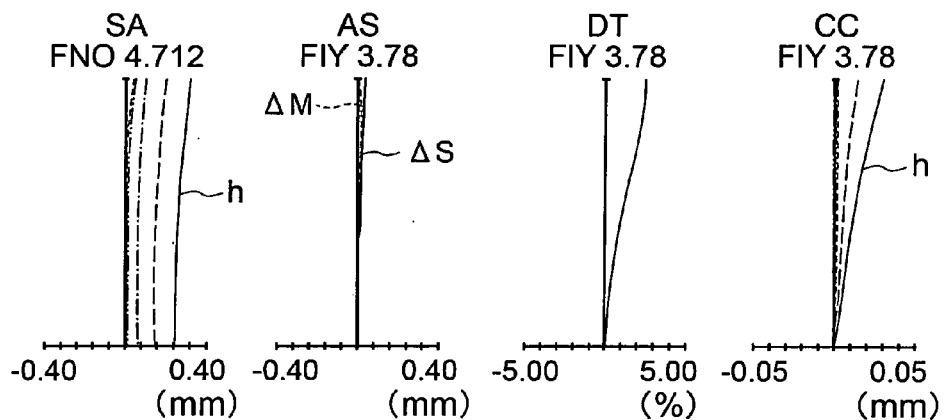
Figure 24C:
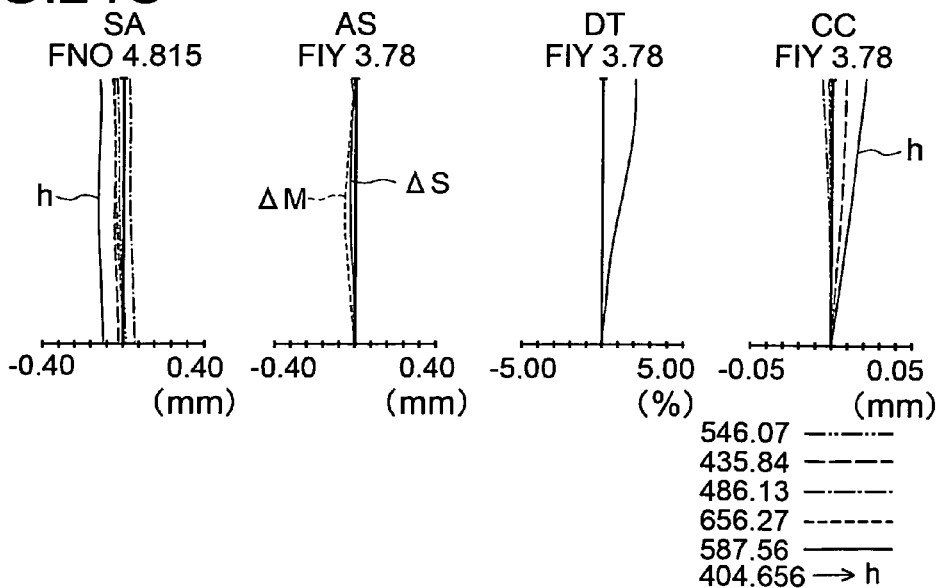

FIGS. 24A, 24B, and 24C are diagrams showing spherical aberration (SA), astigmatism (AS), distortion (DT), and chromatic aberration of magnification (CC) of the zoom lens according to embodiment 12 in the state in which the zoom lens is focused on an object point at infinity, where FIG. 24A is for the wide angle end, FIG. 24B is for the intermediate focal length state, and FIG. 24C is for the telephoto end. In FIGS. 24A, 24B, and 24C, aberrations with respect to the d-line and the h-line are both represented by solid lines, and the solid lines representing the aberrations with respect to the h-line are indicated by the symbol "h" with lead lines.

As shown in FIGS. 23A, 23B, and 23C, the zoom lens according to embodiment 12 includes, in order from its object side, a first lens group G1 having a positive refractive power, a second lens group G2 having a negative refractive power, an aperture stop S, a third lens group G3 having a positive refractive power, a fourth lens group G4 having a positive refractive power, and a fifth lens group G5 having a positive refractive power.

The first lens group G1 includes, in order from the object side, a cemented lens including a positive meniscus lens L1 (a refractive optical element A) having a convex surface directed toward the object side, a negative meniscus lens L2 (an optical element B) having a convex surface directed toward the object side and a positive meniscus lens L3 having a convex surface directed toward the object side, and a positive meniscus lens L4 having a convex surface directed toward the object side. The first lens group G1 has a positive refractive power as a whole. The relative partial dispersion θgF of the refractive optical element A of the cemented lens in the first lens group G1 is 0.718.

The second lens group G2 includes, in order from the object side, a negative meniscus lens L5 having a convex surface directed toward the object side, a cemented lens including a biconcave negative lens L6, a cementing layer L7 and a biconvex positive lens L8, and a negative meniscus lens L9 having a convex surface directed toward the image side. The second lens group G2 has a negative refractive power as a whole.

The third lens group G3 includes, in order from the object side, a biconvex positive lens L10, a negative meniscus lens L11 having a convex surface directed toward the object side, a biconvex positive lens L12, and a negative meniscus lens L13 having a convex surface directed toward the object side. The third lens group G3 has a positive refractive power as a whole.

The fourth lens group G4 includes a cemented lens including a biconvex positive lens L14, a cementing layer L15 and a biconcave negative lens L16 arranged in order from the object side. The fourth lens group G4 has a positive refractive power as a whole.

The fifth lens group G5 includes a biconvex positive lens L17. The fifth lens group G5 has a positive refractive power as a whole.

During zooming from the wide angle end to the telephoto end, the first lens group G1 moves toward the object side, the second lens group G2 moves first toward the object side and thereafter toward the image side, the third lens group G3 moves toward the object side, the fourth lens group G4 moves toward the object side, and the fifth lens group G5 is fixed.

There are seven aspheric surfaces in total, which include the image side surface of the positive meniscus lens L1 closest to the object side in the first lens group G1, the image side surface of the image side negative meniscus lens L9 in the second lens group G2, the object side surface of the object side biconvex positive lens L10 in the third lens group G3, both surfaces of the image side negative meniscus lens L13 in the third lens group G3, and both surfaces of the biconvex positive lens L17 in the fifth lens group G5.

Figure 25A:
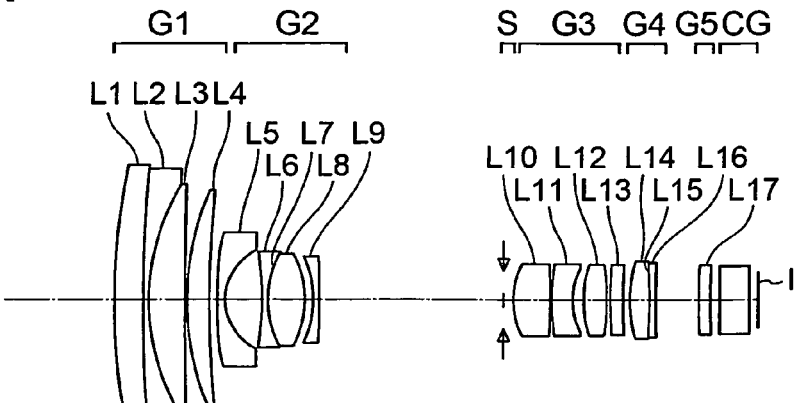
FIGS. 25A, 25B, and 25C are cross sectional views taken along the optical axis showing the optical configuration of a zoom lens according to embodiment 13 of the present invention in the state in which the zoom lens is focused on an object point at infinity, respectively at the wide angle end, at an intermediate focal length, and at the telephoto end.
Figure 25B:
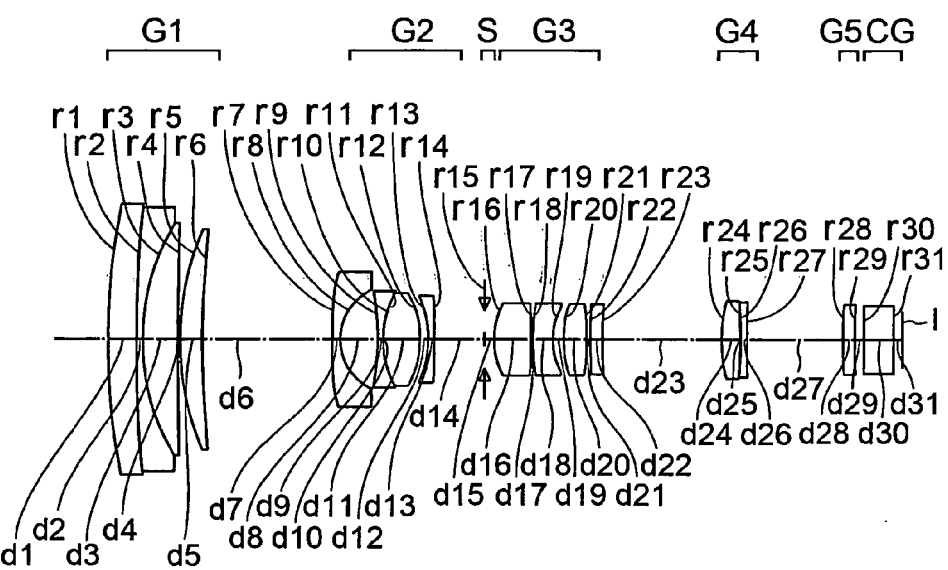
Figure 25C:
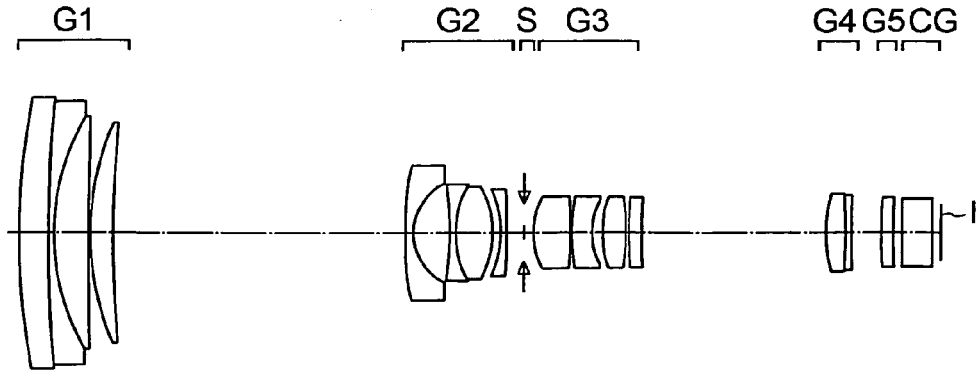

Next, a zoom lens according to embodiment 13 of the present invention will be described. FIGS. 25A, 25B, and 25C are cross sectional views taken along the optical axis showing the optical configuration of the zoom lens according to embodiment 13 of the present invention in the state in which the zoom lens is focused on an object point at infinity, where FIG. 25A is a cross sectional view of the zoom lens at the wide angle end, FIG. 25B is a cross sectional view of the zoom lens in an intermediate focal length state, and FIG. 25C is a cross sectional view of the zoom lens at the telephoto end.

Figure 26A:
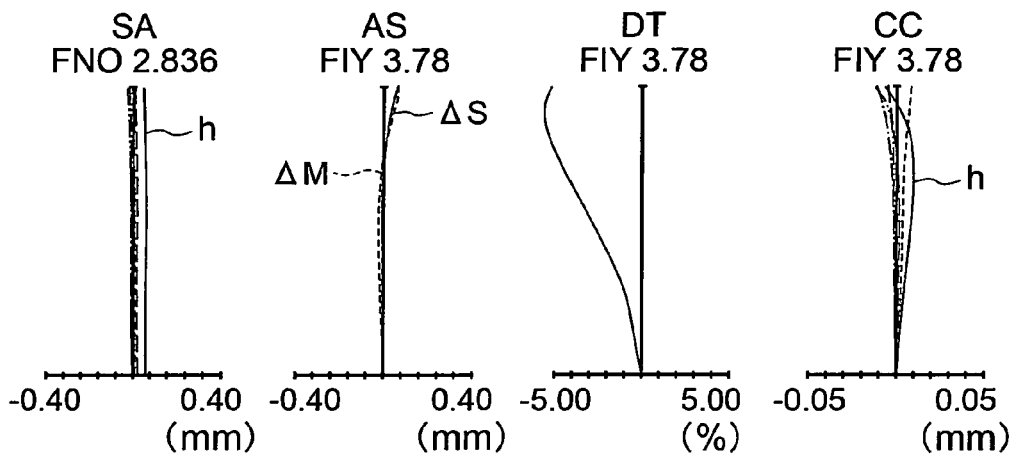
FIGS. 26A, 26B, and 26C are diagrams showing spherical aberration, astigmatism, distortion, and chromatic aberration of magnification of the zoom lens according to embodiment 13 in the state in which the zoom lens is focused on an object point at infinity, where
Figure 26B:
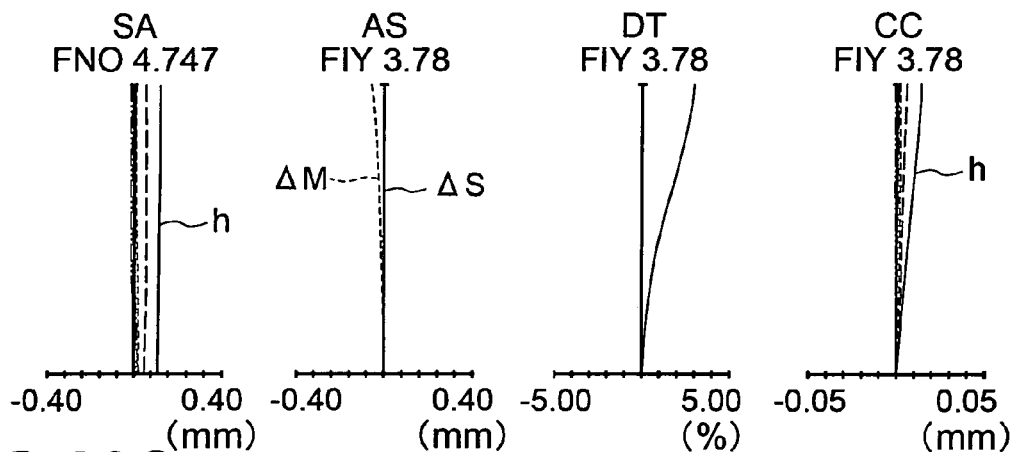
Figure 26C:
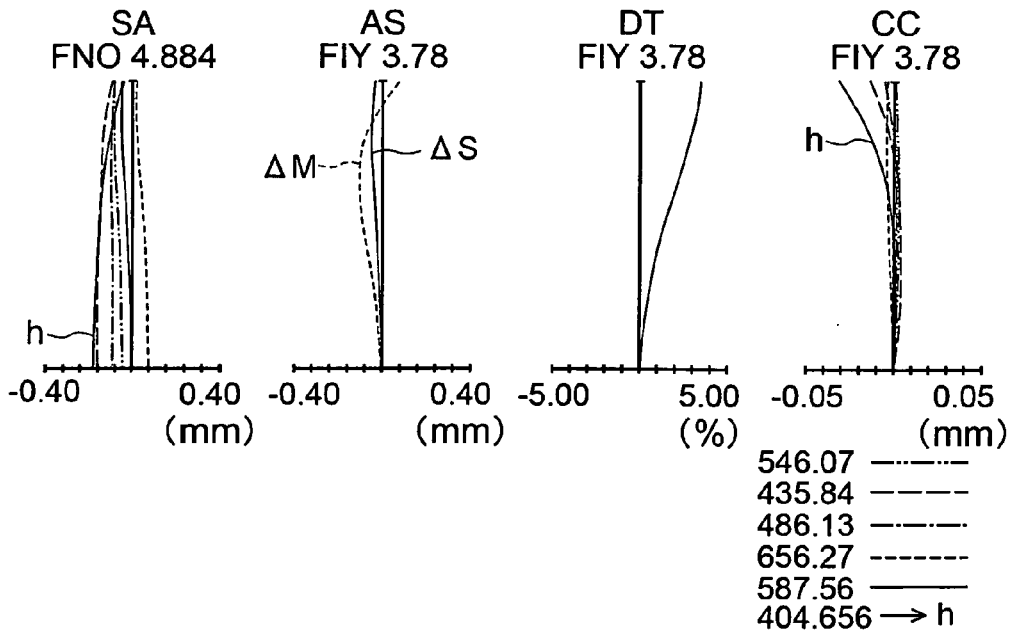

FIGS. 26A, 26B, and 26C are diagrams showing spherical aberration (SA), astigmatism (AS), distortion (DT), and chromatic aberration of magnification (CC) of the zoom lens according to embodiment 13 in the state in which the zoom lens is focused on an object point at infinity, where FIG. 26A is for the wide angle end, FIG. 26B is for the intermediate focal length state, and FIG. 26C is for the telephoto end. In FIGS. 26A, 26B, and 26C, aberrations with respect to the d-line and the h-line are both represented by solid lines, and the solid lines representing the aberrations with respect to the h-line are indicated by the symbol "h" with lead lines.

As shown in FIGS. 25A, 25B, and 25C, the zoom lens according to embodiment 13 includes, in order from its object side, a first lens group G1 having a positive refractive power, a second lens group G2 having a negative refractive power, an aperture stop S, a third lens group G3 having a positive refractive power, a fourth lens group G4 having a positive refractive power, and a fifth lens group G5 having a positive refractive power.

The first lens group G1 includes, in order from the object side, a cemented lens including a positive meniscus lens L1 (a refractive optical element A) having a convex surface directed toward the object side, a negative meniscus lens L2 (an optical element B) having a convex surface directed toward the object side and a biconvex positive lens L3, and a positive meniscus lens L4 having a convex surface directed toward the object side. The first lens group G1 has a positive refractive power as a whole. The relative partial dispersion θgF of the refractive optical element A of the cemented lens in the first lens group G1 is 0.738.

The second lens group G2 includes, in order from the object side, a negative meniscus lens L5 having a convex surface directed toward the object side, a cemented lens including a biconcave negative lens L6, a cementing layer L7 and a biconvex positive lens L8, and a negative meniscus lens L9 having a convex surface directed toward the image side. The second lens group G2 has a negative refractive power as a whole.

The third lens group G3 includes, in order from the object side, a biconvex positive lens L10, a negative meniscus lens L11 having a convex surface directed toward the object side, a biconvex positive lens L12, and a negative meniscus lens L13 having a convex surface directed toward the object side. The third lens group G3 has a positive refractive power as a whole.

The fourth lens group G4 includes a cemented lens including a biconvex positive lens L14, a cementing layer L15 and a biconcave negative lens L16 arranged in order from the object side. The fourth lens group G4 has a positive refractive power as a whole.

The fifth lens group G5 includes a biconvex positive lens L17. The fifth lens group G5 has a positive refractive power as a whole.

During zooming from the wide angle end to the telephoto end, the first lens group G1 moves toward the object side, the second lens group G2 moves first toward the object side and thereafter toward the image side, the third lens group G3 moves toward the object side and thereafter stays substantially stationary with a very small amount of movement, the fourth lens group G4 moves first toward the object side and thereafter toward the image side, and the fifth lens group G5 is fixed.

There are six aspheric surfaces in total, which include the image side surface of the image side negative meniscus lens L9 in the second lens group G2, the object side surface of the object side biconvex positive lens L10 in the third lens group G3, and both surfaces of the image side negative meniscus lens L13 in the third lens group G3, both surfaces of the biconvex positive lens L17 in the fifth lens group G5.

Figure 27A:
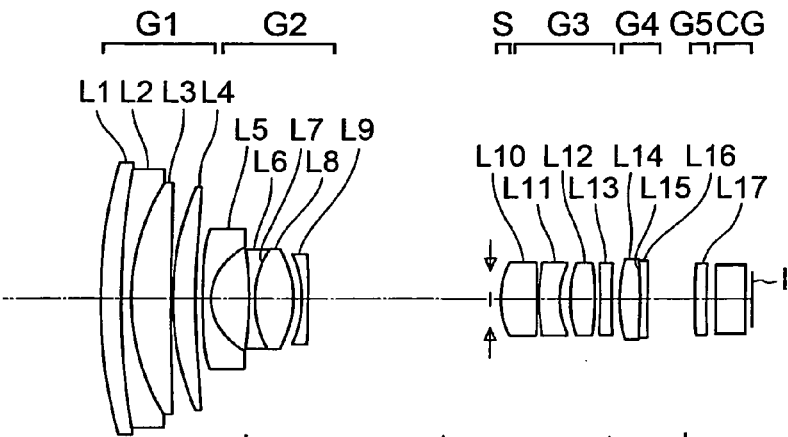
FIGS. 27A, 27B, and 27C are cross sectional views taken along the optical axis showing the optical configuration of a zoom lens according to embodiment 14 of the present invention in the state in which the zoom lens is focused on an object point at infinity, respectively at the wide angle end, at an intermediate focal length, and at the telephoto end.
Figure 27B:
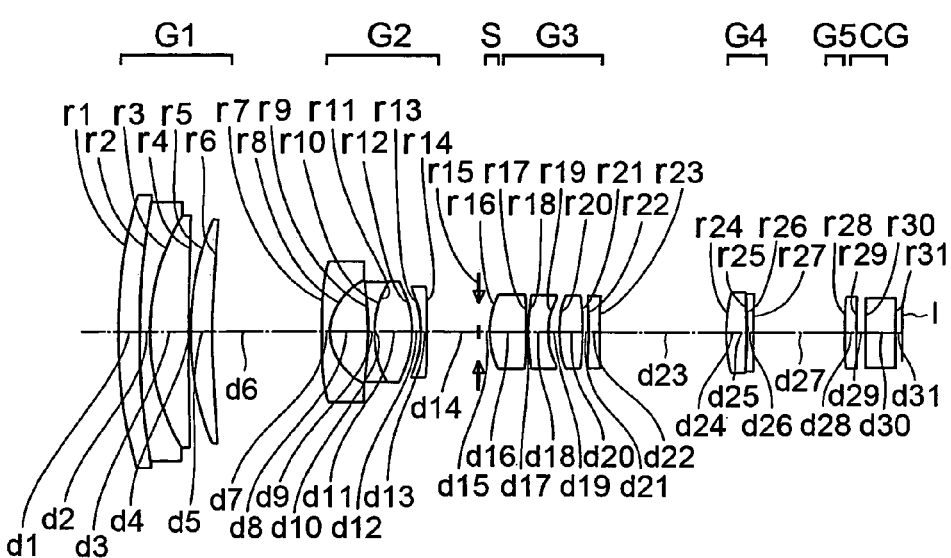
Figure 27C:
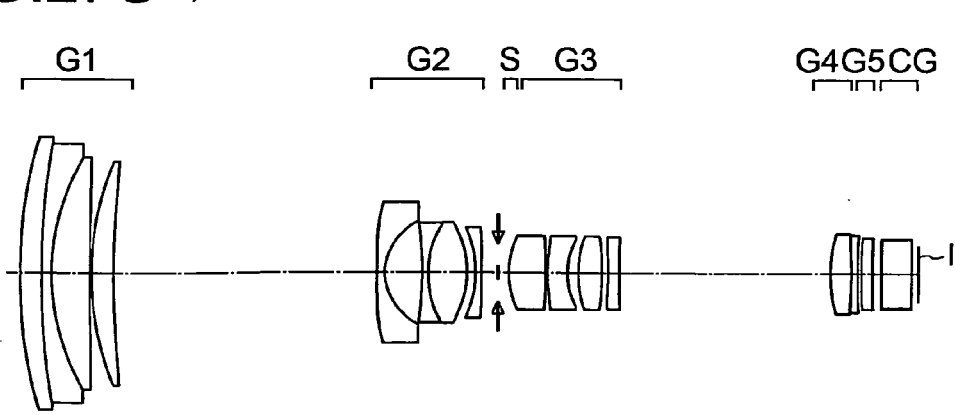

Next, a zoom lens according to embodiment 14 of the present invention will be described. FIGS. 27A, 27B, and 27C are cross sectional views taken along the optical axis showing the optical configuration of the zoom lens according to embodiment 14 of the present invention in the state in which the zoom lens is focused on an object point at infinity, where FIG. 27A is a cross sectional view of the zoom lens at the wide angle end, FIG. 27B is a cross sectional view of the zoom lens in an intermediate focal length state, and FIG. 27C is a cross sectional view of the zoom lens at the telephoto end.

Figure 28A:
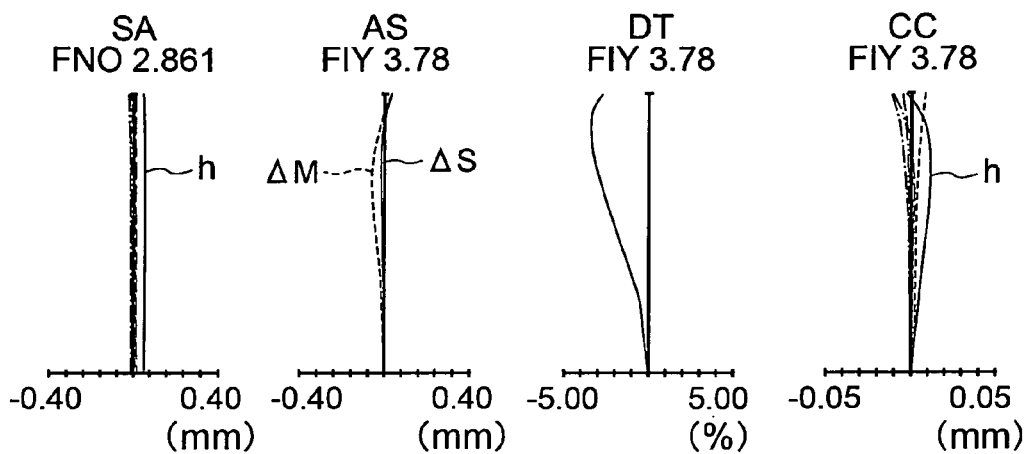
FIGS. 28A, 28B, and 28C are diagrams showing spherical aberration, astigmatism, distortion, and chromatic aberration of magnification of the zoom lens according to embodiment 14 in the state in which the zoom lens is focused on an object point at infinity, where
Figure 28B:
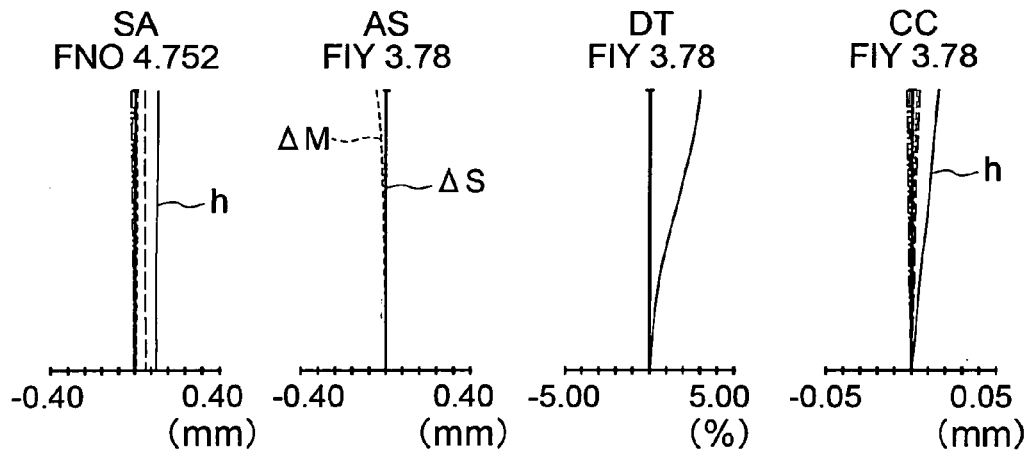
Figure 28C:
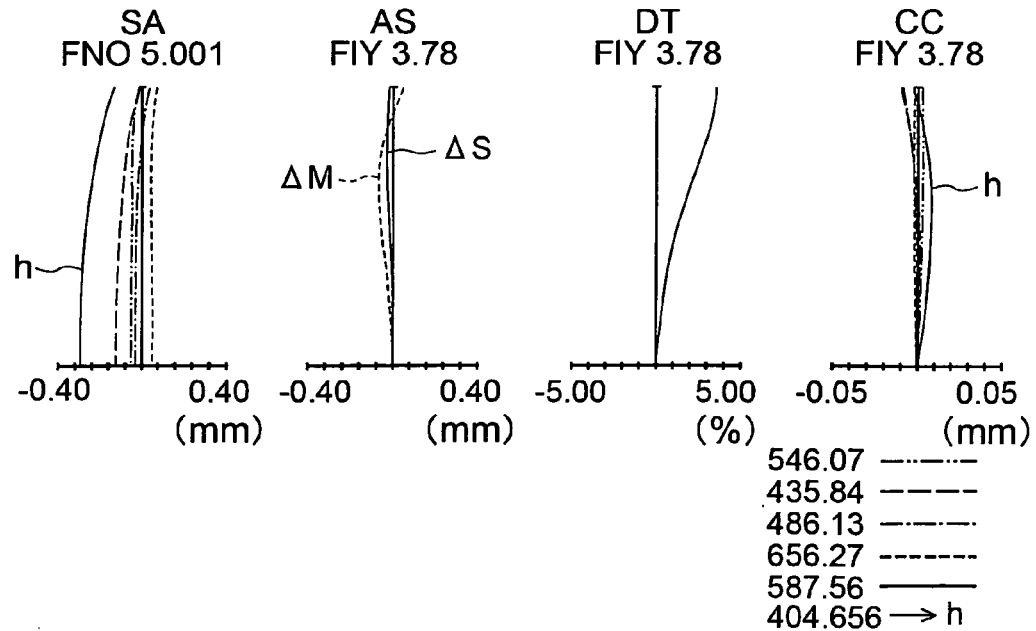

FIGS. 28A, 28B, and 28C are diagrams showing spherical aberration (SA), astigmatism (AS), distortion (DT), and chromatic aberration of magnification (CC) of the zoom lens according to embodiment 14 in the state in which the zoom lens is focused on an object point at infinity, where FIG. 28A is for the wide angle end, FIG. 28B is for the intermediate focal length state, and FIG. 28C is for the telephoto end. In FIGS. 28A, 28B, and 28C, aberrations with respect to the d-line and the h-line are both represented by solid lines, and the solid lines representing the aberrations with respect to the h-line are indicated by the symbol "h" with lead lines.

As shown in FIGS. 27A, 27B, and 27C, the zoom lens according to embodiment 14 includes, in order from its object side, a first lens group G1 having a positive refractive power, a second lens group G2 having a negative refractive power, an aperture stop S, a third lens group G3 having a positive refractive power, a fourth lens group G4 having a positive refractive power, and a fifth lens group G5 having a positive refractive power.

The first lens group G1 includes, in order from the object side, a cemented lens including a positive meniscus lens L1 (a refractive optical element A) having a convex surface directed toward the object side, a negative meniscus lens L2 (an optical element B) having a convex surface directed toward the object side and a positive meniscus lens L3 having a convex surface directed toward the object side, and a positive meniscus lens L4 having a convex surface directed toward the object side. The first lens group G1 has a positive refractive power as a whole. The relative partial dispersion θgF of the refractive optical element A of the cemented lens in the first lens group G1 is 0.817.

The second lens group G2 includes, in order from the object side, a negative meniscus lens L5 having a convex surface directed toward the object side, a cemented lens including a biconcave negative lens L6, a cementing layer L7 and a biconvex positive lens L8, and a negative meniscus lens L9 having a convex surface directed toward the image side. The second lens group G2 has a negative refractive power as a whole.

The third lens group G3 includes, in order from the object side, a biconvex positive lens L10, a negative meniscus lens L11 having a convex surface directed toward the object side, a biconvex positive lens L12, and a negative meniscus lens L13 having a convex surface directed toward the object side. The third lens group G3 has a positive refractive power as a whole.

The fourth lens group G4 includes a cemented lens including a biconvex positive lens L14, a cementing layer L15 and a biconcave negative lens L16 arranged in order from the object side. The fourth lens group G4 has a positive refractive power as a whole.

The fifth lens group G5 includes a biconvex positive lens L17. The fifth lens group G5 has a positive refractive power as a whole.

During zooming from the wide angle end to the telephoto end, the first lens group G1 moves toward the object side, the second lens group G2 moves first toward the object side and thereafter toward the image side, the third lens group G3 moves toward the object side and thereafter stays substantially stationary with a very small amount of movement, the fourth lens group G4 moves first toward the object side and thereafter toward the image side, and the fifth lens group G5 is fixed.

There are six aspheric surfaces in total, which include the image side surface of the image side negative meniscus lens L9 in the second lens group G2, the object side surface of the object side biconvex positive lens L10 in the third lens group G3, both surfaces of the image side negative meniscus lens L13 in the third lens group G3, and both surfaces of the biconvex positive lens L17 in the fifth lens group G5.

Figure 29A:
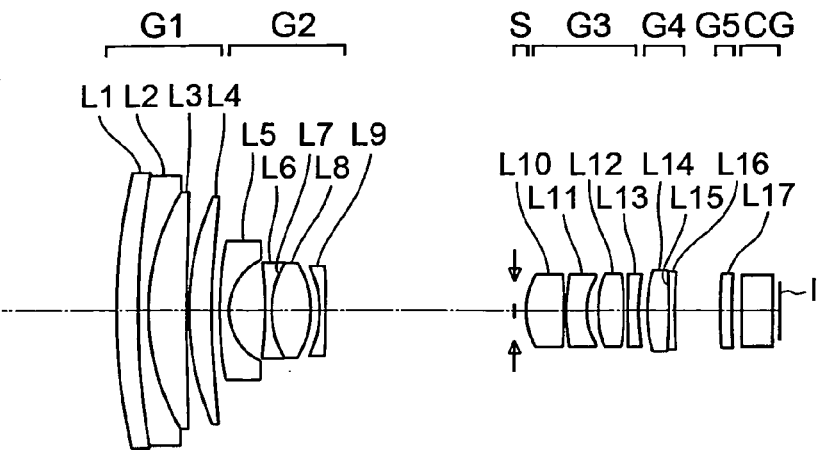
FIGS. 29A, 29B, and 29C are cross sectional views taken along the optical axis showing the optical configuration of a zoom lens according to embodiment 15 of the present invention in the state in which the zoom lens is focused on an object point at infinity, respectively at the wide angle end, at an intermediate focal length, and at the telephoto end.
Figure 29B:
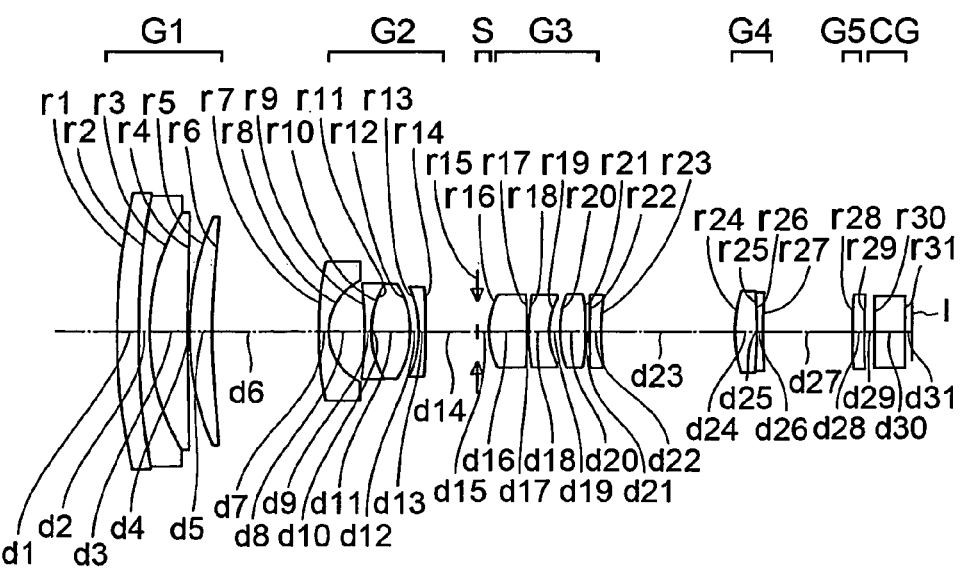
Figure 29C:
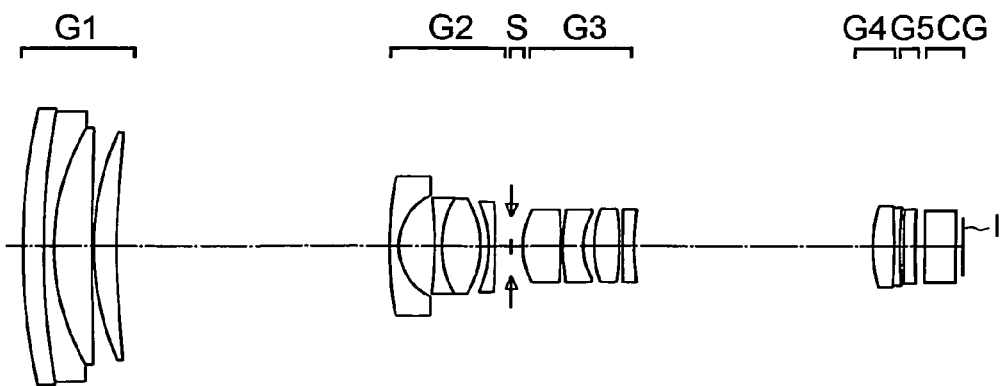

Next, a zoom lens according to embodiment 15 of the present invention will be described. FIGS. 29A, 29B, and 29C are cross sectional views taken along the optical axis showing the optical configuration of the zoom lens according to embodiment 15 of the present invention in the state in which the zoom lens is focused on an object point at infinity, where FIG. 29A is a cross sectional view of the zoom lens at the wide angle end, FIG. 29B is a cross sectional view of the zoom lens in an intermediate focal length state, and FIG. 29C is a cross sectional view of the zoom lens at the telephoto end.

Figure 30A:
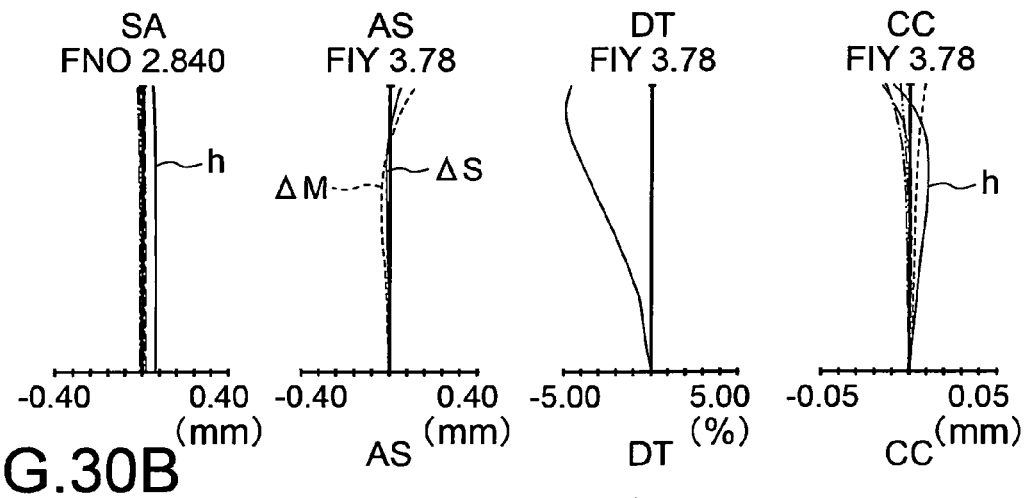
FIGS. 30A, 30B, and 30C are diagrams showing spherical aberration, astigmatism, distortion, and chromatic aberration of magnification of the zoom lens according to embodiment 15 in the state in which the zoom lens is focused on an object point at infinity, where
Figure 30B:
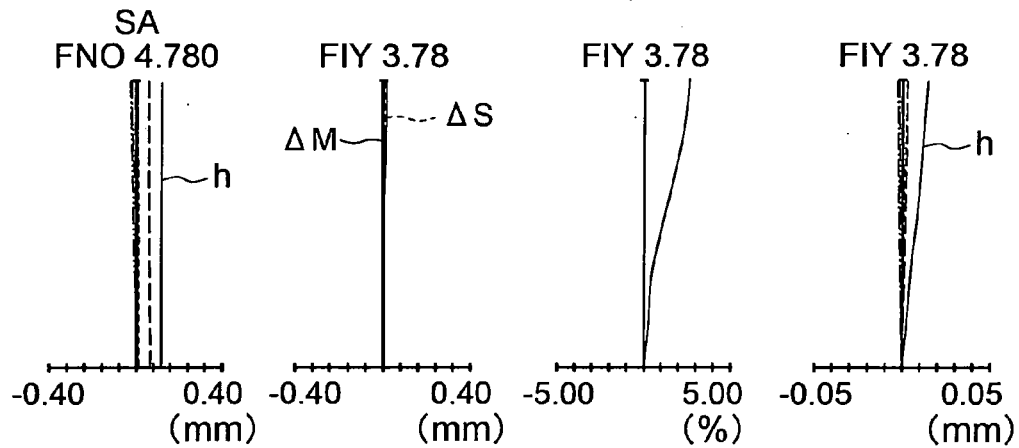
Figure 30C:
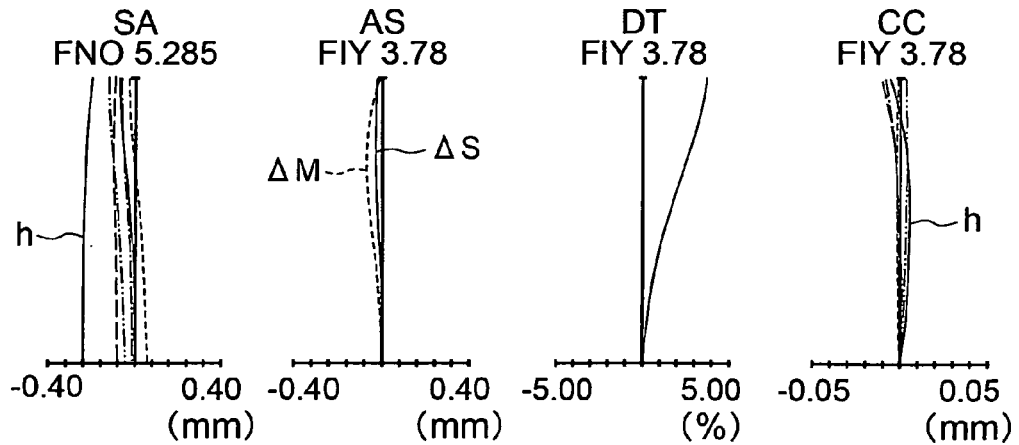

FIGS. 30A, 30B, and 30C are diagrams showing spherical aberration (SA), astigmatism (AS), distortion (DT), and chromatic aberration of magnification (CC) of the zoom lens according to embodiment 15 in the state in which the zoom lens is focused on an object point at infinity, where FIG. 30A is for the wide angle end, FIG. 30B is for the intermediate focal length state, and FIG. 30C is for the telephoto end. In FIGS. 30A, 30B, and 30C, aberrations with respect to the d-line and the h-line are both represented by solid lines, and the solid lines representing the aberrations with respect to the h-line are indicated by the symbol "h" with lead lines.

As shown in FIGS. 29A, 29B, and 29C, the zoom lens according to embodiment 15 includes, in order from its object side, a first lens group G1 having a positive refractive power, a second lens group G2 having a negative refractive power, an aperture stop S, a third lens group G3 having a positive refractive power, a fourth lens group G4 having a positive refractive power, and a fifth lens group G5 having a positive refractive power.

The first lens group G1 includes, in order from the object side, a cemented lens including a positive meniscus lens L1 (a refractive optical element A) having a convex surface directed toward the object side, a negative meniscus lens L2 (an optical element B) having a convex surface directed toward the object side and a positive meniscus lens L3 having a convex surface directed toward the object side, and a positive meniscus lens L4 having a convex surface directed toward the object side. The first lens group G1 has a positive refractive power as a whole. The relative partial dispersion θgF of the refractive optical element A of the cemented lens in the first lens group G1 is 0.873.

The second lens group G2 includes, in order from the object side, a negative meniscus lens L5 having a convex surface directed toward the object side, a cemented lens including a biconcave negative lens L6, a cementing layer L7 and a biconvex positive lens L8, and a negative meniscus lens L9 having a convex surface directed toward the image side. The second lens group G2 has a negative refractive power as a whole.

The third lens group G3 includes, in order from the object side, a biconvex positive lens L10, a negative meniscus lens L11 having a convex surface directed toward the object side, a biconvex positive lens L12, and a negative meniscus lens L13 having a convex surface directed toward the object side. The third lens group G3 has a positive refractive power as a whole.

The fourth lens group G4 includes a cemented lens including a biconvex positive lens L14, a cementing layer L15 and a biconcave negative lens L16 arranged in order from the object side. The fourth lens group G4 has a positive refractive power as a whole.

The fifth lens group G5 includes a biconvex positive lens L17. The fifth lens group G5 has a positive refractive power as a whole.

During zooming from the wide angle end to the telephoto end, the first lens group G1 moves toward the object side, the second lens group G2 moves first toward the object side and thereafter toward the image side, the third lens group G3 moves toward the object side, the fourth lens group G4 moves first toward the object side and thereafter toward the image side, and the fifth lens group G5 is fixed.

There are six aspheric surfaces in total, which include the image side surface of the image side negative meniscus lens L9 in the second lens group G2, the object side surface of the object side biconvex positive lens L10 in the third lens group G3, both surfaces of the image side negative meniscus lens L13 in the third lens group G3, and both surfaces of the biconvex positive lens L17 in the fifth lens group G5.

Numerical data of each embodiment described above is shown below. Each of r1, r2, . . . denotes radius of curvature of each lens surface, each of d1, d2, . . . denotes lens thickness or an air distance between two lenses, each of nd1, nd2, . . . denotes a refractive index of each lens for a d-line, each of vd1, vd2, . . . denotes an Abbe's number for each lens, $F_{NO}$ denotes an F number, f denotes a focal length of the entire zoom lens system, and D0 denotes a distance from the object to the first surface of the lens system. Further, * denotes an aspheric data.

When z is let to be in an optical axis direction, y is let to be in a direction orthogonal to the optical axis, K denotes a conical coefficient, A4, A6, A8, and A10 denote aspherical surface coefficients, a shape of the aspheric surface is described by the following expression.

$$z=(y^2/r)/[1+\{1-(K+1)(y/r)^2\}^{1/2}]+A_4y^4+A_6y^6+A_8y^8+A_{10}y^{10}+A_{12}y^{12} \quad (I)$$

where E indicates '$10^{-n}$'. These reference signs are common in numeral data of after-mentioned each embodiment.

Example 1

| | | Unit mm | | | |
|---|---|---|---|---|---|
| | | Surface data | | | |
| Surface no. | r | d | nd | vd | effective radius |
| Object plane | ∞ | ∞ | | | |
| 1 | 70.809 | 2.96 | 1.63387 | 23.38 | 17.50 |
| 2 | 230.807 | 0.74 | 1.63493 | 23.90 | 16.71 |
| 3 | 34.453 | 4.59 | 1.49700 | 81.54 | 14.83 |
| 4 | 752679.419 | 0.10 | | | 14.70 |
| 5 | 43.434 | 2.86 | 1.78800 | 47.37 | 14.29 |
| 6 | 129.755 | Variable | | | 14.00 |
| 7 | 63.326 | 1.10 | 1.88300 | 40.76 | 8.71 |
| 8 | 7.209 | 4.79 | | | 6.13 |
| 9 | −46.254 | 0.80 | 1.88300 | 40.76 | 6.02 |
| 10 | 12.396 | 0.01 | 1.51400 | 42.83 | 6.03 |
| 11 | 12.396 | 4.87 | 1.78472 | 25.68 | 6.03 |
| 12 | −13.411 | 1.15 | | | 6.10 |
| 13 | −13.602 | 0.80 | 1.77250 | 49.60 | 5.51 |
| 14* | −679.809 | Variable | | | 5.51 |
| 15(stop) | ∞ | 1.30 | | | 3.62 |
| 16* | 10.743 | 4.93 | 1.58913 | 61.14 | 4.21 |
| 17 | −78.051 | 0.10 | | | 4.25 |
| 18 | 28.041 | 2.77 | 1.84666 | 23.78 | 4.24 |
| 19 | 10.632 | 1.42 | | | 3.99 |
| 20 | 14.230 | 3.12 | 1.49700 | 81.54 | 4.27 |
| 21 | −36.985 | 0.64 | | | 4.33 |
| 22* | 58.077 | 1.36 | 1.53071 | 55.69 | 4.32 |
| 23* | 34.607 | Variable | | | 4.31 |
| 24 | 19.130 | 2.68 | 1.49700 | 81.54 | 4.73 |
| 25 | −119.090 | 0.01 | 1.51400 | 42.83 | 4.60 |
| 26 | −119.090 | 0.82 | 1.80400 | 46.57 | 4.60 |
| 27 | 76.031 | Variable | | | 4.55 |
| 28* | 147.374 | 1.63 | 1.53071 | 55.69 | 4.14 |
| 29* | −67.939 | 1.09 | | | 4.06 |
| 30 | ∞ | 4.00 | 1.51680 | 64.20 | 4.00 |
| 31 | ∞ | 0.97 | | | 3.84 |
| Image plane | ∞ | | | | |

| Aspherical surface data |
|---|

14th surface

K = 0.000, A2 = 0.0000E+00, A4 = −9.19823e−05, A6 = −8.80923e−07, A8 = 4.39702e−08, A10 = −1.24247e−09

16th surface

K = 0.000, A2 = 0.0000E+00, A4 = −8.77784e−05, A6 = −1.01116e−06, A8 = 5.64180e−08, A10 = −2.23368e−09, A12 = 3.59187e−11

22nd surface

K = 0.000, A2 = 0.0000E+00, A4 = −2.17277e−04, A6 = 5.36299e−06, A8 = −5.28517e−07, A10 = 1.10330e−08, A12 = −1.37250e−10

23rd surface

K = 0.000, A2 = 0.0000E+00, A4 = −1.09771e−04, A6 = 5.91402e−06, A8 = −5.09130e−07, A10 = 8.38419e−09, A12 = −4.36735e−11

28th surface

K = 0.000, A2 = 0.0000E+00, A4 = 8.15873e−04, A6 = 4.82675e−06, A8 = −2.20386e−06, A10 = 4.10510e−08

29th surface

K = 0.000, A2 = 0.0000E+00, A4 = 1.26016e−03, A6 = 1.60282e−05, A8 = −3.90922e−06, A10 = 7.56282e−08

| Various data Zoom ratio 19.88 | | | |
|---|---|---|---|
| | Wide angle | Intermediate | Telephoto |
| Focal length | 4.68 | 20.73 | 93.01 |
| Fno. | 2.85 | 4.76 | 4.80 |
| Angle of field 2ω | 78.21 | 19.18 | 4.29 |
| Image height | 3.6 | 3.6 | 3.6 |
| Lens total length | 82.40 | 102.92 | 120.70 |
| BF | 4.70 | 4.34 | 4.65 |
| d6 | 1.00 | 17.26 | 40.10 |
| d14 | 24.23 | 7.17 | 2.30 |
| d23 | 1.00 | 16.76 | 22.07 |
| d27 | 5.92 | 11.84 | 6.03 |
| Entrance pupil position | 18.89 | 55.63 | 327.85 |
| Exit pupil position A | −31.39 | −164.69 | −261.91 |
| Exit pupil position B | −36.08 | −169.03 | −266.56 |
| Front side principal point position | 22.96 | 73.81 | 388.41 |
| Back side principal point position | −3.71 | −20.12 | −92.09 |

| Single lens data | | |
|---|---|---|
| Lens | Initial surface | Focal length |
| L1 | 1 | 160.00 |
| L2 | 2 | −63.88 |
| L3 | 3 | 69.33 |
| L4 | 5 | 81.66 |
| L5 | 7 | −9.30 |
| L6 | 9 | −11.00 |
| L7 | 10 | 8.81E+04 |
| L8 | 11 | 8.95 |
| L9 | 13 | −17.98 |
| L10 | 16 | 16.37 |
| L11 | 18 | −21.82 |
| L12 | 20 | 21.10 |

-continued

Unit mm

| | | |
|---|---|---|
| L13 | 22 | −164.67 |
| L14 | 24 | 33.38 |
| L15 | 25 | 8.13E+06 |
| L16 | 26 | −57.61 |
| L17 | 28 | 87.85 |

Zoom lens group data

| Group | Initial surface | Focal length | Lens structure length | Front side principal point position | Back side principal point position |
|---|---|---|---|---|---|
| 1 | 1 | 59.2252 | 11.2593 | 2.8438 | −4.2819 |
| 2 | 7 | −6.8912 | 13.5160 | 1.6857 | −7.4162 |
| 3 | 15 | 17.1168 | 15.6380 | 1.7408 | −9.5255 |
| 4 | 24 | 73.7783 | 3.5080 | −2.0985 | −4.2304 |
| 5 | 28 | 87.8520 | 6.7160 | 0.7294 | −4.0624 |

| Group | Initial surbace | wide angle Magnification | Intermediate Magnification | Telephoto Magnification |
|---|---|---|---|---|
| 1 | 1 | 0.0000 | 0.0000 | 0.0000 |
| 2 | 7 | −0.1519 | −0.2368 | −1.0992 |
| 3 | 15 | −0.7072 | −2.2136 | −1.9438 |
| 4 | 24 | 0.7801 | 0.7054 | 0.7793 |
| 5 | 28 | 0.9427 | 0.9468 | 0.9432 |

Example 2

Unit mm

Surface data

| Surface no. | r | d | nd | vd | effective radius |
|---|---|---|---|---|---|
| Object plane | ∞ | ∞ | | | |
| 1 | 66.498 | 3.65 | 1.63387 | 23.38 | 17.90 |
| 2 | 1176.099 | 0.58 | 1.63493 | 23.90 | 17.13 |
| 3 | 33.207 | 4.60 | 1.48749 | 70.23 | 14.83 |
| 4 | 1355.988 | 0.10 | | | 14.70 |
| 5 | 38.899 | 2.78 | 1.69680 | 55.53 | 14.23 |
| 6 | 120.085 | Variable | | | 14.00 |
| 7 | 63.326 | 1.10 | 1.88300 | 40.76 | 8.71 |
| 8 | 7.209 | 4.79 | | | 6.13 |
| 9 | −46.254 | 0.80 | 1.88300 | 40.76 | 6.04 |
| 10 | 12.396 | 0.01 | 1.51400 | 42.83 | 6.06 |
| 11 | 12.396 | 4.87 | 1.78472 | 25.68 | 6.07 |
| 12 | −13.411 | 1.15 | | | 6.14 |
| 13 | −13.602 | 0.80 | 1.77250 | 49.60 | 5.58 |
| 14* | −679.809 | Variable | | | 5.59 |
| 15(stop) | ∞ | 1.30 | | | 3.79 |
| 16* | 10.743 | 4.93 | 1.58913 | 61.14 | 4.39 |
| 17 | −78.051 | 0.10 | | | 4.40 |
| 18 | 28.041 | 2.77 | 1.84666 | 23.78 | 4.38 |
| 19 | 10.632 | 1.42 | | | 4.10 |
| 20 | 14.230 | 3.12 | 1.49700 | 81.54 | 4.35 |
| 21 | −36.985 | 0.64 | | | 4.40 |
| 22* | 78.247 | 1.36 | 1.53071 | 55.69 | 4.37 |
| 23* | 34.607 | Variable | | | 4.37 |
| 24 | 19.130 | 2.68 | 1.49700 | 81.54 | 4.80 |
| 25 | −119.090 | 0.01 | 1.51400 | 42.83 | 4.67 |
| 26 | −119.090 | 0.82 | 1.80400 | 46.57 | 4.67 |
| 27 | 76.031 | Variable | | | 4.62 |
| 28* | 147.374 | 1.63 | 1.53071 | 55.69 | 4.13 |
| 29* | −67.906 | 1.09 | | | 4.05 |
| 30 | ∞ | 4.00 | 1.51680 | 64.20 | 3.99 |
| 31 | ∞ | 1.09 | | | 3.84 |
| Image plane | ∞ | | | | |

-continued

Unit mm

Aspherical surface data

14th surface

K = 0.000, A2 = 0.0000E+00, A4 = −9.41129e−05, A6 = −3.64343e−07, A8 = 6.43993e−09, A10 = −6.00440e−10

16th surface

K = 0.000, A2 = 0.0000E+00, A4 = −8.77784e−05, A6 = −1.01116e−06, A8 = 5.64180e−08, A10 = −2.23368e−09, A12 = 3.59187e−11

22nd surface

K = 0.000, A2 = 0.0000E+00, A4 = −2.17277e−04, A6 = 5.36299e−06, A8 = −5.28517e−07, A10 = 1.10330e−08, A12 = −1.37250e−10

23rd surface

K = 0.000, A2 = 0.0000E+00, A4 = −1.09771e−04, A6 = 5.91402e−06, A8 = −5.09130e−07, A10 = 8.38419e−09, A12 = −4.36735e−11

28th surface

K = 0.000, A2 = 0.0000E+00, A4 = 8.15873e−04, A6 = 4.82675e−06, A8 = −2.20386e−06, A10 = 4.10510e−08

29th surface

K = 0.000, A2 = 0.0000E+00, A4 = 1.26016e−03, A6 = 1.60282e−05, A8 = −3.90922e−06, A10 = 7.56282e−08

Various data
Zoom ratio 19.68

| | Wide angle | Intermediate | Telephoto |
|---|---|---|---|
| Focal length | 4.74 | 20.72 | 93.22 |
| Fno. | 2.80 | 4.63 | 4.63 |
| Angle of field 2ω | 77.40 | 19.19 | 4.30 |
| Image height | 3.6 | 3.6 | 3.6 |
| Lens total length | 84.13 | 103.91 | 120.76 |
| BF | 4.82 | 4.65 | 4.79 |
| d6 | 1.00 | 17.10 | 39.35 |
| d14 | 25.19 | 7.84 | 2.30 |
| d23 | 1.02 | 15.14 | 17.24 |
| d27 | 6.11 | 13.18 | 11.09 |
| Entrance pupil position | 19.57 | 56.86 | 323.09 |
| Exit pupil position A | −31.13 | −142.25 | −162.86 |
| Exit pupil position B | −35.95 | −146.90 | −167.65 |
| Front side principal point position | 23.68 | 74.65 | 364.48 |
| Back side principal point position | −3.64 | −19.80 | −92.16 |

Single lens data

| Lens | Initial surface | Focal length |
|---|---|---|
| L1 | 1 | 111.05 |
| L2 | 2 | −53.83 |
| L3 | 3 | 68.15 |
| L4 | 5 | 81.43 |
| L5 | 7 | −9.30 |
| L6 | 9 | −11.00 |
| L7 | 10 | 8.81E+04 |
| L8 | 11 | 8.95 |
| L9 | 13 | −17.98 |
| L10 | 16 | 16.37 |
| L11 | 18 | −21.82 |
| L12 | 20 | 21.10 |
| L13 | 22 | −118.20 |
| L14 | 24 | 33.38 |
| L15 | 25 | 8.13E+06 |
| L16 | 26 | −57.61 |
| L17 | 28 | 87.82 |

-continued

Unit mm

Zoom lens group data

| Group | Initial surface | Focal length | Lens structure length | Front side principal point position | Back side principal point position |
|---|---|---|---|---|---|
| 1 | 1 | 58.7582 | 11.7081 | 2.9562 | −4.5775 |
| 2 | 7 | −6.8912 | 13.5160 | 1.6857 | −7.4162 |
| 3 | 15 | 17.4750 | 15.6380 | 1.3750 | −9.7065 |
| 4 | 24 | 73.7783 | 3.5080 | −2.0985 | −4.2304 |
| 5 | 28 | 87.8227 | 6.7160 | 0.7295 | −4.0623 |

| Group | Initial surbace | wide angle Magnification | Intermediate Magnification | Telephoto Magnification |
|---|---|---|---|---|
| 1 | 1 | 0.0000 | 0.0000 | 0.0000 |
| 2 | 7 | −0.1545 | −0.2418 | −1.1021 |
| 3 | 15 | −0.7145 | −2.2655 | −2.1568 |
| 4 | 24 | 0.7757 | 0.6826 | 0.7088 |
| 5 | 28 | 0.9413 | 0.9433 | 0.9417 |

Example 3

Unit mm

Surface data

| Surface no. | r | d | nd | νd | effective radius |
|---|---|---|---|---|---|
| Object plane | ∞ | ∞ | | | |
| 1 | 67.596 | 2.71 | 1.63387 | 23.38 | 17.50 |
| 2 | 1210.512 | 0.77 | 1.63493 | 23.90 | 17.19 |
| 3 | 33.515 | 4.58 | 1.48749 | 70.23 | 14.85 |
| 4 | 108051.958 | 0.10 | | | 14.70 |
| 5 | 38.144 | 2.79 | 1.72916 | 54.68 | 14.24 |
| 6 | 110.004 | Variable | | | 14.00 |
| 7 | 61.205 | 1.10 | 1.88300 | 40.76 | 8.89 |
| 8 | 7.222 | 4.79 | | | 6.21 |
| 9 | −46.254 | 0.80 | 1.88300 | 40.76 | 6.14 |
| 10 | 12.396 | 0.01 | 1.51400 | 42.83 | 6.18 |
| 11 | 12.396 | 4.87 | 1.78472 | 25.68 | 6.18 |
| 12 | −13.411 | 1.15 | | | 6.26 |
| 13 | −13.625 | 0.80 | 1.77250 | 49.60 | 5.68 |
| 14* | −663.540 | Variable | | | 5.70 |
| 15(stop) | ∞ | 1.30 | | | 3.77 |
| 16* | 10.743 | 4.93 | 1.58913 | 61.14 | 4.36 |
| 17 | −78.051 | 0.10 | | | 4.36 |
| 18 | 28.041 | 2.77 | 1.84666 | 23.78 | 4.35 |
| 19 | 10.632 | 1.42 | | | 4.06 |
| 20 | 14.230 | 3.12 | 1.49700 | 81.54 | 4.31 |
| 21 | −36.985 | 0.64 | | | 4.35 |
| 22* | 95.199 | 1.36 | 1.53071 | 55.69 | 4.33 |
| 23* | 34.607 | Variable | | | 4.32 |
| 24 | 19.130 | 2.68 | 1.49700 | 81.54 | 4.76 |
| 25 | −119.090 | 0.01 | 1.51400 | 42.83 | 4.63 |
| 26 | −119.090 | 0.82 | 1.80400 | 46.57 | 4.63 |
| 27 | 76.031 | Variable | | | 4.58 |
| 28* | 147.374 | 1.63 | 1.53071 | 55.69 | 4.12 |
| 29* | −67.939 | 1.09 | | | 4.04 |
| 30 | ∞ | 4.00 | 1.51680 | 64.20 | 3.98 |
| 31 | ∞ | 1.10 | | | 3.83 |
| Image plane | ∞ | | | | |

Aspherical surface data

14th surface

K = 0.000, A2 = 0.0000E+00, A4 = −9.24299e−05, A6 = −5.56887e−07, A8 = 1.22900e−08, A10 = −6.66277e−10

16th surface

K = 0.000, A2 = 0.0000E+00, A4 = −8.77784e−05, A6 = −1.01116e−06, A8 = 5.64180e−08, A10 = −2.23368e−09, A12 = 3.59187e−11

22nd surface

K = 0.000, A2 = 0.0000E+00, A4 = −2.17277e−04, A6 = 5.36299e−06, A8 = −5.28517e−07, A10 = 1.10330e−08, A12 = −1.37250e−10

23rd surface

K = 0.000, A2 = 0.0000E+00, A4 = −1.09771e−04, A6 = 5.91402e−06, A8 = −5.09130e−07, A10 = 8.38419e−09, A12 = −4.36735e−11

28th surface

K = 0.000, A2 = 0.0000E+00, A4 = 8.15873e−04, A6 = 4.82675e−06, A8 = −2.20386e−06, A10 = 4.10510e−08

29th surface

K = 0.000, A2 = 0.0000E+00, A4 = 1.26016e−03, A6 = 1.60282e−05, A8 = −3.90922e−06, A10 = 7.56282e−08

Various data
Zoom ratio 19.90

| | Wide angle | Intermediate | Telephoto |
|---|---|---|---|
| Focal length | 4.68 | 20.74 | 93.07 |
| Fno. | 2.84 | 4.70 | 4.80 |
| Angle of field 2ω | 78.13 | 19.19 | 4.32 |
| Image height | 3.6 | 3.6 | 3.6 |
| Lens total length | 84.42 | 103.49 | 120.32 |
| BF | 4.82 | 4.65 | 4.78 |
| d6 | 1.00 | 17.00 | 38.35 |
| d14 | 26.26 | 8.31 | 2.30 |
| d23 | 1.01 | 15.23 | 17.18 |
| d27 | 6.09 | 13.06 | 12.46 |
| Entrance pupil position | 19.04 | 56.33 | 303.25 |
| Exit pupil position A | −30.76 | −140.74 | −170.46 |
| Exit pupil position B | −35.58 | −145.39 | −175.25 |
| Front side principal point position | 23.11 | 74.10 | 346.89 |
| Back side principal point position | −3.58 | −19.81 | −92.02 |

Single lens data

| Lens | Initial surface | Focal length |
|---|---|---|
| L1 | 1 | 112.84 |
| L2 | 2 | −54.30 |
| L3 | 3 | 68.77 |
| L4 | 5 | 78.79 |
| L5 | 7 | −9.36 |
| L6 | 9 | −11.00 |
| L7 | 10 | 8.81E+04 |
| L8 | 11 | 8.95 |
| L9 | 13 | −18.02 |
| L10 | 16 | 16.37 |
| L11 | 18 | −21.82 |
| L12 | 20 | 21.10 |
| L13 | 22 | −103.26 |
| L14 | 24 | 33.38 |
| L15 | 25 | 8.13E+06 |
| L16 | 26 | −57.61 |
| L17 | 28 | 87.85 |

Zoom lens group data

| Group | Initial surface | Focal length | Lens structure length | Front side principal point position | Back side principal point position |
|---|---|---|---|---|---|
| 1 | 1 | 57.6335 | 10.9479 | 2.7384 | −4.2649 |
| 2 | 7 | −6.9436 | 13.5160 | 1.6886 | −7.4211 |
| 3 | 15 | 17.6645 | 15.6380 | 1.1815 | −9.8022 |
| 4 | 24 | 73.7783 | 3.5080 | −2.0985 | −4.2304 |
| 5 | 28 | 87.8520 | 6.7160 | 0.7294 | −4.0624 |

-continued

Unit mm

| Group | Initial surbace | wide angle Magnification | Intermediate Magnification | Telephoto Magnification |
|---|---|---|---|---|
| 1 | 1 | 0.0000 | 0.0000 | 0.0000 |
| 2 | 7 | −0.1588 | −0.2503 | −1.088 |
| 3 | 15 | −0.6998 | −2.2276 | −2.2832 |
| 4 | 24 | 0.7759 | 0.6840 | 0.6903 |
| 5 | 28 | 0.9413 | 0.9432 | 0.9417 |

Example 4

Unit mm

Surface data

| Surface no. | r | d | nd | vd | effective radius |
|---|---|---|---|---|---|
| Object plane | ∞ | ∞ | | | |
| 1 | 64.222 | 3.74 | 1.63387 | 23.38 | 18.00 |
| 2* | −5535.874 | 0.78 | 1.63493 | 23.90 | 17.30 |
| 3 | 32.530 | 4.68 | 1.48749 | 70.23 | 14.83 |
| 4 | 69846.338 | 0.10 | | | 14.70 |
| 5 | 39.496 | 2.73 | 1.72916 | 54.68 | 14.23 |
| 6 | 121.015 | Variable | | | 14.00 |
| 7 | 69.616 | 1.10 | 1.88300 | 40.76 | 8.84 |
| 8 | 7.214 | 4.79 | | | 6.17 |
| 9 | −46.254 | 0.80 | 1.88300 | 40.76 | 6.08 |
| 10 | 12.396 | 0.01 | 1.51400 | 42.83 | 6.11 |
| 11 | 12.396 | 4.87 | 1.78472 | 25.68 | 6.11 |
| 12 | −13.411 | 1.15 | | | 6.18 |
| 13 | −13.602 | 0.80 | 1.77250 | 49.60 | 5.61 |
| 14* | −679.809 | Variable | | | 5.62 |
| 15(stop) | ∞ | 1.30 | | | 3.78 |
| 16* | 10.743 | 4.93 | 1.58913 | 61.14 | 4.37 |
| 17 | −78.051 | 0.10 | | | 4.38 |
| 18 | 28.041 | 2.77 | 1.84666 | 23.78 | 4.37 |
| 19 | 10.632 | 1.42 | | | 4.08 |
| 20 | 14.230 | 3.12 | 1.49700 | 81.54 | 4.33 |
| 21 | −36.985 | 0.64 | | | 4.38 |
| 22* | 84.991 | 1.36 | 1.53071 | 55.69 | 4.35 |
| 23* | 34.607 | Variable | | | 4.35 |
| 24 | 19.130 | 2.68 | 1.49700 | 81.54 | 4.78 |
| 25 | −119.090 | 0.01 | 1.51400 | 42.83 | 4.65 |
| 26 | −119.090 | 0.82 | 1.80400 | 46.57 | 4.65 |
| 27 | 76.031 | Variable | | | 4.60 |
| 28* | 147.374 | 1.63 | 1.53071 | 55.69 | 4.12 |
| 29* | −67.939 | 1.09 | | | 4.04 |
| 30 | ∞ | 4.00 | 1.51680 | 64.20 | 3.99 |
| 31 | ∞ | 1.08 | | | 3.84 |
| Image plane | ∞ | | | | |

Aspherical surface data

2nd surface

K = 0.000, A2 = 0.0000E+00, A4 = 1.71539e−05, A6 = −1.44664e−07, A8 = 3.88441e−10, A10 = −2.90297e−13
14th surface K = 0.000, A2 = 0.0000E+00, A4 = −9.39251e−05, A6 = −3.55374e−07, A8 = 3.55597e−09, A10 = −5.33578e−10
16th surface K = 0.000, A2 = 0.0000E+00, A4 = −8.77784e−05, A6 = −1.01116e−06, A8 = 5.64180e−08, A10 = −2.23368e−09, A12 = 3.59187e−11
22nd surface K = 0.000, A2 = 0.0000E+00, A4 = −2.17277e−04, A6 = 5.36299e−06, A8 = −5.28517e−07, A10 = 1.10330e−08, A12 = −1.37250e−10

-continued

Unit mm

23rd surface

K = 0.000, A2 = 0.0000E+00, A4 = −1.09771e−04, A6 = 5.91402e−06, A8 = −5.09130e−07, A10 = 8.38419e−09, A12 = −4.36735e−11
28th surface K = 0.000, A2 = 0.0000E+00, A4 = 8.15873e−04, A6 = 4.82675e−06, A8 = −2.20386e−06, A10 = 4.10510e−08
29th surface K = 0.000, A2 = 0.0000E+00, A4 = 1.26016e−03, A6 = 1.60282e−05, A8 = −3.90922e−06, A10 = 7.56282e−08

Various data
Zoom ratio 19.84

| | Wide angle | Intermediate | Telephoto |
|---|---|---|---|
| Focal length | 4.69 | 20.70 | 92.99 |
| Fno. | 2.82 | 4.67 | 4.73 |
| Angle of field 2ω | 77.97 | 19.19 | 4.31 |
| Image height | 3.6 | 3.6 | 3.6 |
| Lens total length | 85.01 | 104.03 | 120.31 |
| BF | 4.80 | 4.64 | 4.78 |
| d6 | 1.00 | 16.57 | 37.69 |
| d14 | 25.76 | 8.10 | 2.30 |
| d23 | 1.01 | 15.25 | 17.36 |
| d27 | 6.12 | 13.16 | 11.85 |
| Entrance pupil position | 19.87 | 56.67 | 308.19 |
| Exit pupil position A | −30.98 | −142.81 | −170.36 |
| Exit pupil position B | −35.78 | −147.44 | −175.15 |
| Front side principal point position | 23.95 | 74.46 | 351.81 |
| Back side principal point position | −3.61 | −19.79 | −91.93 |

Single lens data

| Lens | Initial surface | Focal length |
|---|---|---|
| L1 | 1 | 100.18 |
| L2 | 2 | −50.93 |
| L3 | 3 | 66.76 |
| L4 | 5 | 79.29 |
| L5 | 7 | −9.19 |
| L6 | 9 | −11.00 |
| L7 | 10 | 8.81E+04 |
| L8 | 11 | 8.95 |
| L9 | 13 | −17.98 |
| L10 | 16 | 16.37 |
| L11 | 18 | −21.82 |
| L12 | 20 | 21.10 |
| L13 | 22 | −111.04 |
| L14 | 24 | 33.38 |
| L15 | 25 | 8.13E+06 |
| L16 | 26 | −57.61 |
| L17 | 28 | 87.85 |

Zoom lens group data

| Group | Initial surface | Focal length | Lens structure length | Front side principal point position | Back side principal point position |
|---|---|---|---|---|---|
| 1 | 1 | 56.9801 | 12.0287 | 3.0855 | −4.6406 |
| 2 | 7 | −6.8221 | 13.5160 | 1.6684 | −7.4301 |
| 3 | 15 | 17.5589 | 15.6380 | 1.2893 | −9.7489 |
| 4 | 24 | 73.7783 | 3.5080 | −2.0985 | −4.2304 |
| 5 | 28 | 87.8520 | 6.7160 | 0.7294 | −4.0624 |

| Group | Initial surbace | wide angle Magnification | Intermediate Magnification | Telephoto Magnification |
|---|---|---|---|---|
| 1 | 1 | 0.0000 | 0.0000 | 0.0000 |
| 2 | 7 | −0.1592 | −0.2501 | −1.1084 |
| 3 | 15 | −0.7071 | −2.2550 | −2.2385 |

-continued

Unit mm

| | | | | |
|---|---|---|---|---|
| 4 | 24 | 0.7759 | 0.6830 | 0.6984 |
| 5 | 28 | 0.9415 | 0.9434 | 0.9417 |

Example 5

Unit mm

Surface data

| Surface no. | r | d | nd | vd | effective radius |
|---|---|---|---|---|---|
| Object plane | ∞ | ∞ | | | |
| 1 | 56.630 | 2.83 | 1.63387 | 23.38 | 17.50 |
| 2 | 298.104 | 0.80 | 1.79925 | 24.62 | 17.16 |
| 3 | 34.531 | 4.75 | 1.49700 | 81.54 | 15.09 |
| 4 | −447067.860 | 0.10 | | | 14.70 |
| 5 | 39.860 | 2.89 | 1.77250 | 49.60 | 14.21 |
| 6 | 155.536 | Variable | | | 14.00 |
| 7 | 63.326 | 1.10 | 1.88300 | 40.76 | 8.89 |
| 8 | 7.209 | 4.79 | | | 6.20 |
| 9 | −46.254 | 0.80 | 1.88300 | 40.76 | 6.13 |
| 10 | 12.396 | 0.01 | 1.51400 | 42.83 | 6.18 |
| 11 | 12.396 | 4.87 | 1.78472 | 25.68 | 6.18 |
| 12 | −13.411 | 1.15 | | | 6.26 |
| 13 | −13.602 | 0.80 | 1.77250 | 49.60 | 5.71 |
| 14* | −273.552 | Variable | | | 5.74 |
| 15(stop) | ∞ | 1.30 | | | 3.69 |
| 16* | 10.743 | 4.93 | 1.58913 | 61.14 | 4.26 |
| 17 | −78.051 | 0.10 | | | 4.28 |
| 18 | 28.041 | 2.77 | 1.84666 | 23.78 | 4.26 |
| 19 | 10.632 | 1.42 | | | 3.99 |
| 20 | 14.230 | 3.12 | 1.49700 | 81.54 | 4.24 |
| 21 | −36.985 | 0.64 | | | 4.29 |
| 22* | 100.866 | 1.36 | 1.53071 | 55.69 | 4.26 |
| 23* | 34.607 | Variable | | | 4.26 |
| 24 | 19.130 | 2.68 | 1.49700 | 81.54 | 4.69 |
| 25 | −119.090 | 0.01 | 1.51400 | 42.83 | 4.56 |
| 26 | −119.090 | 0.82 | 1.80400 | 46.57 | 4.56 |
| 27 | 76.031 | Variable | | | 4.52 |
| 28* | 147.374 | 1.63 | 1.53071 | 55.69 | 4.10 |
| 29* | −67.939 | 1.09 | | | 4.02 |
| 30 | ∞ | 4.00 | 1.51680 | 64.20 | 3.97 |
| 31 | ∞ | 1.05 | | | 3.82 |
| Image plane | ∞ | | | | |

Aspherical surface data

14th surface

K = 0.000, A2 = 0.0000E+00, A4 = −9.45425e−05, A6 = −1.51413e−07, A8 = −6.28601e−09, A10 = −4.02005e−10

16th surface

K = 0.000, A2 = 0.0000E+00, A4 = −8.77784e−05, A6 = −1.01116e−06, A8 = 5.64180e−08, A10 = −2.23368e−09, A12 = 3.59187e−11

22nd surface

K = 0.000, A2 = 0.0000E+00, A4 = −2.17277e−04, A6 = 5.36299e−06, A8 = −5.28517e−07, A10 = 1.10330e−08, A12 = −1.37250e−10

23rd surface

K = 0.000, A2 = 0.0000E+00, A4 = −1.09771e−04, A6 = 5.91402e−06, A8 = −5.09130e−07, A10 = 8.38419e−09, A12 = −4.36735e−11

28th surface

K = 0.000, A2 = 0.0000E+00, A4 = 8.15873e−04, A6 = 4.82675e−06, A8 = −2.20386e−06, A10 = 4.10510e−08

29th surface

K = 0.000, A2 = 0.0000E+00, A4 = 1.26016e−03, A6 = 1.60282e−05, A8 = −3.90922e−06, A10 = 7.56282e−08

-continued

Unit mm

Various data
Zoom ratio 19.96

| | Wide angle | Intermediate | Telephoto |
|---|---|---|---|
| Focal length | 4.67 | 20.76 | 93.11 |
| Fno. | 2.89 | 4.80 | 4.89 |
| Angle of field 2ω | 78.35 | 19.14 | 4.31 |
| Image height | 3.6 | 3.6 | 3.6 |
| Lens total length | 85.03 | 103.83 | 120.66 |
| BF | 4.78 | 4.68 | 4.78 |
| d6 | 1.00 | 17.03 | 38.77 |
| d14 | 26.53 | 8.22 | 2.30 |
| d23 | 1.00 | 15.63 | 18.45 |
| d27 | 6.07 | 12.63 | 10.70 |
| Entrance pupil position | 19.13 | 55.90 | 306.21 |
| Exit pupil position A | −30.60 | −143.26 | −182.08 |
| Exit pupil position B | −35.38 | −147.94 | −186.86 |
| Front side principal point position | 23.18 | 73.74 | 352.92 |
| Back side principal point position | −3.62 | −19.80 | −92.05 |

Single lens data

| Lens | Initial surface | Focal length |
|---|---|---|
| L1 | 1 | 109.79 |
| L2 | 2 | −48.93 |
| L3 | 3 | 69.47 |
| L4 | 5 | 68.63 |
| L5 | 7 | −9.30 |
| L6 | 9 | −11.00 |
| L7 | 10 | 8.81E+04 |
| L8 | 11 | 8.95 |
| L9 | 13 | −18.55 |
| L10 | 16 | 16.37 |
| L11 | 18 | −21.82 |
| L12 | 20 | 21.10 |
| L13 | 22 | −99.98 |
| L14 | 24 | 33.38 |
| L15 | 25 | 8.13E+06 |
| L16 | 26 | −57.61 |
| L17 | 28 | 87.85 |

Zoom lens group data

| Group | Initial surface | Focal length | Lens structure length | Front side principal point position | Back side principal point position |
|---|---|---|---|---|---|
| 1 | 1 | 57.8500 | 11.3643 | 3.1203 | −4.0917 |
| 2 | 7 | −7.0617 | 13.5160 | 1.5973 | −7.5997 |
| 3 | 15 | 17.7143 | 15.6380 | 1.1306 | −9.8274 |
| 4 | 24 | 73.7783 | 3.5080 | −2.0985 | −4.2304 |
| 5 | 28 | 87.8520 | 6.7160 | 0.7294 | −4.0624 |

| Group | Initial surbace | wide angle Magnification | Intermediate Magnification | Telephoto Magnification |
|---|---|---|---|---|
| 1 | 1 | 0.0000 | 0.0000 | 0.0000 |
| 2 | 7 | −0.1601 | −0.2516 | −1.1152 |
| 3 | 15 | −0.6883 | −2.1939 | −2.1464 |
| 4 | 24 | 0.7770 | 0.6895 | 0.7140 |
| 5 | 28 | 0.9418 | 0.9429 | 0.9417 |

Example 6

Unit mm

Surface data

| Surface no. | r | d | nd | vd | effective radius |
|---|---|---|---|---|---|
| Object plane | ∞ | ∞ | | | |
| 1 | 63.000 | 4.05 | 1.67000 | 20.00 | 18.00 |
| 2* | 5631.149 | 0.51 | 1.63493 | 23.90 | 18.00 |
| 3 | 26.252 | 5.76 | 1.48749 | 70.23 | 14.83 |
| 4 | 116851.672 | 0.10 | | | 14.70 |
| 5 | 33.144 | 2.85 | 1.72916 | 54.68 | 14.22 |
| 6 | 82.679 | Variable | | | 14.00 |
| 7 | 72.007 | 1.10 | 1.88300 | 40.76 | 8.49 |
| 8 | 7.228 | 4.79 | | | 6.02 |
| 9 | −46.254 | 0.80 | 1.88300 | 40.76 | 5.85 |
| 10 | 12.396 | 0.01 | 1.51400 | 42.83 | 5.82 |
| 11 | 12.396 | 4.87 | 1.78472 | 25.68 | 5.82 |
| 12 | −13.411 | 1.15 | | | 5.86 |
| 13 | −13.602 | 0.80 | 1.77250 | 49.60 | 5.25 |
| 14* | −679.809 | Variable | | | 5.21 |
| 15(stop) | ∞ | 1.30 | | | 3.78 |
| 16* | 10.743 | 4.93 | 1.58913 | 61.14 | 4.56 |
| 17 | −78.051 | 0.10 | | | 4.55 |
| 18 | 28.041 | 2.77 | 1.84666 | 23.78 | 4.52 |
| 19 | 10.632 | 1.42 | | | 4.20 |
| 20 | 14.230 | 3.12 | 1.49700 | 81.54 | 4.45 |
| 21 | −36.985 | 0.64 | | | 4.48 |
| 22* | 99.753 | 1.36 | 1.53071 | 55.69 | 4.44 |
| 23* | 34.607 | Variable | | | 4.44 |
| 24 | 19.130 | 2.68 | 1.49700 | 81.54 | 4.75 |
| 25 | −119.090 | 0.01 | 1.51400 | 42.83 | 4.62 |
| 26 | −119.090 | 0.82 | 1.80400 | 46.57 | 4.62 |
| 27 | 76.031 | Variable | | | 4.58 |
| 28* | 147.374 | 1.63 | 1.53071 | 55.69 | 4.11 |
| 29* | −67.939 | 1.09 | | | 4.04 |
| 30 | ∞ | 4.00 | 1.51680 | 64.20 | 3.99 |
| 31 | ∞ | 1.55 | | | 3.86 |
| Image plane | ∞ | | | | |

Aspherical surface data

2nd surface

K = 0.000, A2 = 0.0000E+00, A4 = −6.83931e−06, A6 = −3.93410e−10, A8 = −1.85984e−11, A10 = 3.49310e−14
14th surface K = 0.000, A2 = 0.0000E+00, A4 = −9.39251e−05, A6 = −3.55374e−07, A8 = 3.55597e−09, A10 = −5.33578e−10
16th surface K = 0.000, A2 = 0.0000E+00, A4 = −8.77784e−05, A6 = −1.01116e−06, A8 = 5.64180e−08, A10 = −2.23368e−09, A12 = 3.59187e−11
22nd surface K = 0.000, A2 = 0.0000E+00, A4 = −2.17277e−04, A6 = 5.36299e−06, A8 = −5.28517e−07, A10 = 1.10330e−08, A12 = −1.37250e−10
23rd surface K = 0.000, A2 = 0.0000E+00, A4 = −1.09771e−04, A6 = 5.91402e−06, A8 = −5.09130e−07, A10 = 8.38419e−09, A12 = −4.36735e−11
28th surface K = 0.000, A2 = 0.0000E+00, A4 = 8.15873e−04, A6 = 4.82675e−06, A8 = −2.20386e−06, A10 = 4.10510e−08
29th surface K = 0.000, A2 = 0.0000E+00, A4 = 1.26016e−03, A6 = 1.60282e−05, A8 = −3.90922e−06, A10 = 7.56282e−08

Unit mm

Various data
Zoom ratio 19.32

| | Wide angle | Intermediate | Telephoto |
|---|---|---|---|
| Focal length | 4.81 | 20.70 | 93.03 |
| Fno. | 2.84 | 4.70 | 4.68 |
| Angle of field 2ω | 75.93 | 19.26 | 4.33 |
| Image height | 3.6 | 3.6 | 3.6 |
| Lens total length | 86.54 | 104.76 | 118.62 |
| BF | 5.27 | 4.61 | 4.67 |
| d6 | 1.00 | 15.61 | 35.93 |
| d14 | 25.84 | 8.55 | 2.30 |
| d23 | 1.15 | 15.54 | 15.12 |
| d27 | 5.73 | 12.89 | 13.04 |
| Entrance pupil position | 21.15 | 56.79 | 304.35 |
| Exit pupil position A | −30.36 | −143.87 | −138.53 |
| Exit pupil position B | −35.63 | −148.49 | −143.20 |
| Front side principal point position | 25.31 | 74.60 | 336.94 |
| Back side principal point position | −3.27 | −19.81 | −92.08 |

Single lens data

| Lens | Initial surface | Focal length |
|---|---|---|
| L1 | 1 | 95.07 |
| L2 | 2 | −41.54 |
| L3 | 3 | 53.86 |
| L4 | 5 | 74.07 |
| L5 | 7 | −9.17 |
| L6 | 9 | −11.00 |
| L7 | 10 | 8.81E+04 |
| L8 | 11 | 8.95 |
| L9 | 13 | −17.98 |
| L10 | 16 | 16.37 |
| L11 | 18 | −21.82 |
| L12 | 20 | 21.10 |
| L13 | 22 | −100.58 |
| L14 | 24 | 33.38 |
| L15 | 25 | 8.13E+06 |
| L16 | 26 | −57.61 |
| L17 | 28 | 87.85 |

Zoom lens group data

| Group | Initial surface | Focal length | Lens structure length | Front side principal point position | Back side principal point position |
|---|---|---|---|---|---|
| 1 | 1 | 55.3191 | 13.2710 | 3.3877 | −5.1255 |
| 2 | 7 | −6.8103 | 13.5160 | 1.6645 | −7.4331 |
| 3 | 15 | 17.7050 | 15.6380 | 1.1401 | −9.8226 |
| 4 | 24 | 73.7783 | 3.5080 | −2.0985 | −4.2304 |
| 5 | 28 | 87.8520 | 6.7160 | 0.7294 | −4.0624 |

| Group | Initial surbace | wide angle Magnification | Intermediate Magnification | Telephoto Magnification |
|---|---|---|---|---|
| 1 | 1 | 0.0000 | 0.0000 | 0.0000 |
| 2 | 7 | −0.1673 | −0.2608 | −1.1771 |
| 3 | 15 | −0.7181 | −2.2131 | −2.2145 |
| 4 | 24 | 0.7740 | 0.6870 | 0.6841 |
| 5 | 28 | 0.9362 | 0.9436 | 0.9430 |

Example 7

Unit mm

Surface data

| Surface no. | r | d | nd | vd | effective radius |
|---|---|---|---|---|---|
| Object plane | ∞ | ∞ | | | |
| 1 | 64.493 | 2.67 | 1.63336 | 23.36 | 18.00 |
| 2* | 7553.573 | 0.89 | 1.63493 | 23.90 | 17.04 |
| 3 | 32.095 | 4.70 | 1.48749 | 70.23 | 15.18 |
| 4 | 88340.187 | 0.10 | | | 14.70 |
| 5 | 36.513 | 2.71 | 1.72916 | 54.68 | 14.22 |
| 6 | 98.569 | Variable | | | 14.00 |
| 7 | 56.969 | 1.10 | 1.88300 | 40.76 | 8.92 |
| 8 | 7.154 | 4.79 | | | 6.16 |
| 9 | −46.254 | 0.80 | 1.88300 | 40.76 | 6.07 |
| 10 | 12.396 | 0.01 | 1.51400 | 42.83 | 6.10 |
| 11 | 12.396 | 4.87 | 1.78472 | 25.68 | 6.10 |
| 12 | −13.411 | 1.15 | | | 6.18 |
| 13 | −13.602 | 0.80 | 1.77250 | 49.60 | 5.61 |
| 14* | −679.809 | Variable | | | 5.63 |
| 15(stop) | ∞ | 1.30 | | | 3.78 |
| 16* | 10.743 | 4.93 | 1.58913 | 61.14 | 4.36 |
| 17 | −78.051 | 0.10 | | | 4.37 |
| 18 | 28.041 | 2.77 | 1.84666 | 23.78 | 4.35 |
| 19 | 10.632 | 1.42 | | | 4.06 |
| 20 | 14.230 | 3.12 | 1.49700 | 81.54 | 4.31 |
| 21 | −36.985 | 0.64 | | | 4.35 |
| 22* | 108.705 | 1.36 | 1.53071 | 55.69 | 4.32 |
| 23* | 34.607 | Variable | | | 4.32 |
| 24 | 19.130 | 2.68 | 1.49700 | 81.54 | 4.76 |
| 25 | −119.090 | 0.01 | 1.51400 | 42.83 | 4.64 |
| 26 | −119.090 | 0.82 | 1.80400 | 46.57 | 4.63 |
| 27 | 76.031 | Variable | | | 4.59 |
| 28* | 147.374 | 1.63 | 1.53071 | 55.69 | 4.11 |
| 29* | −67.939 | 1.09 | | | 4.03 |
| 30 | ∞ | 4.00 | 1.51680 | 64.20 | 3.97 |
| 31 | ∞ | 0.97 | | | 3.83 |
| Image plane | ∞ | | | | |

Aspherical surface data

2nd surface

K = 0.000, A2 = 0.0000E+00, A4 = 5.27314e−05, A6 = −3.41835e−07, A8 = 1.42488e−09, A10 = −2.27996e−12
14th surface K = 0.000, A2 = 0.0000E+00, A4 = −9.39251e−05, A6 = −3.55374e−07, A8 = 3.55597e−09, A10 = −5.33578e−10
16th surface K = 0.000, A2 = 0.0000E+00, A4 = −8.77784e−05, A6 = −1.01116e−06, A8 = 5.64180e−08, A10 = −2.23368e−09, A12 = 3.59187e−11
22nd surface K = 0.000, A2 = 0.0000E+00, A4 = −2.17277e−04, A6 = 5.36299e−06, A8 = −5.28517e−07, A10 = 1.10330e−08, A12 = −1.37250e−10
23rd surface K = 0.000, A2 = 0.0000E+00, A4 = −1.09771e−04, A6 = 5.91402e−06, A8 = −5.09130e−07, A10 = 8.38419e−09, A12 = −4.36735e−11
28th surface K = 0.000, A2 = 0.0000E+00, A4 = 8.15873e−04, A6 = 4.82675e−06, A8 = −2.20386e−06, A10 = 4.10510e−08
29th surface K = 0.000, A2 = 0.0000E+00, A4 = 1.26016e−03, A6 = 1.60282e−05, A8 = −3.90922e−06, A10 = 7.56282e−08

Unit mm

Various data
Zoom ratio 19.48

| | Wide angle | Intermediate | Telephoto |
|---|---|---|---|
| Focal length | 4.76 | 20.52 | 92.80 |
| Fno. | 2.87 | 4.74 | 4.83 |
| Angle of field 2ω | 76.91 | 19.40 | 4.33 |
| Image height | 3.6 | 3.6 | 3.6 |
| Lens total length | 84.81 | 103.38 | 119.48 |
| BF | 4.69 | 4.55 | 4.68 |
| d6 | 1.00 | 16.08 | 37.21 |
| d14 | 26.32 | 8.64 | 2.30 |
| d23 | 1.03 | 15.79 | 16.06 |
| d27 | 6.41 | 12.96 | 13.86 |
| Entrance pupil position | 19.31 | 54.37 | 293.31 |
| Exit pupil position A | −31.18 | −147.53 | −158.87 |
| Exit pupil position B | −35.88 | −152.08 | −163.55 |
| Front side principal point position | 23.44 | 72.13 | 333.45 |
| Back side principal point position | −3.80 | −19.70 | −91.85 |

Single lens data

| Lens | Initial surface | Focal length |
|---|---|---|
| L1 | 1 | 102.69 |
| L2 | 2 | −50.77 |
| L3 | 3 | 65.86 |
| L4 | 5 | 78.10 |
| L5 | 7 | −9.36 |
| L6 | 9 | −11.00 |
| L7 | 10 | 8.81E+04 |
| L8 | 11 | 8.95 |
| L9 | 13 | −17.98 |
| L10 | 16 | 16.37 |
| L11 | 18 | −21.82 |
| L12 | 20 | 21.10 |
| L13 | 22 | −96.28 |
| L14 | 24 | 33.38 |
| L15 | 25 | 8.13E+06 |
| L16 | 26 | −57.61 |
| L17 | 28 | 87.85 |

Zoom lens group data

| Group | Initial surface | Focal length | Lens structure length | Front side principal point position | Back side principal point position |
|---|---|---|---|---|---|
| 1 | 1 | 56.5316 | 11.0783 | 2.7317 | −4.3672 |
| 2 | 7 | −6.9326 | 13.5160 | 1.7002 | −7.4050 |
| 3 | 15 | 17.7750 | 15.6380 | 1.0686 | −9.8581 |
| 4 | 24 | 73.7783 | 3.5080 | −2.0985 | −4.2304 |
| 5 | 28 | 87.8520 | 6.7160 | 0.7294 | −4.0624 |

| Group | Initial surbace | wide angle Magnification | Intermediate Magnification | Telephoto Magnification |
|---|---|---|---|---|
| 1 | 1 | 0.0000 | 0.0000 | 0.0000 |
| 2 | 7 | −0.1630 | −0.2525 | −1.0972 |
| 3 | 15 | −0.7087 | −2.2160 | −2.3581 |
| 4 | 24 | 0.7736 | 0.6870 | 0.6728 |
| 5 | 28 | 0.9428 | 0.9444 | 0.9429 |

Example 8

Unit mm

Surface data

| Surface no. | r | d | nd | vd | effective radius |
|---|---|---|---|---|---|
| Object plane | ∞ | ∞ | | | |
| 1 | 67.500 | 3.96 | 1.63336 | 23.36 | 18.00 |
| 2 | 101516.956 | 0.54 | 1.63493 | 23.90 | 21.18 |
| 3 | 28.679 | 7.15 | 1.48749 | 70.23 | 17.35 |
| 4 | 37324.563 | 0.10 | | | 14.70 |
| 5 | 32.403 | 3.53 | 1.69680 | 55.53 | 14.27 |
| 6 | 118.748 | Variable | | | 14.00 |
| 7 | 76.016 | 1.10 | 1.88300 | 40.76 | 9.32 |
| 8 | 7.277 | 4.79 | | | 6.31 |
| 9 | −46.254 | 0.80 | 1.88300 | 40.76 | 6.20 |
| 10 | 12.396 | 0.01 | 1.51400 | 42.83 | 6.14 |
| 11 | 12.396 | 4.87 | 1.78472 | 25.68 | 6.15 |
| 12 | −13.411 | 1.15 | | | 6.16 |
| 13 | −13.602 | 0.80 | 1.77250 | 49.60 | 5.42 |
| 14* | −679.809 | Variable | | | 5.40 |
| 15(stop) | ∞ | 1.30 | | | 3.78 |
| 16* | 10.743 | 4.93 | 1.58913 | 61.14 | 4.54 |
| 17 | −78.051 | 0.10 | | | 4.51 |
| 18 | 28.041 | 2.77 | 1.84666 | 23.78 | 4.48 |
| 19 | 10.632 | 1.42 | | | 4.15 |
| 20 | 14.230 | 3.12 | 1.49700 | 81.54 | 4.39 |
| 21 | −36.985 | 0.64 | | | 4.40 |
| 22* | 102.800 | 1.36 | 1.53071 | 55.69 | 4.36 |
| 23* | 34.607 | Variable | | | 4.35 |
| 24 | 19.130 | 2.68 | 1.49700 | 81.54 | 4.82 |
| 25 | −119.090 | 0.01 | 1.51400 | 42.83 | 4.68 |
| 26 | −119.090 | 0.82 | 1.80400 | 46.57 | 4.68 |
| 27 | 76.031 | Variable | | | 4.63 |
| 28* | 147.374 | 1.63 | 1.53071 | 55.69 | 4.12 |
| 29* | −67.939 | 1.09 | | | 4.04 |
| 30 | ∞ | 4.00 | 1.51680 | 64.20 | 3.98 |
| 31 | ∞ | 1.00 | | | 3.83 |
| Image plane | ∞ | | | | |

Aspherical surface data

14th surface

K = 0.000, A2 = 0.0000E+00, A4 = −9.39251e−05, A6 = −3.55374e−07, A8 = 3.55597e−09, A10 = −5.33578e−10

16th surface

K = 0.000, A2 = 0.0000E+00, A4 = −8.77784e−05, A6 = −1.01116e−06, A8 = 5.64180e−08, A10 = −2.23368e−09, A12 = 3.59187e−11

22nd surface

K = 0.000, A2 = 0.0000E+00, A4 = −2.17277e−04, A6 = 5.36299e−06, A8 = −5.28517e−07, A10 = 1.10330e−08, A12 = −1.37250e−10

23rd surface

K = 0.000, A2 = 0.0000E+00, A4 = −1.09771e−04, A6 = 5.91402e−06, A8 = −5.09130e−07, A10 = 8.38419e−09, A12 = −4.36735e−11

28th surface

K = 0.000, A2 = 0.0000E+00, A4 = 8.15873e−04, A6 = 4.82675e−06, A8 = −2.20386e−06, A10 = 4.10510e−08

29th surface

K = 0.000, A2 = 0.0000E+00, A4 = 1.26016e−03, A6 = 1.60282e−05, A8 = −3.90922e−06, A10 = 7.56282e−08

Various data
Zoom ratio 18.89

| | Wide angle | Intermediate | Telephoto |
|---|---|---|---|
| Focal length | 4.75 | 17.81 | 89.71 |
| Fno. | 2.82 | 4.67 | 5.09 |
| Angle of field 2ω | 76.25 | 22.33 | 4.48 |
| Image height | 3.6 | 3.6 | 3.6 |
| Lens total length | 89.56 | 101.38 | 120.93 |
| BF | 4.72 | 4.67 | 4.63 |
| d6 | 1.00 | 10.22 | 31.42 |
| d14 | 27.20 | 9.06 | 2.30 |
| d23 | 1.06 | 16.16 | 21.76 |
| d27 | 6.00 | 11.70 | 11.26 |
| Entrance pupil position | 23.12 | 42.83 | 245.09 |
| Exit pupil position A | −30.62 | −145.08 | −316.70 |
| Exit pupil position B | −35.34 | −149.75 | −321.32 |
| Front side principal point position | 27.23 | 58.52 | 309.75 |
| Back side principal point position | −3.75 | −16.87 | −88.81 |

Single lens data

| Lens | Initial surface | Focal length |
|---|---|---|
| L1 | 1 | 106.64 |
| L2 | 2 | −45.18 |
| L3 | 3 | 58.87 |
| L4 | 5 | 62.90 |
| L5 | 7 | −9.18 |
| L6 | 9 | −11.00 |
| L7 | 10 | 8.81E+04 |
| L8 | 11 | 8.95 |
| L9 | 13 | −17.98 |
| L10 | 16 | 16.37 |
| L11 | 18 | −21.82 |
| L12 | 20 | 21.10 |
| L13 | 22 | −98.99 |
| L14 | 24 | 33.38 |
| L15 | 25 | 8.13E+06 |
| L16 | 26 | −57.61 |
| L17 | 28 | 87.85 |

Zoom lens group data

| Group | Initial surface | Focal length | Lens structure length | Front side principal point position | Back side principal point position |
|---|---|---|---|---|---|
| 1 | 1 | 51.1194 | 15.2833 | 4.9231 | −5.0617 |
| 2 | 7 | −6.8163 | 13.5160 | 1.6622 | −7.4345 |
| 3 | 15 | 17.7301 | 15.6380 | 1.1144 | −9.8354 |
| 4 | 24 | 73.7783 | 3.5080 | −2.0985 | −4.2304 |
| 5 | 28 | 87.8520 | 6.7160 | 0.7294 | −4.0624 |

| Group | Initial surface | wide angle Magnification | Intermediate Magnification | Telephoto Magnification |
|---|---|---|---|---|
| 1 | 1 | 0.0000 | 0.0000 | 0.0000 |
| 2 | 7 | −0.1863 | −0.2491 | −1.1058 |
| 3 | 15 | −0.6793 | −2.1124 | −2.3726 |
| 4 | 24 | 0.7787 | 0.7022 | 0.7089 |
| 5 | 28 | 0.9424 | 0.9430 | 0.9435 |

Example 9

Unit mm

Surface data

| Surface no. | r | d | nd | vd | effective radius |
|---|---|---|---|---|---|
| Object plane | ∞ | ∞ | | | |
| 1 | 68.620 | 3.88 | 1.73000 | 15.00 | 19.00 |
| 2* | 382967.812 | 1.74 | 1.90680 | 21.15 | 19.79 |
| 3 | 32.479 | 5.68 | 1.51633 | 64.14 | 16.51 |

-continued

Unit mm

| | | | | | |
|---|---|---|---|---|---|
| 4 | 79583.766 | 0.10 | | | 14.70 |
| 5 | 30.248 | 4.16 | 1.63000 | 61.00 | 14.22 |
| 6 | 283.578 | Variable | | | 14.00 |
| 7 | 44.712 | 1.10 | 1.88300 | 40.76 | 9.09 |
| 8 | 7.275 | 4.79 | | | 6.30 |
| 9 | −46.254 | 0.80 | 1.88300 | 40.76 | 6.17 |
| 10 | 12.396 | 0.01 | 1.51400 | 42.83 | 6.09 |
| 11 | 12.396 | 4.87 | 1.78472 | 25.68 | 6.09 |
| 12 | −13.411 | 1.15 | | | 6.08 |
| 13 | −13.602 | 0.80 | 1.77250 | 49.60 | 5.46 |
| 14* | −679.809 | Variable | | | 5.48 |
| 15(stop) | ∞ | 1.30 | | | 3.78 |
| 16* | 10.743 | 4.93 | 1.58913 | 61.14 | 4.37 |
| 17 | −78.051 | 0.10 | | | 4.38 |
| 18 | 28.041 | 2.77 | 1.84666 | 23.78 | 4.36 |
| 19 | 10.632 | 1.42 | | | 4.08 |
| 20 | 14.230 | 3.12 | 1.49700 | 81.54 | 4.33 |
| 21 | −36.985 | 0.64 | | | 4.38 |
| 22* | 132.418 | 1.36 | 1.53071 | 55.69 | 4.35 |
| 23* | 34.607 | Variable | | | 4.36 |
| 24 | 19.130 | 2.68 | 1.49700 | 81.54 | 4.72 |
| 25 | −119.090 | 0.01 | 1.51400 | 42.83 | 4.60 |
| 26 | −119.090 | 0.82 | 1.80400 | 46.57 | 4.60 |
| 27 | 76.031 | Variable | | | 4.55 |
| 28* | 147.374 | 1.63 | 1.53071 | 55.69 | 4.12 |
| 29* | −67.939 | 1.09 | | | 4.04 |
| 30 | ∞ | 4.00 | 1.51680 | 64.20 | 3.98 |
| 31 | ∞ | 0.42 | | | 3.85 |
| Image plane | ∞ | | | | |

Aspherical surface data

2nd surface

K = 0.000, A2 = 0.0000E+00, A4 = −3.34714e−06, A6 = 8.25654e−09,
A8 = −3.82497e−11, A10 = 5.75333e−14
14th surface K = 0.000, A2 = 0.0000E+00, A4 = −9.39251e−05, A6 = −3.55374e−07,
A8 = 3.55597e−09, A10 = −5.33578e−10
16th surface K = 0.000, A2 = 0.0000E+00, A4 = −8.77784e−05, A6 = −1.01116e−06,
A8 = 5.64180e−08, A10 = −2.23368e−09, A12 = 3.59187e−11
22nd surface K = 0.000, A2 = 0.0000E+00, A4 = −2.17277e−04, A6 = 5.36299e−06,
A8 = −5.28517e−07, A10 = 1.10330e−08, A12 = −1.37250e−10
23rd surface K = 0.000, A2 = 0.0000E+00, A4 = −1.09771e−04, A6 = 5.91402e−06,
A8 = −5.09130e−07, A10 = 8.38419e−09, A12 = −4.36735e−11
28th surface K = 0.000, A2 = 0.0000E+00, A4 = 8.15873e−04, A6 = 4.82675e−06,
A8 = −2.20386e−06, A10 = 4.10510e−08
29th surface K = 0.000, A2 = 0.0000E+00, A4 = 1.26016e−03, A6 = 1.60282e−05,
A8 = −3.90922e−06, A10 = 7.56282e−08

Various data
Zoom ratio 18.51

| | Wide angle | Intermediate | Telephoto |
|---|---|---|---|
| Focal length | 4.81 | 20.87 | 88.96 |
| Fno. | 2.87 | 4.60 | 4.63 |
| Angle of field 2ω | 76.07 | 19.26 | 4.60 |
| Image height | 3.6 | 3.6 | 3.6 |
| Lens total length | 91.13 | 105.74 | 121.48 |
| BF | 4.15 | 4.63 | 4.51 |
| d6 | 1.00 | 16.43 | 37.86 |
| d14 | 28.28 | 8.48 | 2.30 |
| d23 | 1.63 | 11.11 | 11.77 |
| d27 | 6.21 | 15.23 | 15.18 |
| Entrance pupil position | 22.73 | 58.50 | 292.15 |
| Exit pupil position A | −32.10 | −103.63 | −109.46 |
| Exit pupil position B | −36.25 | −108.26 | −113.96 |
| Front side principal point position | 26.90 | 75.35 | 311.66 |
| Back side principal point position | −4.38 | −19.97 | −88.18 |

Single lens data

| Lens | Initial surface | Focal length |
|---|---|---|
| L1 | 1 | 94.02 |
| L2 | 2 | −35.82 |
| L3 | 3 | 62.93 |
| L4 | 5 | 53.41 |
| L5 | 7 | −9.98 |
| L6 | 9 | −11.00 |
| L7 | 10 | 8.81E+04 |
| L8 | 11 | 8.95 |
| L9 | 13 | −17.98 |
| L10 | 16 | 16.37 |
| L11 | 18 | −21.82 |
| L12 | 20 | 21.10 |
| L13 | 22 | −88.71 |
| L14 | 24 | 33.38 |
| L15 | 25 | 8.13E+06 |
| L16 | 26 | −57.61 |
| L17 | 28 | 87.85 |

Zoom lens group data

| Group | Initial surface | Focal length | Lens structure length | Front side principal point position | Back side principal point position |
|---|---|---|---|---|---|
| 1 | 1 | 58.2249 | 15.5680 | 5.2410 | −4.5934 |
| 2 | 7 | −7.3193 | 13.5160 | 1.7850 | −7.3358 |
| 3 | 15 | 17.9166 | 15.6380 | 0.9240 | −9.9296 |
| 4 | 24 | 73.7783 | 3.5080 | −2.0985 | −4.2304 |
| 5 | 28 | 87.8520 | 6.7160 | 0.7294 | −4.0624 |

| Group | Initial surbace | wide angle Magnification | Intermediate Magnification | Telephoto Magnification |
|---|---|---|---|---|
| 1 | 1 | 0.0000 | 0.0000 | 0.0000 |
| 2 | 7 | −0.1682 | −0.2605 | −1.0985 |
| 3 | 15 | −0.6594 | −2.2259 | −2.2388 |
| 4 | 24 | 0.7845 | 0.6550 | 0.6575 |
| 5 | 28 | 0.9489 | 0.9435 | 0.9449 |

Example 10

Unit mm

Surface data

| Surface no. | r | d | nd | vd | effective radius |
|---|---|---|---|---|---|
| Object plane | ∞ | ∞ | | | |
| 1 | 130.000 | 2.30 | 1.69952 | 16.99 | 18.00 |
| 2* | 354526.768 | 1.67 | 1.94595 | 17.98 | 18.87 |
| 3 | 87.187 | 2.68 | 1.49700 | 81.54 | 17.28 |
| 4 | 49777.504 | 0.10 | | | 15.50 |
| 5 | 31.463 | 4.50 | 1.49700 | 81.54 | 14.24 |
| 6 | 3317.228 | Variable | | | 14.00 |
| 7 | 34.377 | 1.10 | 1.88300 | 40.76 | 9.29 |
| 8 | 7.351 | 4.79 | | | 6.47 |
| 9 | −46.254 | 0.80 | 1.88300 | 40.76 | 6.39 |
| 10 | 12.396 | 0.01 | 1.51400 | 42.83 | 6.32 |
| 11 | 12.396 | 4.87 | 1.78472 | 25.68 | 6.32 |
| 12 | −13.411 | 1.15 | | | 6.33 |

-continued

Unit mm

| | | | | | |
|---|---|---|---|---|---|
| 13 | −13.602 | 0.80 | 1.77250 | 49.60 | 5.74 |
| 14* | −679.809 | Variable | | | 5.78 |
| 15(stop) | ∞ | 1.30 | | | 3.78 |
| 16* | 10.743 | 4.93 | 1.58913 | 61.14 | 4.35 |
| 17 | −78.051 | 0.10 | | | 4.34 |
| 18 | 28.041 | 2.77 | 1.84666 | 23.78 | 4.32 |
| 19 | 10.632 | 1.42 | | | 4.03 |
| 20 | 14.230 | 3.12 | 1.49700 | 81.54 | 4.27 |
| 21 | −36.985 | 0.64 | | | 4.30 |
| 22* | 494.568 | 1.36 | 1.53071 | 55.69 | 4.27 |
| 23* | 34.607 | Variable | | | 4.28 |
| 24 | 19.130 | 2.68 | 1.49700 | 81.54 | 4.60 |
| 25 | −119.090 | 0.01 | 1.51400 | 42.83 | 4.48 |
| 26 | −119.090 | 0.82 | 1.80400 | 46.57 | 4.48 |
| 27 | 76.031 | Variable | | | 4.44 |
| 28* | 147.374 | 1.63 | 1.53071 | 55.69 | 4.08 |
| 29* | −67.939 | 1.09 | | | 4.01 |
| 30 | ∞ | 4.00 | 1.51680 | 64.20 | 3.95 |
| 31 | ∞ | 0.92 | | | 3.82 |
| Image plane | ∞ | | | | |

Aspherical surface data

2nd surface

K = 0.000, A2 = 0.0000E+00, A4 = −4.50349e−06, A6 = 7.08700e−09, A8 = −4.13522e−11, A10 = 6.88703e−14

14th surface

K = 0.000, A2 = 0.0000E+00, A4 = −9.39251e−05, A6 = −3.55374e−07, A8 = 3.55597e−09, A10 = −5.33578e−10

16th surface

K = 0.000, A2 = 0.0000E+00, A4 = −8.77784e−05, A6 = −1.01116e−06, A8 = 5.64180e−08, A10 = −2.23368e−09, A12 = 3.59187e−11

22nd surface

K = 0.000, A2 = 0.0000E+00, A4 = −2.17277e−04, A6 = 5.36299e−06, A8 = −5.28517e−07, A10 = 1.10330e−08, A12 = −1.37250e−10

23rd surface

K = 0.000, A2 = 0.0000E+00, A4 = −1.09771e−04, A6 = 5.91402e−06, A8 = −5.09130e−07, A10 = 8.38419e−09, A12 = −4.36735e−11

28th surface

K = 0.000, A2 = 0.0000E+00, A4 = 8.15873e−04, A6 = 4.82675e−06, A8 = −2.20386e−06, A10 = 4.10510e−08

29th surface

K = 0.000, A2 = 0.0000E+00, A4 = 1.26016e−03, A6 = 1.60282e−05, A8 = −3.90922e−06, A10 = 7.56282e−08

Various data
Zoom ratio 18.28

| | Wide angle | Intermediate | Telephoto |
|---|---|---|---|
| Focal length | 4.70 | 20.22 | 86.02 |
| Fno. | 2.89 | 4.60 | 4.96 |
| Angle of field 2ω | 77.76 | 19.95 | 4.75 |
| Image height | 3.6 | 3.6 | 3.6 |
| Lens total length | 89.00 | 104.27 | 121.44 |
| BF | 4.65 | 4.63 | 4.75 |
| d6 | 1.00 | 18.69 | 41.10 |
| d14 | 30.79 | 10.15 | 2.30 |
| d23 | 0.85 | 11.33 | 5.33 |
| d27 | 6.17 | 13.93 | 22.43 |
| Entrance pupil position | 20.03 | 59.54 | 265.35 |
| Exit pupil position A | −29.43 | −97.04 | −90.20 |
| Exit pupil position B | −34.08 | −101.67 | −94.95 |
| Front side principal point position | 24.09 | 75.73 | 273.44 |
| Back side principal point position | −3.78 | −19.31 | −85.00 |

-continued

Unit mm

Single lens data

| Lens | Initial surface | Focal length |
|---|---|---|
| L1 | 1 | 185.91 |
| L2 | 2 | −92.19 |
| L3 | 3 | 175.73 |
| L4 | 5 | 63.88 |
| L5 | 7 | −10.79 |
| L6 | 9 | −11.00 |
| L7 | 10 | 8.81E+04 |
| L8 | 11 | 8.95 |
| L9 | 13 | −17.98 |
| L10 | 16 | 16.37 |
| L11 | 18 | −21.82 |
| L12 | 20 | 21.10 |
| L13 | 22 | −70.19 |
| L14 | 24 | 33.38 |
| L15 | 25 | 8.13E+06 |
| L16 | 26 | −57.61 |
| L17 | 28 | 87.85 |

Zoom lens group data

| Group | Initial surface | Focal length | Lens structure length | Front side principal point position | Back side principal point position |
|---|---|---|---|---|---|
| 1 | 1 | 63.5207 | 11.2511 | 3.3463 | −3.8243 |
| 2 | 7 | −7.8227 | 13.5160 | 1.9012 | −7.2416 |
| 3 | 15 | 18.4086 | 15.6380 | 0.4215 | −10.1782 |
| 4 | 24 | 73.7783 | 3.5080 | −2.0985 | −4.2304 |
| 5 | 28 | 87.8520 | 6.7160 | 0.7294 | −4.0624 |

| Group | Initial surbace | wide angle Magnification | Intermediate Magnification | Telephoto Magnification |
|---|---|---|---|---|
| 1 | 1 | 0.0000 | 0.0000 | 0.0000 |
| 2 | 7 | −0.1597 | −0.2501 | −0.8818 |
| 3 | 15 | −0.6323 | −2.0051 | −2.9333 |
| 4 | 24 | 0.7775 | 0.6726 | 0.5557 |
| 5 | 28 | 0.9432 | 0.9435 | 0.9422 |

Example 11

Unit mm

Surface data

| Surface no. | r | d | nd | νd | effective radius |
|---|---|---|---|---|---|
| Object plane | ∞ | ∞ | | | |
| 1 | 110.000 | 2.60 | 1.70010 | 17.01 | 18.00 |
| 2* | 123851.777 | 0.90 | 1.92286 | 20.88 | 18.86 |
| 3 | 61.044 | 3.46 | 1.48749 | 70.23 | 17.14 |
| 4 | 14651.261 | 0.10 | | | 15.50 |
| 5 | 29.994 | 5.04 | 1.48749 | 70.23 | 14.27 |
| 6 | 2743.328 | Variable | | | 14.00 |
| 7 | 36.481 | 1.10 | 1.88300 | 40.76 | 9.15 |
| 8 | 7.467 | 4.79 | | | 6.47 |
| 9 | −46.254 | 0.80 | 1.88300 | 40.76 | 6.36 |
| 10 | 12.396 | 0.01 | 1.51400 | 42.83 | 6.29 |
| 11 | 12.396 | 4.87 | 1.78472 | 25.68 | 6.29 |
| 12 | −13.411 | 1.15 | | | 6.31 |
| 13 | −13.602 | 0.80 | 1.77250 | 49.60 | 5.74 |
| 14* | −679.809 | Variable | | | 5.78 |
| 15(stop) | ∞ | 1.30 | | | 3.78 |
| 16* | 10.743 | 4.93 | 1.58913 | 61.14 | 4.36 |
| 17 | −78.051 | 0.10 | | | 4.35 |
| 18 | 28.041 | 2.77 | 1.84666 | 23.78 | 4.33 |

-continued

Unit mm

| | | | | | |
|---|---|---|---|---|---|
| 19 | 10.632 | 1.42 | | | 4.04 |
| 20 | 14.230 | 3.12 | 1.49700 | 81.54 | 4.28 |
| 21 | −36.985 | 0.64 | | | 4.32 |
| 22* | 442.152 | 1.36 | 1.53071 | 55.69 | 4.29 |
| 23* | 34.607 | Variable | | | 4.30 |
| 24 | 19.130 | 2.68 | 1.49700 | 81.54 | 4.66 |
| 25 | −119.090 | 0.01 | 1.51400 | 42.83 | 4.54 |
| 26 | −119.090 | 0.82 | 1.80400 | 46.57 | 4.54 |
| 27 | 76.031 | Variable | | | 4.50 |
| 28* | 147.374 | 1.63 | 1.53071 | 55.69 | 4.10 |
| 29* | −67.939 | 1.09 | | | 4.02 |
| 30 | ∞ | 4.00 | 1.51680 | 64.20 | 3.96 |
| 31 | ∞ | 0.97 | | | 3.82 |
| Image plane | ∞ | | | | |

Aspherical surface data

2nd surface

K = 0.000, A2 = 0.0000E+00, A4 = −6.27779e−06, A6 = 1.53714e−08, A8 = −8.02550e−11, A10 = 1.22048e−13

14th surface

K = 0.000, A2 = 0.0000E+00, A4 = −9.39251e−05, A6 = −3.55374e−07, A8 = 3.55597e−09, A10 = −5.33578e−10

16th surface

K = 0.000, A2 = 0.0000E+00, A4 = −8.77784e−05, A6 = −1.01116e−06, A8 = 5.64180e−08, A10 = −2.23368e−09, A12 = 3.59187e−11

22nd surface

K = 0.000, A2 = 0.0000E+00, A4 = −2.17277e−04, A6 = 5.36299e−06, A8 = −5.28517e−07, A10 = 1.10330e−08, A12 = −1.37250e−10

23rd surface

K = 0.000, A2 = 0.0000E+00, A4 = −1.09771e−04, A6 = 5.91402e−06, A8 = −5.09130e−07, A10 = 8.38419e−09, A12 = −4.36735e−11

28th surface

K = 0.000, A2 = 0.0000E+00, A4 = 8.15873e−04, A6 = 4.82675e−06, A8 = −2.20386e−06, A10 = 4.10510e−08

29th surface

K = 0.000, A2 = 0.0000E+00, A4 = 1.26016e−03, A6 = 1.60282e−05, A8 = −3.90922e−06, A10 = 7.56282e−08

Various data
Zoom ratio 17.37

| | Wide angle | Intermediate | Telephoto |
|---|---|---|---|
| Focal length | 4.72 | 20.16 | 82.03 |
| Fno. | 2.91 | 4.86 | 5.14 |
| Angle of field 2ω | 78.92 | 20.04 | 5.00 |
| Image height | 3.6 | 3.6 | 3.6 |
| Lens total length | 90.16 | 104.82 | 123.80 |
| BF | 4.69 | 4.68 | 5.03 |
| d6 | 1.00 | 16.15 | 41.52 |
| d14 | 30.83 | 9.30 | 2.30 |
| d23 | 1.64 | 13.31 | 3.31 |
| d27 | 5.60 | 14.99 | 25.25 |
| Entrance pupil position | 20.80 | 51.04 | 248.94 |
| Exit pupil position A | −30.31 | −121.70 | −89.70 |
| Exit pupil position B | −35.01 | −126.39 | −94.73 |
| Front side principal point position | 24.88 | 67.98 | 259.94 |
| Back side principal point position | −3.75 | −19.20 | −80.72 |

Single lens data

| Lens | Initial surface | Focal length |
|---|---|---|
| L1 | 1 | 157.26 |
| L2 | 2 | −66.18 |
| L3 | 3 | 125.74 |
| L4 | 5 | 62.17 |
| L5 | 7 | −10.83 |
| L6 | 9 | −11.00 |
| L7 | 10 | 8.81E+04 |
| L8 | 11 | 8.95 |
| L9 | 13 | −17.98 |
| L10 | 16 | 16.37 |
| L11 | 18 | −21.82 |
| L12 | 20 | 21.10 |
| L13 | 22 | −70.83 |
| L14 | 24 | 33.38 |
| L15 | 25 | 8.13E+06 |
| L16 | 26 | −57.61 |
| L17 | 28 | 87.85 |

Zoom lens group data

| Group | Initial surface | Focal length | Lens structure length | Front side principal point position | Back side principal point position |
|---|---|---|---|---|---|
| 1 | 1 | 65.7956 | 12.1002 | 3.7305 | −4.1551 |
| 2 | 7 | −7.8405 | 13.5160 | 1.8957 | −7.2450 |
| 3 | 15 | 18.3867 | 15.6380 | 0.4439 | −10.1671 |
| 4 | 24 | 73.7783 | 3.5080 | −2.0985 | −4.2304 |
| 5 | 28 | 87.8520 | 6.7160 | 0.7294 | −4.0624 |

| Group | Initial surbace | wide angle Magnification | Intermediate Magnification | Telephoto Magnification |
|---|---|---|---|---|
| 1 | 1 | 0.0000 | 0.0000 | 0.0000 |
| 2 | 7 | −0.1540 | −0.2193 | −0.7551 |
| 3 | 15 | −0.6300 | −2.2537 | −3.4285 |
| 4 | 24 | 0.7846 | 0.6574 | 0.5130 |
| 5 | 28 | 0.9427 | 0.9429 | 0.9389 |

Example 12

Unit mm
Surface data

| Surface no. | r | d | nd | vd | effective radius |
|---|---|---|---|---|---|
| Object plane | ∞ | ∞ | | | |
| 1 | 78.200 | 2.95 | 1.70000 | 17.00 | 18.00 |
| 2* | 70224.939 | 0.87 | 1.63493 | 23.90 | 18.07 |
| 3 | 27.100 | 5.68 | 1.49700 | 81.54 | 14.86 |
| 4 | 54394.374 | 0.10 | | | 14.70 |
| 5 | 32.706 | 3.30 | 1.69400 | 56.30 | 14.33 |
| 6 | 96.229 | Variable | | | 14.00 |
| 7 | 62.728 | 1.10 | 1.88300 | 40.76 | 8.50 |
| 8 | 7.179 | 4.79 | | | 6.02 |
| 9 | −46.254 | 0.80 | 1.88300 | 40.76 | 5.86 |
| 10 | 12.396 | 0.01 | 1.51400 | 42.83 | 5.83 |
| 11 | 12.396 | 4.87 | 1.78472 | 25.68 | 5.84 |
| 12 | −13.411 | 1.15 | | | 5.87 |
| 13 | −13.602 | 0.80 | 1.77250 | 49.60 | 5.27 |
| 14* | −679.809 | Variable | | | 5.24 |
| 15(stop) | ∞ | 1.30 | | | 3.78 |
| 16* | 10.743 | 4.93 | 1.58913 | 61.14 | 4.57 |
| 17 | −78.051 | 0.10 | | | 4.54 |
| 18 | 28.041 | 2.77 | 1.84666 | 23.78 | 4.52 |
| 19 | 10.632 | 1.42 | | | 4.20 |
| 20 | 14.230 | 3.12 | 1.49700 | 81.54 | 4.44 |
| 21 | −36.985 | 0.64 | | | 4.46 |
| 22* | 112.249 | 1.36 | 1.53071 | 55.69 | 4.43 |
| 23* | 34.607 | Variable | | | 4.42 |
| 24 | 19.130 | 2.68 | 1.49700 | 81.54 | 4.75 |
| 25 | −119.090 | 0.01 | 1.51400 | 42.83 | 4.63 |
| 26 | −119.090 | 0.82 | 1.80400 | 46.57 | 4.63 |
| 27 | 76.031 | Variable | | | 4.58 |

-continued

Unit mm

| | | | | | |
|---|---|---|---|---|---|
| 28* | 147.374 | 1.63 | 1.53071 | 55.69 | 4.11 |
| 29* | −67.939 | 1.09 | | | 4.03 |
| 30 | ∞ | 4.00 | 1.51680 | 64.20 | 3.97 |
| 31 | ∞ | 1.12 | | | 3.84 |
| Image plane | ∞ | | | | |

Aspherical surface data

2nd surface

K = 0.000, A2 = 0.0000E+00, A4 = −2.35840e−06, A6 = 2.10188e−09, A8 = −1.61172e−11, A10 = 1.97279e−14

14th surface

K = 0.000, A2 = 0.0000E+00, A4 = −9.39251e−05, A6 = −3.55374e−07, A8 = 3.55597e−09, A10 = −5.33578e−10

16th surface

K = 0.000, A2 = 0.0000E+00, A4 = −8.77784e−05, A6 = −1.01116e−06, A8 = 5.64180e−08, A10 = −2.23368e−09, A12 = 3.59187e−11

22nd surface

K = 0.000, A2 = 0.0000E+00, A4 = −2.17277e−04, A6 = 5.36299e−06, A8 = −5.28517e−07, A10 = 1.10330e−08, A12 = −1.37250e−10

23rd surface

K = 0.000, A2 = 0.0000E+00, A4 = −1.09771e−04, A6 = 5.91402e−06, A8 = −5.09130e−07, A10 = 8.38419e−09, A12 = −4.36735e−11

28th surface

K = 0.000, A2 = 0.0000E+00, A4 = 8.15873e−04, A6 = 4.82675e−06, A8 = −2.20386e−06, A10 = 4.10510e−08

29th surface

K = 0.000, A2 = 0.0000E+00, A4 = 1.26016e−03, A6 = 1.60282e−05, A8 = −3.90922e−06, A10 = 7.56282e−08

Various data
Zoom ratio 19.59

| | Wide angle | Intermediate | Telephoto |
|---|---|---|---|
| Focal length | 4.79 | 21.16 | 93.83 |
| Fno. | 2.88 | 4.71 | 4.81 |
| Angle of field 2ω | 76.40 | 18.85 | 4.30 |
| Image height | 3.6 | 3.6 | 3.6 |
| Lens total length | 86.72 | 105.50 | 120.40 |
| BF | 4.84 | 4.64 | 4.49 |
| d6 | 1.00 | 16.85 | 36.84 |
| d14 | 26.27 | 8.59 | 2.30 |
| d23 | 1.26 | 14.55 | 15.14 |
| d27 | 6.17 | 13.69 | 14.45 |
| Entrance pupil position | 20.56 | 59.44 | 300.01 |
| Exit pupil position A | −31.29 | −133.82 | −147.61 |
| Exit pupil position B | −36.14 | −138.46 | −152.10 |
| Front side principal point position | 24.72 | 77.36 | 335.95 |
| Back side principal point position | −3.67 | −20.24 | −93.07 |

Single lens data

| Lens | Initial surface | Focal length |
|---|---|---|
| L1 | 1 | 111.84 |
| L2 | 2 | −42.70 |
| L3 | 3 | 54.55 |
| L4 | 5 | 69.90 |
| L5 | 7 | −9.27 |
| L6 | 9 | −11.00 |
| L7 | 10 | 8.81E+04 |
| L8 | 11 | 8.95 |
| L9 | 13 | −17.98 |
| L10 | 16 | 16.37 |
| L11 | 18 | −21.82 |
| L12 | 20 | 21.10 |
| L13 | 22 | −94.85 |
| L14 | 24 | 33.38 |

-continued

Unit mm

| Lens | Initial surface | Focal length |
|---|---|---|
| L15 | 25 | 8.13E+06 |
| L16 | 26 | −57.61 |
| L17 | 28 | 87.85 |

Zoom lens group data

| Group | Initial surface | Focal length | Lens structure length | Front side principal point position | Back side principal point position |
|---|---|---|---|---|---|
| 1 | 1 | 56.1633 | 12.8919 | 3.5358 | −4.6745 |
| 2 | 7 | −6.8712 | 13.5160 | 1.6832 | −7.4185 |
| 3 | 15 | 17.7998 | 15.6380 | 1.0432 | −9.8706 |
| 4 | 24 | 73.7783 | 3.5080 | −2.0985 | −4.2304 |
| 5 | 28 | 87.8520 | 6.7160 | 0.7294 | −4.0624 |

| Group | Initial surbace | wide angle Magnification | Intermediate Magnification | Telephoto Magnification |
|---|---|---|---|---|
| 1 | 1 | 0.0000 | 0.0000 | 0.0000 |
| 2 | 7 | −0.1639 | −0.2634 | −1.1266 |
| 3 | 15 | −0.7141 | −2.2437 | −2.3500 |
| 4 | 24 | 0.7745 | 0.6757 | 0.6677 |
| 5 | 28 | 0.9410 | 0.9433 | 0.9451 |

Example 13

Unit mm

Surface data

| Surface no. | r | d | nd | vd | effective radius |
|---|---|---|---|---|---|
| Object plane | ∞ | ∞ | | | |
| 1 | 103.000 | 3.77 | 1.73000 | 15.00 | 17.50 |
| 2 | 230.807 | 0.74 | 1.63493 | 23.90 | 17.10 |
| 3 | 30.988 | 4.83 | 1.49700 | 81.54 | 14.93 |
| 4 | −6275.775 | 0.10 | | | 14.70 |
| 5 | 38.693 | 3.00 | 1.78800 | 47.37 | 14.22 |
| 6 | 158.811 | Variable | | | 14.00 |
| 7 | 63.326 | 1.10 | 1.88300 | 40.76 | 8.60 |
| 8 | 7.209 | 4.79 | | | 6.01 |
| 9 | −46.254 | 0.80 | 1.88300 | 40.76 | 5.76 |
| 10 | 12.396 | 0.01 | 1.51400 | 42.83 | 5.64 |
| 11 | 12.396 | 4.87 | 1.78472 | 25.68 | 5.64 |
| 12 | −13.411 | 1.15 | | | 5.67 |
| 13 | −13.602 | 0.80 | 1.77250 | 49.60 | 5.15 |
| 14* | −679.809 | Variable | | | 5.15 |
| 15(stop) | ∞ | 1.30 | | | 3.62 |
| 16* | 10.743 | 4.93 | 1.58913 | 61.14 | 4.20 |
| 17 | −78.051 | 0.10 | | | 4.23 |
| 18 | 28.041 | 2.77 | 1.84666 | 23.78 | 4.22 |
| 19 | 10.632 | 1.42 | | | 3.97 |
| 20 | 14.230 | 3.12 | 1.49700 | 81.54 | 4.24 |
| 21 | −36.985 | 0.64 | | | 4.30 |
| 22* | 58.077 | 1.36 | 1.53071 | 55.69 | 4.28 |
| 23* | 34.607 | Variable | | | 4.27 |
| 24 | 19.130 | 2.68 | 1.49700 | 81.54 | 4.75 |
| 25 | −119.090 | 0.01 | 1.51400 | 42.83 | 4.62 |
| 26 | −119.090 | 0.82 | 1.80400 | 46.57 | 4.62 |
| 27 | 76.031 | Variable | | | 4.57 |
| 28* | 147.374 | 1.63 | 1.53071 | 55.69 | 4.15 |
| 29* | −67.939 | 1.09 | | | 4.07 |
| 30 | ∞ | 4.00 | 1.51680 | 64.20 | 4.01 |
| 31 | ∞ | 1.12 | | | 3.85 |
| Image plane | ∞ | | | | |

-continued

Unit mm

Aspherical surface data

14th surface

K = 0.000, A2 = 0.0000E+00, A4 = −9.19823e−05, A6 = −8.80923e−07, A8 = 4.39702e−08, A10 = −1.24247e−09

16th surface

K = 0.000, A2 = 0.0000E+00, A4 = −8.77784e−05, A6 = −1.01116e−06, A8 = 5.64180e−08, A10 = −2.23368e−09, A12 = 3.59187e−11

22nd surface

K = 0.000, A2 = 0.0000E+00, A4 = −2.17277e−04, A6 = 5.36299e−06, A8 = −5.28517e−07, A10 = 1.10330e−08, A12 = −1.37250e−10

23rd surface

K = 0.000, A2 = 0.0000E+00, A4 = −1.09771e−04, A6 = 5.91402e−06, A8 = −5.09130e−07, A10 = 8.38419e−09, A12 = −4.36735e−11

28th surface

K = 0.000, A2 = 0.0000E+00, A4 = 8.15873e−04, A6 = 4.82675e−06, A8 = −2.20386e−06, A10 = 4.10510e−08

29th surface

K = 0.000, A2 = 0.0000E+00, A4 = 1.26016e−03, A6 = 1.60282e−05, A8 = −3.90922e−06, A10 = 7.56282e−08

Various data
Zoom ratio 20.16

| | Wide angle | Intermediate | Telephoto |
|---|---|---|---|
| Focal length | 4.61 | 21.11 | 92.84 |
| Fno. | 2.84 | 4.75 | 4.88 |
| Angle of field 2ω | 79.20 | 18.82 | 4.30 |
| Image height | 3.6 | 3.6 | 3.6 |
| Lens total length | 83.74 | 103.57 | 120.77 |
| BF | 4.84 | 4.64 | 4.64 |
| d6 | 1.00 | 17.00 | 38.62 |
| d14 | 24.50 | 6.81 | 2.30 |
| d23 | 1.00 | 15.66 | 24.43 |
| d27 | 5.66 | 12.73 | 4.05 |
| Entrance pupil position | 19.30 | 55.30 | 308.91 |
| Exit pupil position A | −30.92 | −151.54 | −380.60 |
| Exit pupil position B | −35.76 | −156.18 | −385.25 |
| Front side principal point position | 23.31 | 73.56 | 379.38 |
| Back side principal point position | −3.49 | −20.20 | −91.92 |

Single lens data

| Lens | Initial surface | Focal length |
|---|---|---|
| L1 | 1 | 251.67 |
| L2 | 2 | −56.46 |
| L3 | 3 | 62.06 |
| L4 | 5 | 64.21 |
| L5 | 7 | −9.30 |
| L6 | 9 | −11.00 |
| L7 | 10 | 8.81E+04 |
| L8 | 11 | 8.95 |
| L9 | 13 | −17.98 |
| L10 | 16 | 16.37 |
| L11 | 18 | −21.82 |
| L12 | 20 | 21.10 |
| L13 | 22 | −164.67 |
| L14 | 24 | 33.38 |
| L15 | 25 | 8.13E+06 |
| L16 | 26 | −57.61 |
| L17 | 28 | 87.85 |

-continued

Unit mm

Zoom lens group data

| Group | Initial surface | Focal length | Lens structure length | Front side principal point position | Back side principal point position |
|---|---|---|---|---|---|
| 1 | 1 | 56.8980 | 12.4430 | 4.1467 | −3.6119 |
| 2 | 7 | −6.8912 | 13.5160 | 1.6857 | −7.4162 |
| 3 | 15 | 17.1168 | 15.6380 | 1.7408 | −9.5255 |
| 4 | 24 | 73.7783 | 3.5080 | −2.0985 | −4.2304 |
| 5 | 28 | 87.8520 | 6.7160 | 0.7294 | −4.0624 |

| Group | Initial surface | wide angle Magnification | Intermediate Magnification | Telephoto Magnification |
|---|---|---|---|---|
| 1 | 1 | 0.0000 | 0.0000 | 0.0000 |
| 2 | 7 | −0.1577 | −0.2487 | −1.1312 |
| 3 | 15 | −0.6981 | −2.2967 | −1.8963 |
| 4 | 24 | 0.7814 | 0.6888 | 0.8063 |
| 5 | 28 | 0.9411 | 0.9434 | 0.9433 |

Example 14

Unit mm

Surface data

| Surface no. | r | d | nd | vd | effective radius |
|---|---|---|---|---|---|
| Object plane | ∞ | ∞ | | | |
| 1 | 65.500 | 2.80 | 1.63336 | 23.36 | 17.50 |
| 2 | 110.000 | 1.30 | 1.63493 | 23.90 | 16.56 |
| 3 | 30.812 | 5.13 | 1.49700 | 81.54 | 14.85 |
| 4 | 15657.008 | 0.10 | | | 14.70 |
| 5 | 38.432 | 2.88 | 1.78800 | 47.37 | 14.24 |
| 6 | 120.732 | Variable | | | 14.00 |
| 7 | 63.326 | 1.10 | 1.88300 | 40.76 | 8.66 |
| 8 | 7.209 | 4.79 | | | 6.11 |
| 9 | −46.254 | 0.80 | 1.88300 | 40.76 | 6.00 |
| 10 | 12.396 | 0.01 | 1.51400 | 42.83 | 6.01 |
| 11 | 12.396 | 4.87 | 1.78472 | 25.68 | 6.01 |
| 12 | −13.411 | 1.15 | | | 6.07 |
| 13 | −13.602 | 0.80 | 1.77250 | 49.60 | 5.49 |
| 14* | −679.809 | Variable | | | 5.49 |
| 15(stop) | ∞ | 1.30 | | | 3.62 |
| 16* | 10.743 | 4.93 | 1.58913 | 61.14 | 4.21 |
| 17 | −78.051 | 0.10 | | | 4.25 |
| 18 | 28.041 | 2.77 | 1.84666 | 23.78 | 4.24 |
| 19 | 10.632 | 1.42 | | | 3.99 |
| 20 | 14.230 | 3.12 | 1.49700 | 81.54 | 4.26 |
| 21 | −36.985 | 0.64 | | | 4.33 |
| 22* | 58.077 | 1.36 | 1.53071 | 55.69 | 4.31 |
| 23* | 34.607 | Variable | | | 4.31 |
| 24 | 19.130 | 2.68 | 1.49700 | 81.54 | 4.74 |
| 25 | −119.090 | 0.01 | 1.51400 | 42.83 | 4.61 |
| 26 | −119.090 | 0.82 | 1.80400 | 46.57 | 4.61 |
| 27 | 76.031 | Variable | | | 4.56 |
| 28* | 147.374 | 1.63 | 1.53071 | 55.69 | 4.16 |
| 29* | −67.939 | 1.09 | | | 4.07 |
| 30 | ∞ | 4.00 | 1.51680 | 64.20 | 4.01 |
| 31 | ∞ | 0.75 | | | 3.84 |
| Image plane | ∞ | | | | |

Aspherical surface data

14th surface

K = 0.000, A2 = 0.0000E+00, A4 = −9.19823e−05, A6 = −8.80923e−07, A8 = 4.39702e−08, A10 = −1.24247e−09

-continued

Unit mm

16th surface

K = 0.000, A2 = 0.0000E+00, A4 = −8.77784e−05, A6 = −1.01116e−06,
A8 = 5.64180e−08, A10 = −2.23368e−09, A12 = 3.59187e−11
22nd surface K = 0.000, A2 = 0.0000E+00, A4 = −2.17277e−04, A6 = 5.36299e−06,
A8 = −5.28517e−07, A10 = 1.10330e−08, A12 = −1.37250e−10
23rd surface K = 0.000, A2 = 0.0000E+00, A4 = −1.09771e−04, A6 = 5.91402e−06,
A8 = −5.09130e−07, A10 = 8.38419e−09, A12 = −4.36735e−11
28th surface K = 0.000, A2 = 0.0000E+00, A4 = 8.15873e−04, A6 = 4.82675e−06,
A8 = −2.20386e−06, A10 = 4.10510e−08
29th surface K = 0.000, A2 = 0.0000E+00, A4 = 1.26016e−03, A6 = 1.60282e−05,
A8 = −3.90922e−06, A10 = 7.56282e−08

Various data
Zoom ratio 18.97

|  | Wide angle | Intermediate | Telephoto |
|---|---|---|---|
| Focal length | 4.89 | 21.05 | 92.73 |
| Fno. | 2.86 | 4.75 | 5.00 |
| Angle of field 2ω | 74.54 | 18.87 | 4.29 |
| Image height | 3.6 | 3.6 | 3.6 |
| Lens total length | 83.25 | 100.66 | 115.80 |
| BF | 4.48 | 4.63 | 4.59 |
| d6 | 1.00 | 14.24 | 34.23 |
| d14 | 24.07 | 6.87 | 2.30 |
| d23 | 1.12 | 16.66 | 27.89 |
| d27 | 6.09 | 11.76 | 0.30 |
| Entrance pupil position | 20.17 | 50.73 | 278.69 |
| Exit pupil position A | −32.00 | −162.06 | −966.23 |
| Exit pupil position B | −36.47 | −166.69 | −970.81 |
| Front side principal point position | 24.40 | 69.12 | 362.56 |
| Back side principal point position | −4.14 | −20.14 | −91.87 |

Single lens data

| Lens | Initial surface | Focal length |
|---|---|---|
| L1 | 1 | 249.55 |
| L2 | 2 | −67.84 |
| L3 | 3 | 62.11 |
| L4 | 5 | 70.46 |
| L5 | 7 | −9.30 |
| L6 | 9 | −11.00 |
| L7 | 10 | 8.81E+04 |
| L8 | 11 | 8.95 |
| L9 | 13 | −17.98 |
| L10 | 16 | 16.37 |
| L11 | 18 | −21.82 |
| L12 | 20 | 21.10 |
| L13 | 22 | −164.67 |
| L14 | 24 | 33.38 |
| L15 | 25 | 8.13E+06 |
| L16 | 26 | −57.61 |
| L17 | 28 | 87.85 |

Zoom lens group data

| Group | Initial surface | Focal length | Lens structure length | Front side principal point position | Back side principal point position |
|---|---|---|---|---|---|
| 1 | 1 | 52.8475 | 12.2079 | 3.3933 | −4.3919 |
| 2 | 7 | −6.8912 | 13.5160 | 1.6857 | −7.4162 |
| 3 | 15 | 17.1168 | 15.6380 | 1.7408 | −9.5255 |
| 4 | 24 | 73.7783 | 3.5080 | −2.0985 | −4.2304 |
| 5 | 28 | 87.8520 | 6.7160 | 0.7294 | −4.0624 |

-continued

Unit mm

| Group | Initial surface | wide angle Magnification | Intermediate Magnification | Telephoto Magnification |
|---|---|---|---|---|
| 1 | 1 | 0.0000 | 0.0000 | 0.0000 |
| 2 | 7 | −0.1772 | −0.2688 | −1.2193 |
| 3 | 15 | −0.7067 | −2.2370 | −1.7767 |
| 4 | 24 | 0.7812 | 0.7020 | 0.8580 |
| 5 | 28 | 0.9452 | 0.9434 | 0.9440 |

Example 15

Unit mm
Surface data

| Surface no. | r | d | nd | vd | effective radius |
|---|---|---|---|---|---|
| Object plane | ∞ | ∞ |  |  |  |
| 1 | 85.000 | 2.80 | 1.72921 | 14.99 | 17.50 |
| 2 | 110.000 | 1.30 | 1.63493 | 23.90 | 17.07 |
| 3 | 30.778 | 5.04 | 1.49700 | 81.54 | 14.94 |
| 4 | 19949.585 | 0.10 |  |  | 14.70 |
| 5 | 36.412 | 3.01 | 1.78800 | 47.37 | 14.23 |
| 6 | 127.300 | Variable |  |  | 14.00 |
| 7 | 63.326 | 1.10 | 1.88300 | 40.76 | 8.56 |
| 8 | 7.209 | 4.79 |  |  | 6.00 |
| 9 | −46.254 | 0.80 | 1.88300 | 40.76 | 5.80 |
| 10 | 12.396 | 0.01 | 1.51400 | 42.83 | 5.74 |
| 11 | 12.396 | 4.87 | 1.78472 | 25.68 | 5.74 |
| 12 | −13.411 | 1.15 |  |  | 5.74 |
| 13 | −13.602 | 0.80 | 1.77250 | 49.60 | 5.16 |
| 14* | −679.809 | Variable |  |  | 5.16 |
| 15(stop) | ∞ | 1.30 |  |  | 3.62 |
| 16* | 10.743 | 4.93 | 1.58913 | 61.14 | 4.19 |
| 17 | −78.051 | 0.10 |  |  | 4.22 |
| 18 | 28.041 | 2.77 | 1.84666 | 23.78 | 4.21 |
| 19 | 10.632 | 1.42 |  |  | 3.96 |
| 20 | 14.230 | 3.12 | 1.49700 | 81.54 | 4.22 |
| 21 | −36.985 | 0.64 |  |  | 4.28 |
| 22* | 58.077 | 1.36 | 1.53071 | 55.69 | 4.26 |
| 23* | 34.607 | Variable |  |  | 4.25 |
| 24 | 19.130 | 2.68 | 1.49700 | 81.54 | 4.77 |
| 25 | −119.090 | 0.01 | 1.51400 | 42.83 | 4.63 |
| 26 | −119.090 | 0.82 | 1.80400 | 46.57 | 4.63 |
| 27 | 76.031 | Variable |  |  | 4.58 |
| 28* | 147.374 | 1.63 | 1.53071 | 55.69 | 4.18 |
| 29* | −67.939 | 1.09 |  |  | 4.09 |
| 30 | ∞ | 4.00 | 1.51680 | 64.20 | 4.02 |
| 31 | ∞ | 0.89 |  |  | 3.85 |
| Image plane | ∞ |  |  |  |  |

Aspherical surface data

14th surface

K = 0.000, A2 = 0.0000E+00, A4 = −9.19823e−05, A6 = −8.80923e−07,
A8 = 4.39702e−08, A10 = −1.24247e−09
16th surface K = 0.000, A2 = 0.0000E+00, A4 = −8.77784e−05, A6 = −1.01116e−06,
A8 = 5.64180e−08, A10 = −2.23368e−09, A12 = 3.59187e−11
22nd surface K = 0.000, A2 = 0.0000E+00, A4 = −2.17277e−04, A6 = 5.36299e−06,
A8 = −5.28517e−07, A10 = 1.10330e−08, A12 = −1.37250e−10
23rd surface K = 0.000, A2 = 0.0000E+00, A4 = −1.09771e−04, A6 = 5.91402e−06,
A8 = −5.09130e−07, A10 = 8.38419e−09, A12 = −4.36735e−11

Unit mm

28th surface

K = 0.000, A2 = 0.0000E+00, A4 = 8.15873e−04, A6 = 4.82675e−06,
A8 = −2.20386e−06, A10 = 4.10510e−08

29th surface

K = 0.000, A2 = 0.0000E+00, A4 = 1.26016e−03, A6 = 1.60282e−05,
A8 = −3.90922e−06, A10 = 7.56282e−08

Various data
Zoom ratio 19.80

|  | Wide angle | Intermediate | Telephoto |
|---|---|---|---|
| Focal length | 4.71 | 20.03 | 93.18 |
| Fno. | 2.84 | 4.78 | 5.28 |
| Angle of field 2ω | 77.63 | 19.87 | 4.27 |
| Image height | 3.6 | 3.6 | 3.6 |
| Lens total length | 83.62 | 100.75 | 119.73 |
| BF | 4.62 | 4.61 | 4.71 |
| d6 | 1.00 | 13.84 | 35.18 |
| d14 | 24.57 | 7.04 | 2.30 |
| d23 | 1.05 | 17.38 | 30.84 |
| d27 | 5.83 | 11.34 | 0.16 |
| Entrance pupil position | 19.65 | 47.35 | 267.99 |
| Exit pupil position A | −31.36 | −173.20 | 1457.50 |
| Exit pupil position B | −35.98 | −177.81 | 1452.79 |
| Front side principal point position | 23.74 | 65.12 | 367.14 |
| Back side principal point position | −3.81 | −19.14 | −92.19 |

Single lens data

| Lens | Initial surface | Focal length |
|---|---|---|
| L1 | 1 | 489.75 |
| L2 | 2 | −67.74 |
| L3 | 3 | 62.02 |
| L4 | 5 | 63.79 |
| L5 | 7 | −9.30 |
| L6 | 9 | −11.00 |
| L7 | 10 | 8.81E+04 |
| L8 | 11 | 8.95 |
| L9 | 13 | −17.98 |
| L10 | 16 | 16.37 |
| L11 | 18 | −21.82 |
| L12 | 20 | 21.10 |
| L13 | 22 | −164.67 |
| L14 | 24 | 33.38 |
| L15 | 25 | 8.13E+06 |
| L16 | 26 | −57.61 |
| L17 | 28 | 87.85 |

Zoom lens group data

| Group | Initial surface | Focal length | Lens structure length | Front side principal point position | Back side principal point position |
|---|---|---|---|---|---|
| 1 | 1 | 53.9559 | 12.2479 | 3.7727 | −3.9122 |
| 2 | 7 | −6.8912 | 13.5160 | 1.6857 | −7.4162 |
| 3 | 15 | 17.1168 | 15.6380 | 1.7408 | −9.5255 |
| 4 | 24 | 73.7783 | 3.5080 | −2.0985 | −4.2304 |
| 5 | 28 | 87.8520 | 6.7160 | 0.7294 | −4.0624 |

| Group | Initial surbace | wide angle Magnification | Intermediate Magnification | Telephoto Magnification |
|---|---|---|---|---|
| 1 | 1 | 0.0000 | 0.0000 | 0.0000 |
| 2 | 7 | −0.1703 | −0.2495 | −1.0955 |
| 3 | 15 | −0.6936 | −2.2269 | −1.9494 |
| 4 | 24 | 0.7825 | 0.7080 | 0.8580 |
| 5 | 28 | 0.9436 | 0.9437 | 0.9425 |

Next, parameter and values of conditional expressions in each embodiments described above are described.

Conditional expression number

|  | (2) | (3-2) | (4-3) | (5) | (6) | (7) | (8) |
|---|---|---|---|---|---|---|---|
| Example 1 | 8.59 | 0.8836 | 0.3992 | 0.647 | 0.024 | 2.70 | −1.89 |
| Example 2 | 8.53 | 0.8648 | 0.4847 | 0.647 | 0.034 | 1.89 | −1.12 |
| Example 3 | 8.30 | 0.8012 | 0.4812 | 0.647 | 0.034 | 1.96 | −1.12 |
| Example 4 | 8.35 | 0.8504 | 0.5084 | 0.647 | 0.038 | 1.76 | −0.98 |
| Example 5 | 8.19 | 0.8023 | 0.4457 | 0.647 | 0.045 | 1.90 | −1.47 |
| Example 6 | 8.12 | 0.8722 | 0.4370 | 0.654 | 0.062 | 1.72 | −1.02 |
| Example 7 | 8.15 | 0.7860 | 0.4944 | 0.9 | 0.188 | 1.82 | −1.02 |
| Example 8 | 7.50 | 0.8760 | 0.4237 | 0.9 | 0.027 | 2.09 | −1.00 |
| Example 9 | 7.95 | 0.8808 | 0.3810 | 0.726 | 0.123 | 1.61 | −1.00 |
| Example 10 | 8.12 | 0.8924 | 0.4959 | 0.9 | 0.180 | 2.93 | −1.00 |
| Example 11 | 8.39 | 0.8921 | 0.4208 | 0.812 | 0.130 | 2.39 | −1.00 |
| Example 12 | 8.17 | 0.8517 | 0.3818 | 0.695 | 0.098 | 1.99 | −1.00 |
| Example 13 | 8.26 | 0.9521 | 0.2243 | 0.726 | 0.058 | 4.42 | −2.61 |
| Example 14 | 7.67 | 0.9347 | 0.2719 | 0.9 | 0.071 | 4.72 | −3.94 |
| Example 15 | 7.83 | 0.9701 | 0.1383 | 0.995 | 0.068 | 9.08 | −7.80 |

Conditional expression number

|  | (9-1a) | (9-1b) | (9-1c) | (9-2a) | (9-2b) |
|---|---|---|---|---|---|
| Example 1 | 3.98 | 1.39 | 0.80 | 0.350 | 0.200 |
| Example 2 | 6.27 | 1.61 | 0.83 | 0.257 | 0.132 |
| Example 3 | 3.51 | 0.97 | 0.45 | 0.277 | 0.128 |
| Example 4 | 4.78 | 1.42 | 0.71 | 0.297 | 0.148 |
| Example 5 | 3.55 | 1.09 | 0.53 | 0.308 | 0.149 |
| Example 6 | 7.98 | 1.31 | 0.54 | 0.164 | 0.067 |
| Example 7 | 2.99 | 1.11 | 0.77 | 0.371 | 0.257 |
| Example 8 | 7.35 | 1.11 | 0.47 | 0.152 | 0.064 |
| Example 9 | 2.23 | 0.83 | 0.41 | 0.374 | 0.182 |
| Example 10 | 1.38 | 0.78 | 0.43 | 0.566 | 0.314 |
| Example 11 | 2.90 | 1.06 | 0.48 | 0.366 | 0.165 |
| Example 12 | 3.41 | 0.82 | 0.37 | 0.242 | 0.107 |
| Example 13 | 5.07 | 1.80 | 1.12 | 0.354 | 0.221 |
| Example 14 | 2.15 | 1.08 | 0.72 | 0.502 | 0.336 |
| Example 15 | 2.15 | 1.14 | 0.81 | 0.529 | 0.375 |

Conditional expression number

|  | (10-1a) | (10-1b) | (10-1c) | (10-2a) | (10-2b) |
|---|---|---|---|---|---|
| Example 1 | 3.98 | 1.57 | 1.05 | 0.393 | 0.263 |
| Example 2 | 6.27 | 1.95 | 1.23 | 0.310 | 0.196 |
| Example 3 | 3.51 | 1.34 | 0.86 | 0.382 | 0.246 |
| Example 4 | 4.78 | 1.88 | 1.25 | 0.393 | 0.262 |
| Example 5 | 3.55 | 1.46 | 0.96 | 0.412 | 0.270 |
| Example 6 | 7.98 | 2.06 | 1.24 | 0.258 | 0.156 |
| Example 7 | 2.99 | 1.39 | 1.04 | 0.466 | 0.349 |
| Example 8 | 7.35 | 2.81 | 1.92 | 0.382 | 0.261 |
| Example 9 | 2.23 | 1.26 | 0.93 | 0.565 | 0.415 |
| Example 10 | 1.38 | 1.02 | 0.85 | 0.737 | 0.619 |
| Example 11 | 2.90 | 1.72 | 1.29 | 0.593 | 0.446 |
| Example 12 | 3.41 | 1.28 | 0.83 | 0.375 | 0.244 |
| Example 13 | 5.07 | 2.17 | 1.54 | 0.427 | 0.304 |
| Example 14 | 2.15 | 1.37 | 1.09 | 0.637 | 0.506 |
| Example 15 | 2.15 | 1.46 | 1.21 | 0.680 | 0.560 |

Conditional expression number

|  | (11a) | (11b) | (12a) | (12b) | (20) |
|---|---|---|---|---|---|
| Example 1 | 0.872 | 0.790 | 0.862 | 0.733 | 1.018 |
| Example 2 | 0.857 | 0.765 | 0.831 | 0.673 | 1.813 |
| Example 3 | 0.832 | 0.724 | 0.760 | 0.538 | 2.044 |
| Example 4 | 0.869 | 0.785 | 0.820 | 0.636 | 1.938 |
| Example 5 | 0.831 | 0.722 | 0.761 | 0.547 | 1.764 |
| Example 6 | 0.867 | 0.774 | 0.784 | 0.550 | 2.277 |
| Example 7 | 0.873 | 0.820 | 0.840 | 0.779 | 2.164 |
| Example 8 | 0.915 | 0.861 | 0.757 | 0.533 | 1.876 |
| Example 9 | 0.874 | 0.791 | 0.760 | 0.528 | 2.444 |
| Example 10 | 0.897 | 0.827 | 0.810 | 0.583 | 3.634 |
| Example 11 | 0.896 | 0.825 | 0.784 | 0.534 | 4.510 |
| Example 12 | 0.862 | 0.770 | 0.767 | 0.537 | 2.342 |
| Example 13 | 0.951 | 0.919 | 0.955 | 0.904 | 0.7152 |
| Example 14 | 0.936 | 0.896 | 0.902 | 0.813 | 0.0492 |
| Example 15 | 0.974 | 0.957 | 0.969 | 0.933 | 0.0278 |

Thus, it is possible to use such image forming optical system (Zoom lens) of the present invention in a photographic apparatus in which an image of an object is photographed by an electronic image pickup element such as a CCD and a CMOS, particularly a digital camera and a video camera, a personal computer, a telephone, and a portable terminal which are examples of an information processing unit, particularly a portable telephone which is easy to carry. Embodiments thereof will be exemplified below.

Figure 31:
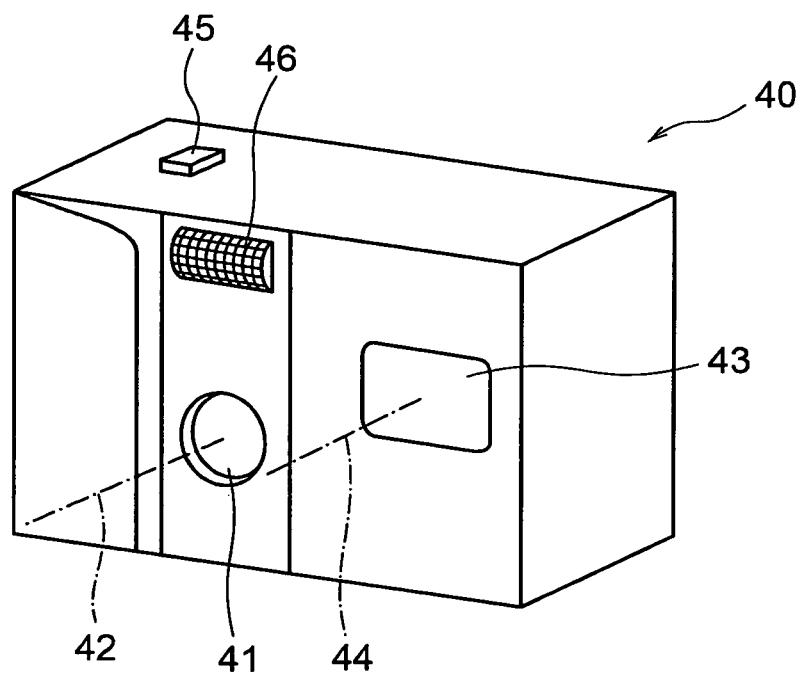
FIG. 31 is a front perspective view showing an outer appearance of a digital camera 40 equipped with a zoom optical system according to the present invention.
Figure 32:
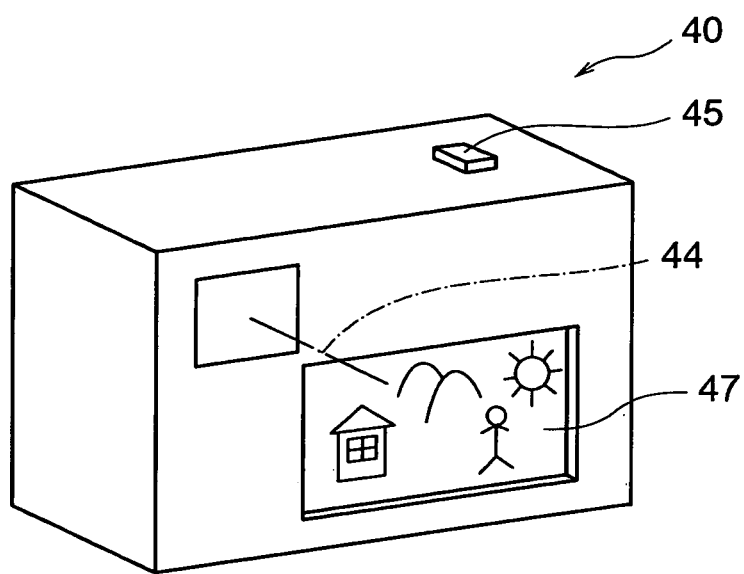
FIG. 32 is a rear perspective view of the digital camera 40.
Figure 33:
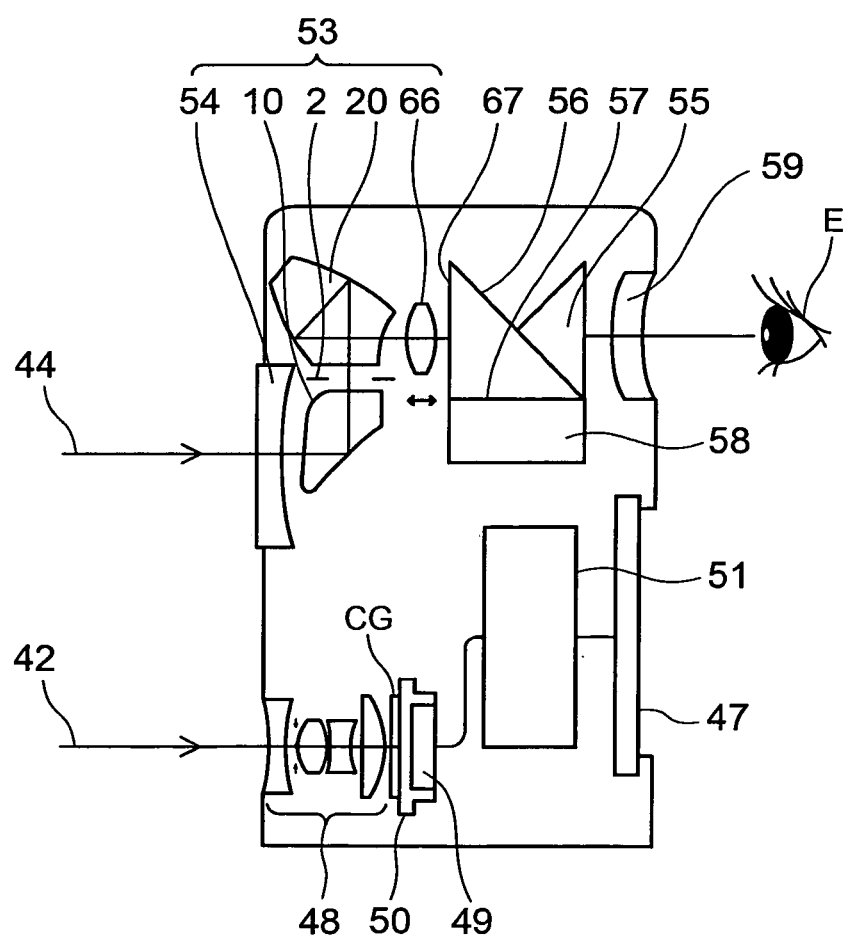
FIG. 33 is a cross sectional view showing the optical construction of the digital camera 40.

In FIG. 31 to FIG. 33 show conceptual diagrams of structures in which the image forming optical system according to the present invention is incorporated in a photographic optical system 41 of a digital camera. FIG. 31 is a frontward perspective view showing an appearance of a digital camera 40, FIG. 32 is a rearward perspective view of the same, and FIG. 33 is a cross-sectional view showing an optical arrangement of the digital camera 40.

The digital camera 40, in a case of this example, includes the photographic optical system 41 having an optical path for photography 42, a finder optical system 43 having an optical path for finder 44, a shutter 45, a flash 46, and a liquid-crystal display monitor 47. Moreover, when the shutter 45 disposed at an upper portion of the camera 40 is pressed, in conjugation with this, a photograph is taken through the photographic optical system 41 such as the zoom lens in the first embodiment.

An object image formed by the photographic optical system 41 is formed on an image pickup surface 50 of a CCD 49. The object image photoreceived at the CCD 49 is displayed on the liquid-crystal display monitor 47 which is provided on a camera rear surface as an electronic image, via an image processing means 51. Moreover, a memory etc. is disposed in the image processing means 51, and it is possible to record the electronic image photographed. This memory may be provided separately from the image processing means 51, or may be formed by carrying out by writing by recording (recorded writing) electronically by a floppy (registered trademark) disc, memory card, or an MO etc.

Furthermore, an objective optical system for finder 53 is disposed in the optical path for finder 44. This objective optical system for finder 53 includes a cover lens 54, a first prism 10, an aperture stop 2, a second prism 20, and a lens for focusing 66. An object image is formed on an image forming surface 67 by this objective optical system for finder 53. This object image is formed in a field frame of a Porro prism which is an image erecting member equipped with a first reflecting surface 56 and a second reflecting surface 58. On a rear side of this Porro prism, an eyepiece optical system 59 which guides an image formed as an erected normal image is disposed.

By the digital camera 40 structured in such manner, it is possible to realize an optical image pickup apparatus having a zoom lens with a reduced size and thickness, in which the number of structural components is reduced. Incidentally, the present invention could be applied to a bending type digital camera having a bending optical system, in addition to the above-mentioned collapsible type digital camera.

Figure 34:
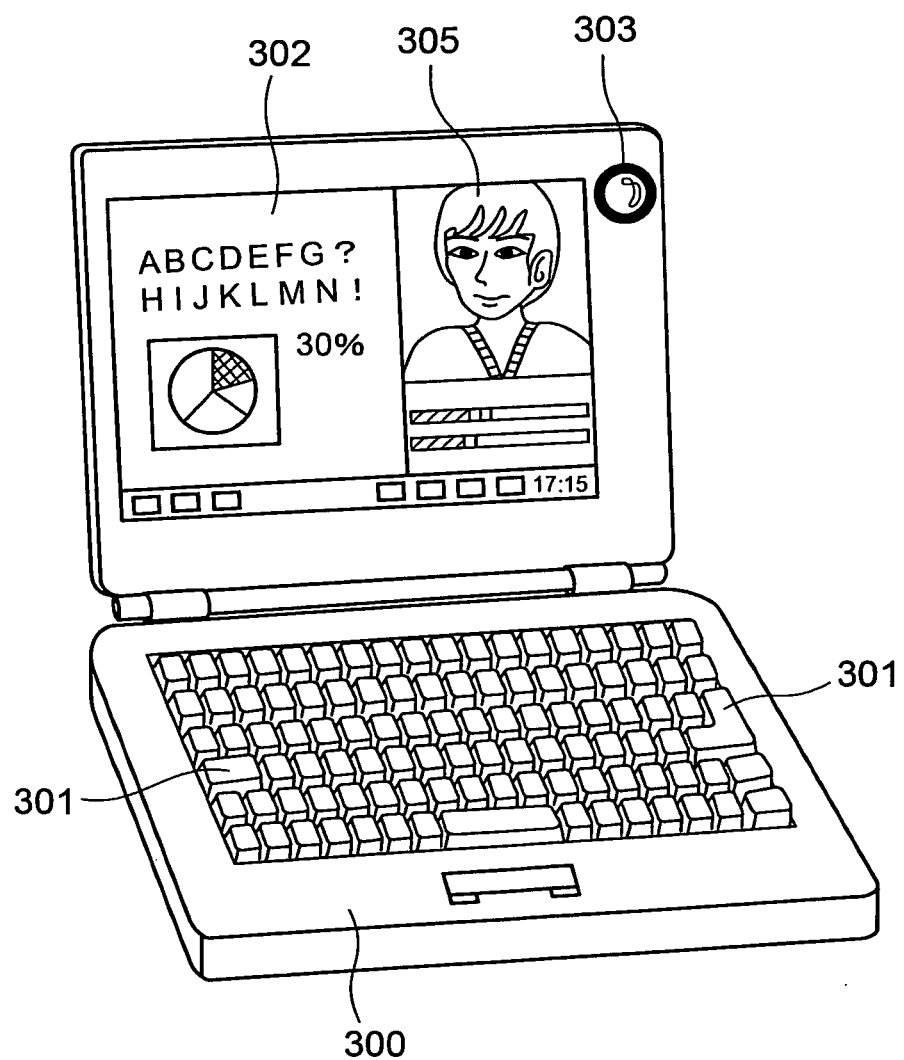
FIG. 34 is a front perspective view showing a personal computer 300 as an example of an information processing apparatus in which a zoom optical system according to the present invention is provided as an objective optical system, in a state in which the cover is open.
Figure 35:
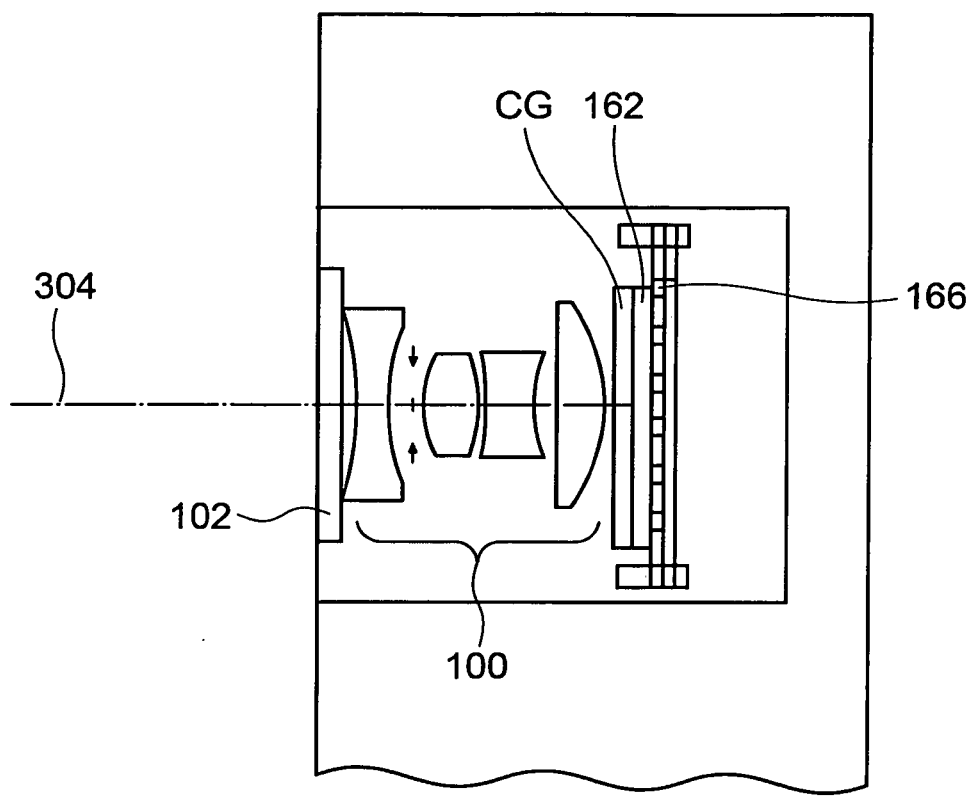
FIG. 35 is a cross sectional view of a taking optical system 303 of the personal computer 300.
Figure 36:
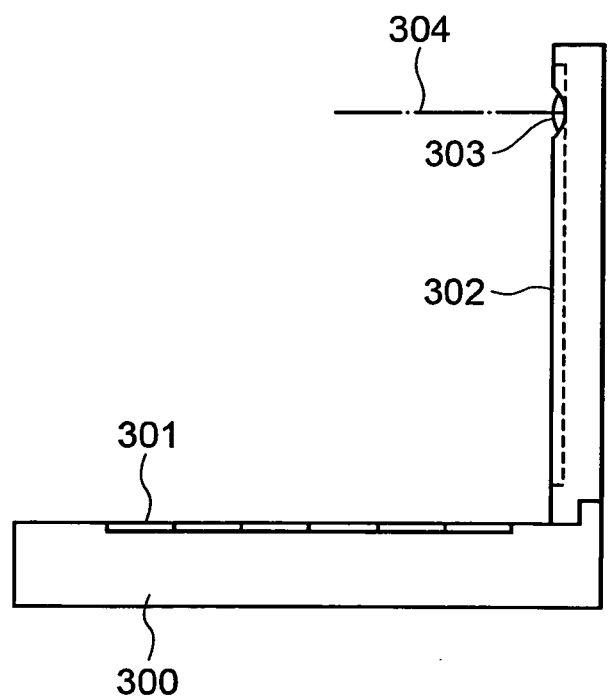
FIG. 36 is a side view of the personal computer 300.

Next, a personal computer which is an example of an information processing apparatus with a built-in image forming system as an objective optical system is shown in FIG. 34 to FIG. 36. FIG. 34 is a frontward perspective view of a personal computer 300 with its cover opened, FIG. 35 is a cross-sectional view of a photographic optical system 303 of the personal computer 300, and FIG. 36 is a side view of FIG. 34. As it is shown in FIG. 34 to FIG. 36, the personal computer 300 has a keyboard 301, an information processing means and a recording means, a monitor 302, and a photographic optical system 303.

Here, the keyboard 301 is for an operator to input information from an outside. The information processing means and the recording means are omitted in the diagram. The monitor 302 is for displaying the information to the operator. The photographic optical system 303 is for photographing an image of the operator or a surrounding. The monitor 302 may be a display such as a liquid-crystal display or a CRT display. As the liquid-crystal display, a transmission liquid-crystal display device which illuminates from a rear surface by a backlight not shown in the diagram, and a reflection liquid-crystal display device which displays by reflecting light from a front surface are available. Moreover, in the diagram, the photographic optical system 303 is built-in at a right side of the monitor 302, but without restricting to this location, the photographic optical system 303 may be anywhere around the monitor 302 and the keyboard 301.

This photographic optical system 303 has an objective optical system 100 which includes the zoom lens in the first embodiment for example, and an electronic image pickup element chip 162 which receives an image. These are built into the personal computer 300.

At a front end of a mirror frame, a cover glass 102 for protecting the objective optical system 100 is disposed.

An object image received at the electronic image pickup element chip 162 is input to a processing means of the personal computer 300 via a terminal 166. Further, the object image is displayed as an electronic image on the monitor 302. In FIG. 34, an image 305 photographed by the user is displayed as an example of the electronic image. Moreover, it is also possible to display the image 305 on a personal computer of a communication counterpart from a remote location via a processing means. For transmitting the image to the remote location, the Internet and telephone are used.

Next, a telephone which is an example of an information processing apparatus in which the image forming optical system of the present invention is built-in as a photographic optical system, particularly a portable telephone which is easy to carry is shown in FIG. 37A, FIG. 37B, and FIG. 37C. FIG. 37A is a front view of a portable telephone 400, FIG. 37B is a side view of the portable telephone 400, and FIG. 37C is a cross-sectional view of a photographic optical system 405. As shown in FIG. 37A to FIG. 37C, the portable telephone 400 includes a microphone section 401, a speaker section 402, an input dial 403, a monitor 404, the photographic optical system 405, an antenna 406, and a processing means.

Here, the microphone section 401 is for inputting a voice of the operator as information. The speaker section 402 is for outputting a voice of the communication counterpart. The input dial 403 is for the operator to input information. The monitor 404 is for displaying a photographic image of the operator himself and the communication counterpart, and information such as a telephone number. The antenna 406 is for carrying out a transmission and a reception of communication electric waves. The processing means (not shown in the diagram) is for carrying out processing of image information, communication information, and input signal etc.

Here, the monitor 404 is a liquid-crystal display device. Moreover, in the diagram, a position of disposing each structural element is not restricted in particular to a position in the diagram. This photographic optical system 405 has an objective optical system 100 which is disposed in a photographic optical path 407 and an image pickup element chip 162 which receives an object image. As the objective optical system 100, the zoom lens in the first embodiment for example, is used. These are built into the portable telephone 400.

At a front end of a mirror frame, a cover glass 102 for protecting the objective optical system 100 is disposed.

An object image received at the electronic image pickup element chip 162 is input to an image processing means which is not shown in the diagram, via a terminal 166. Further, the object image finally displayed as an electronic image on the monitor 404 or a monitor of the communication counterpart, or both. Moreover, a signal processing function is included in the processing means. In a case of transmitting an image to the communication counterpart, according to this function, information of the object image received at the electronic image pickup element chip 162 is converted to a signal which can be transmitted.

Various modifications can be made to the present invention without departing from its essence.

In the image forming optical system and the electronic image pickup apparatus according to the present invention, secondary spectrum is reduced throughout the entire zoom range. Therefore, there can be provided an image forming optical system having a wide angle of view at the wide angle end and a high zoom ratio and an image pickup apparatus (electronic image pickup apparatus) equipped with the same.

What is claimed is:

1. An image forming optical system comprising, in order from the object side to the image side, a first lens group having a positive refracting power, a second lens group having a negative refracting power, and an image side lens group having a positive refracting power, wherein the distance between the first lens group and the second lens group changes during zooming, wherein a cemented optical element C is provided in the first lens group, the cemented optical element C comprises a refractive optical element A having a positive refracting power and an optical element B, the refractive optical element A is located closest to the object side in the first lens group, and the image forming optical system satisfies the following conditional expressions (4-1), (4-2), and (4-3):

$$\nu d_A < 30 \quad (4\text{-}1),$$

$$0.54 < \theta g F_A < 0.92 \quad (4\text{-}2), \text{ and}$$

$$|f_B/f_A| > 0.08 \quad (4\text{-}3),$$

where $nd_A$, $nC_A$, $nF_A$, and $ng_A$ are the refractive indices of the refractive optical element A for the d-line, the C-line, the F-line, and the g-line respectively, $\nu d_A$ is the Abbe constant $(nd_A-1)/(nF_A-nC_A)$ of the refractive optical element A, $\theta gF_A$ is the relative partial dispersion $(ng_A-nF_A)/(nF_A-nC_A)$ of the refractive optical element A, $f_A$ is the focal length of the refractive optical element A, and $f_B$ is the focal length of the optical element B.

2. The image forming optical system according to claim 1, wherein the image forming optical system satisfies the following conditional expression (2):

$$|fG1/fG2| > 6.4 \quad (2),$$

where fG1 is the focal length of the first lens group, and fG2 is the focal length of the second lens group.

3. The image forming optical system according to claim 1, wherein the refractive optical element A is located closest to the object side in the first lens group, and the image forming optical system satisfies the following conditional expression (7):

$$0.8 < f_A/fG1 < 13.0 \quad (7),$$

where $f_A$ is the focal length of the refractive optical element A, and fG1 is the focal length of the first lens group.

4. The image forming optical system according to claim 1, wherein the image forming optical system satisfies the following conditional expression (5):

$$0.4 < \theta hg_A < 1.2 \quad (5),$$

where $\theta hg_A$ is the relative partial dispersion $(nh_A-ng_A)/(nF_A-nC_A)$ of the refractive optical element A with respect to the h-line, and $nh_A$ is the refractive index of the refractive optical element A for the h-line.

5. The image forming optical system according to claim 1, wherein the image forming optical system comprises, in order from the object side to the image side, the first lens group having a positive refracting power, the second lens group having a negative refracting power, a stop, a third lens group having a positive refracting power, a fourth lens group having a positive refracting power, and a fifth lens group having a positive refracting power, wherein zooming is performed by changing the distances between adjacent lens groups in such a way that the distance between the first lens group and the second lens group is larger, the distance between the second lens group and the third lens group is smaller, and the distance between the third lens group and the fourth lens group is larger at the telephoto end than at the wide angle end.

6. The image forming optical system according to claim 1, wherein the image forming optical system comprises, in order from the object side to the image side, the first lens group having a positive refracting power, the second lens group having a negative refracting power, a stop, a third lens group having a positive refracting power, a fourth lens group having a positive refracting power, and a fifth lens group having a positive refracting power, wherein zooming is performed by changing the distances between adjacent lens groups in such a way that the distance between the first lens group and the second lens group is larger, the distance between the second lens group and the third lens group is smaller, and the distance between the third lens group and the fourth lens group is larger at the telephoto end than at the wide angle end, and the distance between the fourth lens group and the fifth lens group satisfies the following conditional expression (20):

$$0 < TG_{45}/WG_{45} < 5 \quad (20),$$

where $WG_{45}$ is the distance between the fourth lens group and the fifth lens group at the wide angle end, and $TG_{45}$ is the distance between the fourth lens group and the fifth lens group at the telephoto end.

7. The image forming optical system according to claim 1, further comprising an optical element B and satisfying the following conditional expression (6):

$$0 < \theta gF_B - \theta gF_{BA} < 0.25 \quad (6),$$

where $nd_B$, $nC_B$, $nF_B$, and $ng_B$ are the refractive indices of the optical element B for the d-line, the C-line, the F-line, and the g-line respectively, $\nu d_B$ is the Abbe constant $(nd_B-1)/(nF_B-nC_B)$ of the optical element B, $\theta gF_B$ is the relative partial dispersion $(ng_B-nF_B)/(nF_B-nC_B)$ of the optical element B, $\theta gF_{BA}$ is the effective relative partial dispersion of the refractive optical element A and the optical element B regarded as a single optical element and expressed by the following equation:

$$\theta gF_{BA} = f_{BA} \times \nu_{BA} \times (\theta gF_A \times \phi_A/\nu d_A + \theta gF_B \times \phi_B/\nu d_B),$$

where $f_{BA}$ is the composite focal length of the optical element B and the refractive optical element A and expressed by the following equation:

$$1/f_{BA}=1/f_A+1/f_B,$$

$\nu_{BA}$ is the Abbe constant of the refractive optical element A and the optical element B regarded as a single optical element and expressed by the following equation:

$$\nu_{BA}=1/(f_{BA}\times(\phi_A/\nu d_A+\phi_B/\nu d_B)),$$

$\phi_A$ is the refracting power ($\phi_A=1/f_A$) of the refractive optical element A, $\phi_B$ is the refracting power ($\phi_B=1/f_B$) of the optical element B, and $\phi_{BA}$ is the composite refracting power ($\phi_{BA}=1/f_{BA}$) of the optical element B and the refractive optical element A.

8. The image forming optical system according to claim 1 wherein the image forming optical system satisfies the following conditional expression (8):

$$-15<(Ra+Rb)/(Ra-Rb)<-0.5 \quad (8),$$

where Ra is the radius of curvature of the object side surface of the refractive optical element A, and Rb is the radius of curvature of the image side surface of the refractive optical element A.

9. An electronic image pickup apparatus comprising an image forming optical system and an image pickup element, wherein the image forming optical system is an image forming optical system according to claim 1, and the apparatus satisfies the following conditional expression (3-2):

$$0<(Zb(3.3a)-Za(3.3a))/(Zb(2.5a)-Za(2.5a))<0.990 \quad (3\text{-}2),$$

where fw is the focal length of the image forming optical system at the wide angle end, ft is the focal length of the image forming optical system at the telephoto end, IH is the largest image height on the image pickup element, Za(h) is the distance along the optical axis between the object side surface vertex of the refractive optical element A on the optical axis and a point on the object side surface of the refractive optical element A at height h, Zb(h) is the distance along the optical axis between the object side surface vertex of the refractive optical element A on the optical axis and a point on the image plane side surface of the refractive optical element A at height h, and a is a value defined by the following equation (3-1):

$$a=\{(IH)^2\times\log_{10}(ft/fw)\}/fw \quad (3\text{-}1).$$

10. The image forming optical system according to claim 1, wherein the image forming optical system satisfies the following conditional expression (2):

$$|fG1/fG2|>7.95 \quad (2),$$

where fG1 is the focal length of the first lens group, and fG2 is the focal length of the second lens group.

11. An image forming optical system comprising, in order from the object side to the image side, a first lens group having a positive refracting power, a second lens group having a negative refracting power, and an image side lens group having a positive refracting power, wherein the distance between the first lens group and the second lens group changes during zooming, wherein
   a refractive optical element A comprising a positive refracting power is provided in the first lens group, and
   the image forming optical system satisfies the following conditional expressions (4-1), (4-2), and (2):

$$\nu d_A<30 \quad (4\text{-}1),$$

$$0.54<\theta gF_A<0.92 \quad (4\text{-}2), \text{ and}$$

$$|fG1/fG2|>6.4 \quad (2),$$

where $nd_A$, $nC_A$, $nF_A$, and $ng_A$ are the refractive indices of the refractive optical element A for the d-line, the C-line, the F-line, and the g-line respectively, $\nu d_A$ is the Abbe constant $(nd_A-1)/(nF_A-nC_A)$ of the refractive optical element A, $\theta gF_A$ is the relative partial dispersion $(ng_A-nF_A)/(nF_A-nC_A)$ of the refractive optical element A, fG1 is the focal length of the first lens group, and fG2 is the focal length of the second lens group.

12. The image forming optical system according to claim 11, wherein the image forming optical system satisfies the following conditional expression (2):

$$|fG1/fG2|>7.95 \quad (2),$$

where fG1 is the focal length of the first lens group, and fG2 is the focal length of the second lens group.

13. An image forming optical system comprising, in order from the object side to the image side, a first lens group having a positive refracting power, a second lens group having a negative refracting power, and an image side lens group having a positive refracting power, wherein the distance between the first lens group and the second lens group changes during zooming, wherein
   a refractive optical element A comprising a positive refracting power is provided in the first lens group,
   the refractive optical element A is located closest to the object side in the first lens group, and
   the image forming optical system satisfies the following conditional expressions (4-1), (4-2), and (7):

$$\nu d_A<30 \quad (4\text{-}1),$$

$$0.54<\theta gF_A<0.92 \quad (4\text{-}2), \text{ and}$$

$$0.8<f_A/fG1<13.0 \quad (7),$$

where $nd_A$, $nC_A$, $nF_A$, and $ng_A$ are the refractive indices of the refractive optical element A for the d-line, the C-line, the F-line, and the g-line respectively, $\nu d_A$ is the Abbe constant $(nd_A-1)/(nF_A-nC_A)$ of the refractive optical element A, $\theta gF_A$ is the relative partial dispersion $(ng_A-nF_A)/(nF_A-nC_A)$ of the refractive optical element A, $f_A$ is the focal length of the refractive optical element A, and fG1 is the focal length of the first lens group.

14. The image forming optical system according to claim 13, wherein the image forming optical system satisfies the following conditional expression (2):

$$|fG1/fG2|>7.95 \quad (2),$$

where fG1 is the focal length of the first lens group, and fG2 is the focal length of the second lens group.

15. An electronic image pickup apparatus comprising an image forming optical system and an image pickup element, wherein the image forming optical system comprises, in order from the object side to the image side, a first lens group having a positive refracting power, a second lens group having a negative refracting power, and an image side lens group having a positive refracting power, the distance between the first lens group and the second lens group changes during zooming, a refractive optical element A having a positive refracting power is provided in the first lens group, and the refractive optical element A satisfies the following conditional expression (3-2):

$$0<(Zb(3.3a)-Za(3.3a))/(Zb(2.5a)-Za(2.5a))<0.990 \quad (3\text{-}2),$$

where fw is the focal length of the image forming optical system at the wide angle end, ft is the focal length of the image forming optical system at the telephoto end, IH is the largest image height on the image pickup element, Za(h) is the distance along the optical axis between the object side surface vertex of the refractive optical element A on the optical axis and a point on the object side surface of the refractive optical element A at height h, Zb(h) is the distance along the optical axis between the object side surface vertex of the refractive optical element A on the optical axis and a point on the image plane side surface of the refractive optical element A at height h, and a is a value defined by the following equation (3-1):

$$a = \{(IH)^2 \times \log_{10}(ft/fw)\}/fw \qquad (3\text{-}1).$$

16. The electronic image pickup apparatus according to claim 15, wherein the electronic image pickup apparatus satisfies any one of the following conditional expressions (9-1a), (9-1b), (9-1c), (9-2a), and (9-2b):

$$1.0 < Tngl(0)/Tbas(0) < 12 \qquad (9\text{-}1a),$$

$$0.4 < Tnglw(0.7)/Tbasw(0.7) < 3 \qquad (9\text{-}1b),$$

$$0.2 < Tnglw(0.9)/Tbasw(0.9) < 1.5 \qquad (9\text{-}1c),$$

$$0 < (Tnglw(0.7)/Tbasw(0.7))/(Tngl(0)/Tbas(0)) < 0.7 \qquad (9\text{-}2a), \text{ and}$$

$$0 < (Tnglw(0.9)/Tbasw(0.9))/(Tngl(0)/Tbas(0)) < 0.5 \qquad (9\text{-}2b),$$

where Tngl(0) is the thickness of the refractive optical element A on the optical axis, Tnglw(0.7) is the distance over which a ray having a ray height of 70% of the largest image height on the image pickup element at the wide angle end travels inside the refractive optical element A, Tnglw(0.9) is the distance over which a ray having a ray height of 90% of the largest image height on the image pickup element at the wide angle end travels inside the refractive optical element A, Tbas(0) is the thickness of the optical element B on the optical axis, Tbasw(0.7) is the distance over which a ray having a ray height of 70% of the largest image height on the image pickup element at the wide angle end travels inside the optical element B, and Tbasw(0.9) is the distance over which a ray having a ray height of 90% of the largest image height on the image pickup element at the wide angle end travels inside the optical element B.

17. The electronic image pickup apparatus according to claim 15, wherein the electronic image pickup apparatus satisfies any one of the following conditional expressions (10-1a), (10-1b), (10-1c), (10-2a), and (10-2b):

$$1.0 < Tngl(0)/Tbas(0) < 12 \qquad (10\text{-}1a),$$

$$0.6 < Tnglt(0.7)/Tbast(0.7) < 4 \qquad (10\text{-}1b),$$

$$0.45 < Tnglt(0.9)/Tbast(0.9) < 3.0 \qquad (10\text{-}1c),$$

$$0 < (Tnglt(0.7)/Tbast(0.7))/(Tngl(0)/Tbas(0)) < 0.9 \qquad (10\text{-}2a), \text{ and}$$

$$0 < (Tnglt(0.9)/Tbast(0.9))/(Tngl(0)/Tbas(0)) < 0.8 \qquad (10\text{-}2b),$$

where Tngl(0) is the thickness of the refractive optical element A on the optical axis, Tnglt(0.7) is the distance over which a ray having a ray height of 70% of the largest image height on the image pickup element at the telephoto end travels inside the refractive optical element A, Tnglt(0.9) is the distance over which a ray having a ray height of 90% of the largest image height on the image pickup element at the telephoto end travels inside the refractive optical element A, Tbas(0) is the thickness of the optical element B on the optical axis, Tbast(0.7) is the distance over which a ray having a ray height of 70% of the largest image height on the image pickup element at the telephoto end travels inside the optical element B, and Tbast(0.9) is the distance over which a ray having a ray height of 90% of the largest image height on the image pickup element at the telephoto end travels inside the optical element B.

18. The electronic image pickup apparatus according to claim 15, wherein the electronic image pickup apparatus satisfies the following conditional expression (11a) or (11b):

$$0.5 < (Tnglt(0.7)/Tngl(0)) < 0.98 \qquad (11a), \text{ or}$$

$$0.5 < (Tnglt(0.9)/Tngl(0)) < 0.97 \qquad (11b),$$

where Tngl(0) is the thickness of the refractive optical element A on the optical axis, Tnglt(0.7) is the distance over which a ray having a ray height of 70% of the largest image height on the image pickup element at the telephoto end travels inside the refractive optical element A, and Tnglt(0.9) is the distance over which a ray having a ray height of 90% of the largest image height on the image pickup element at the telephoto end travels inside the refractive optical element A.

19. The electronic image pickup apparatus according to claim 15, wherein the electronic image pickup apparatus satisfies the following conditional expression (12a) or (12b):

$$0.5 < (Tnglw(0.7)/Tngl(0)) < 0.98 \qquad (12a), \text{ or}$$

$$0.3 < (Tnglw(0.9)/Tngl(0)) < 0.95 \qquad (12b),$$

where Tngl(0) is the thickness of the refractive optical element A on the optical axis, Tnglw(0.7) is the distance over which a ray having a ray height of 70% of the largest image height on the image pickup element at the wide angle end travels inside the refractive optical element A, and Tnglw(0.9) is the distance over which a ray having a ray height of 90% of the largest image height on the image pickup element at the wide angle end travels inside the refractive optical element A.

* * * * *